United States Patent
Pendergrass et al.

(10) Patent No.: US 7,145,954 B1
(45) Date of Patent: Dec. 5, 2006

(54) METHOD AND APPARATUS FOR MAPPING PULSES TO A NON-FIXED LAYOUT

(75) Inventors: Marcus H. Pendergrass, Huntsville, AL (US); Mark D. Roberts, Huntsville, AL (US); James L. Richards, Fayetteville, TN (US)

(73) Assignee: Time Domain Corporation, Huntsville, AL (US)

( * ) Notice: Subject to any disclaimer, the term of this patent is extended or adjusted under 35 U.S.C. 154(b) by 842 days.

(21) Appl. No.: 09/638,151

(22) Filed: Aug. 15, 2000

Related U.S. Application Data

(63) Continuation-in-part of application No. 09/591,691, filed on Jun. 12, 2000.

(51) Int. Cl.
*H04B 14/06* (2006.01)
(52) U.S. Cl. .................. 375/247; 375/239; 375/242
(58) Field of Classification Search ............... 375/138, 375/239, 242, 247
See application file for complete search history.

(56) References Cited

U.S. PATENT DOCUMENTS

| | | | |
|---|---|---|---|
| 3,728,632 A | 4/1973 | Ross | |
| 4,170,757 A | 10/1979 | Skudera et al. | |
| 4,641,317 A | 2/1987 | Fullerton | |
| 4,743,906 A | 5/1988 | Fullerton | |
| 4,813,057 A | 3/1989 | Fullerton | |
| 4,928,316 A | 5/1990 | Heritage et al. | |
| 4,979,186 A | 12/1990 | Fullerton | |
| 5,363,108 A | 11/1994 | Fullerton | |
| 5,377,225 A | 12/1994 | Davis | |
| 5,610,907 A * | 3/1997 | Barrett .................. | 370/342 |
| 5,677,927 A | 10/1997 | Fullerton et al. | |
| 5,687,169 A | 11/1997 | Fullerton | |
| 5,793,759 A | 8/1998 | Rakib et al. | |
| 5,832,035 A | 11/1998 | Fullerton | |
| 5,960,031 A | 9/1999 | Fullerton et al. | |
| 5,963,581 A | 10/1999 | Fullerton et al. | |
| 6,160,802 A * | 12/2000 | Barrett .................. | 370/342 |
| 6,204,810 B1 * | 3/2001 | Smith .................... | 342/365 |
| 6,212,230 B1 * | 4/2001 | Rybicki et al. ........ | 375/239 |
| 6,330,233 B1 * | 12/2001 | Miya et al. ............ | 370/342 |
| 6,331,997 B1 * | 12/2001 | Li .......................... | 375/130 |

(Continued)

OTHER PUBLICATIONS

S.V. Maric et al., "A Class of Frequency Hop Codes With Nearly Ideal Characteristics For Use In Multiple-Access Spread-Spectrum Communications And Radar And Sonar Systems", IEEE Transactions ofn Communicatrions, vol. 40(9):1442-1447, (1992).

(Continued)

*Primary Examiner*—Phuong Phu
(74) *Attorney, Agent, or Firm*—Venable LLP; Robert S. Babayi

(57) ABSTRACT

A coding method, specifies temporal and/or non-temporal pulse characteristics, where pulse characteristic values are relative to one or more non-fixed reference characteristic values within at least one delta value range or discrete delta value layout. The method allocates allowable and non-allowable regions relative to the one ore more non-fixed references. The method applies a delta code relative to the allowable and non-allowable regions. The allowable and non-allowable regions are relative to one or more definable characteristic values within a characteristic value layout. The one or more definable characteristic values are relative to one or more characteristic value references. In addition, the one or more characteristic value references can be a characteristic value of a given pulse such as a preceding pulse or a succeeding pulse.

26 Claims, 50 Drawing Sheets

U.S. PATENT DOCUMENTS 6,430,208 B1 * 8/2002 Fullerton et al. ........... 375/130
6,636,556 B1 * 10/2003 Li .............................. 375/146

OTHER PUBLICATIONS

E. L Titlebaum et al., "Time-Frequency Hop Signals Part I: Coding Based Upon The Theory Of Linear Congruences", IEEE Transactions On Aerospace And Electronic Systems, vol. AES-17(4):490-493, (1981).

E. L. Titlebaum et al., "Time-Frequency Hop Signals Part II: Coding Based Upon Quadratic Congruences", IEEE Transactions On Aerospace And Electronic Systems, vol. AES-17(4):494-500, (1981).

E.L. Titlebaum et al., "Ambiguity Properties Of Quadratic Congruential Coding", IEEE Transactions On Aerospace And Electronic Systems, vol. 27(1): 18-29, (1991).

R.A. Scholtz, "Multiple Access With Time-Hopping Implulse Modulation", Communication Science Institute, University of Southern California, Los Angeles, CA (1993).

A. Albicki et al., "Transmitter And Receiver Design For Pilot Project, Phase 1", Technical Report #1, for Rochester Gas and Electric Corporation, pp. 726-742, (1988).

Bellegarda et al., "Time-Frequency Hop Codes Based Upon Extended Quadratic Congrences", IEEE Transactions On Aerospace And Electronic Systems, vol. 24(6):726-742, (1988).

Belegarda et al., "The Hit Array: An Analysis Formalism For Multiple Access Frequency Hop Coding", IEEE Transactions On Aerospace And Electronic Systems, vol. 27(1):30-39, (1991).

Bellegarda et al., "Amendment to time-Frequency Hop Codes Based Upon Extended Quadratic Congruences", IEEE Transactions On Aerospace And Electronic Systems, vol. 27(1):167-172, (1991).

Drumheller et al., "Cross-Correlation Properties Of Algebraically Constructed Costas Arrays", IEEE Transactons And Electronic Systems, vol. 27:2-10, (1991).

Kostic et al., "The Design Of New Opitcal Codes And Time-Hopping Patterns For Synchronous Spread-Spectrum Code Division Multiple-Access Communication Systems", IEEE, ICC, pp. 585-589, (1991).

Comments of Pulson Communiations Corporation in the Matter of Amendment of the Commission's Rules to Establish New Personal Communications Services as filed at the Federal Communications Commission on Nov. 9, 1992.

* cited by examiner

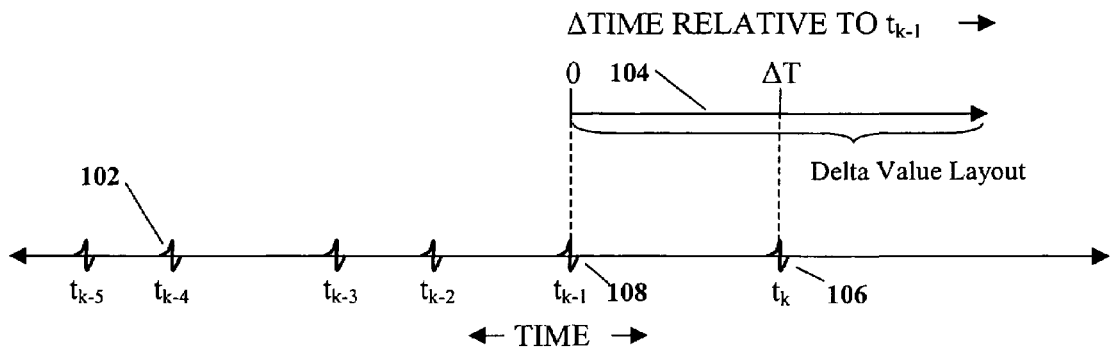
FIGURE 1. Temporal Characteristic Delta Value Layout
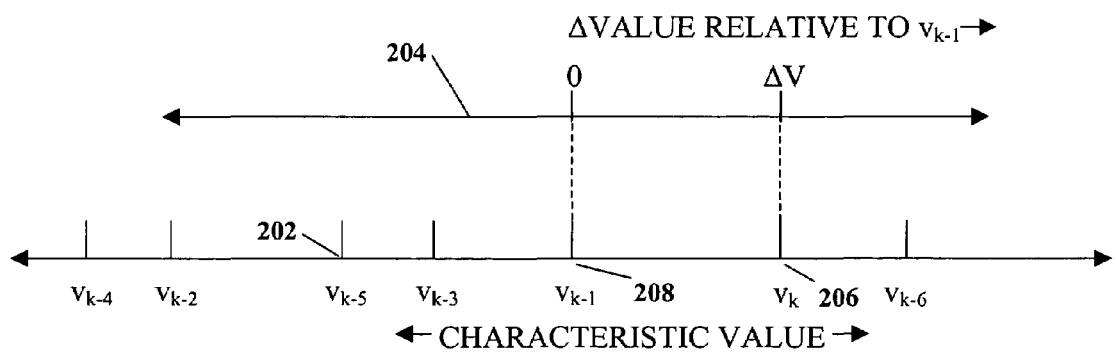
FIGURE 2. Non-temporal Characteristic Delta Value Layout

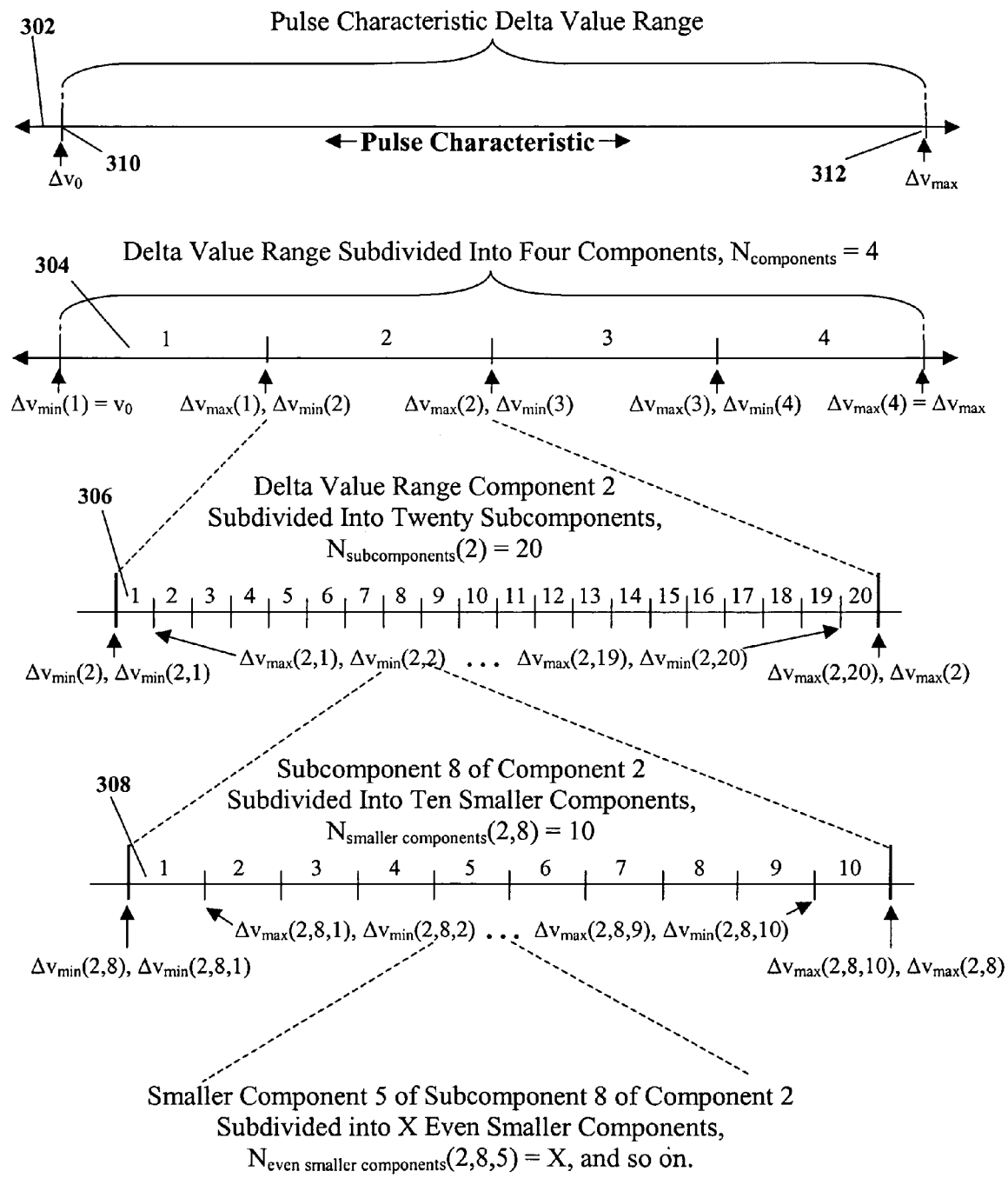
FIGURE 3. Characteristic Delta Value Range Layout Parameters

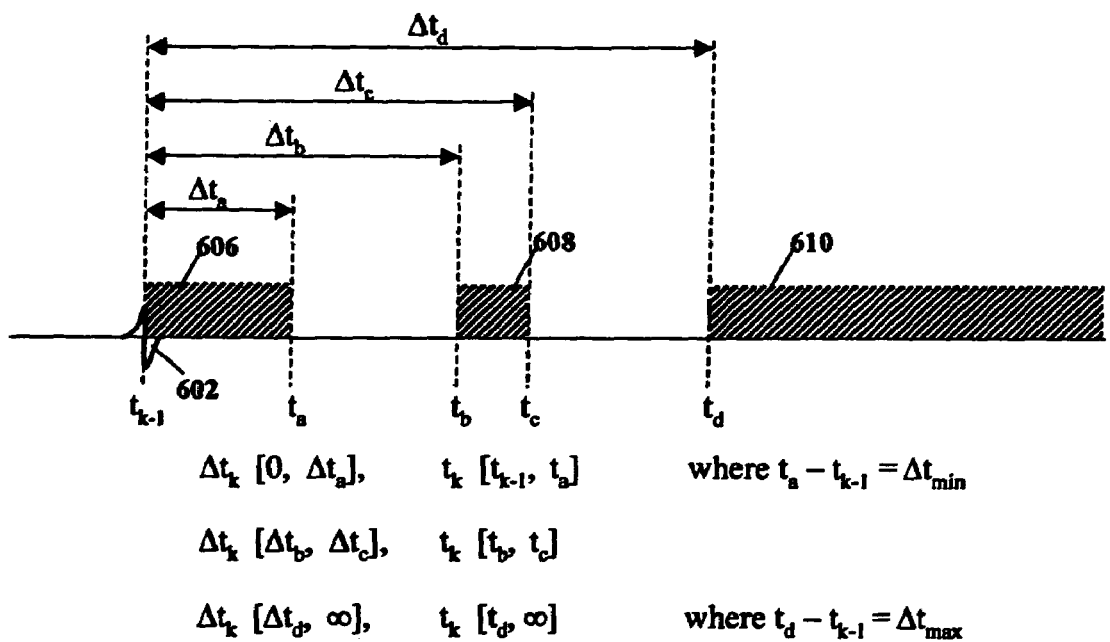
FIGURE 6a. Non-allowable Regions Relative to Preceding Pulse Position

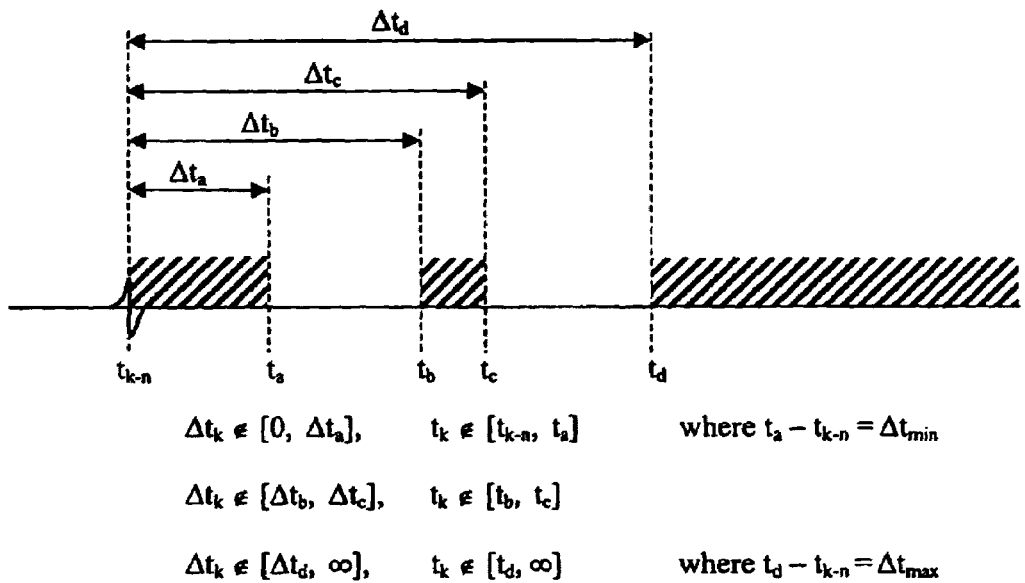
FIGURE 6b. Non-allowable Regions Relative to Any Preceding Pulse Position

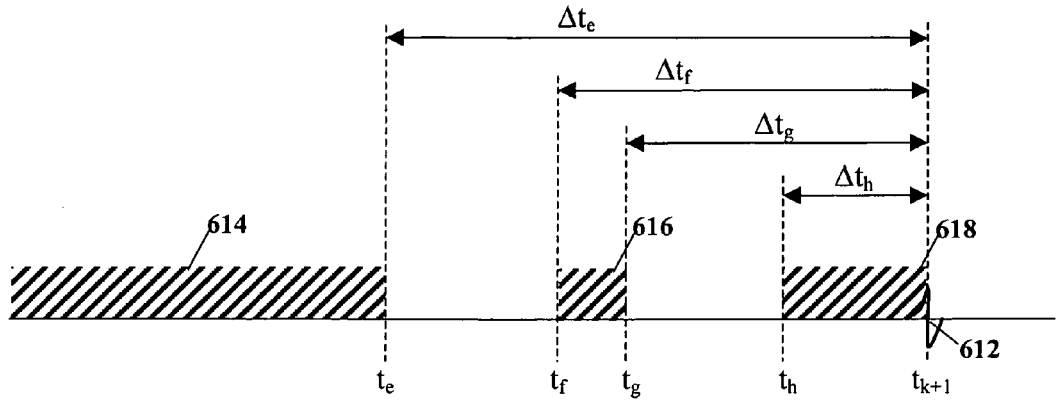
FIGURE 6c. Non-allowable Regions Relative to Succeeding Pulse Position
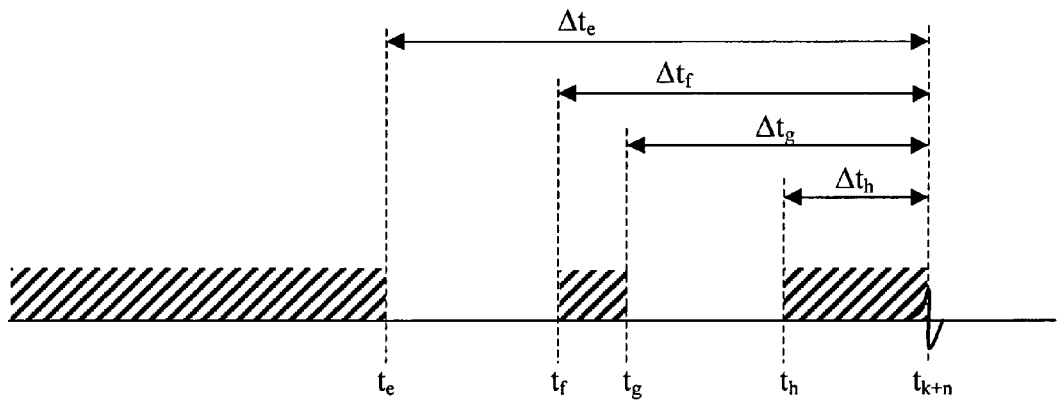
FIGURE 6d. Non-allowable Regions Relative to Any Succeeding Pulse Position

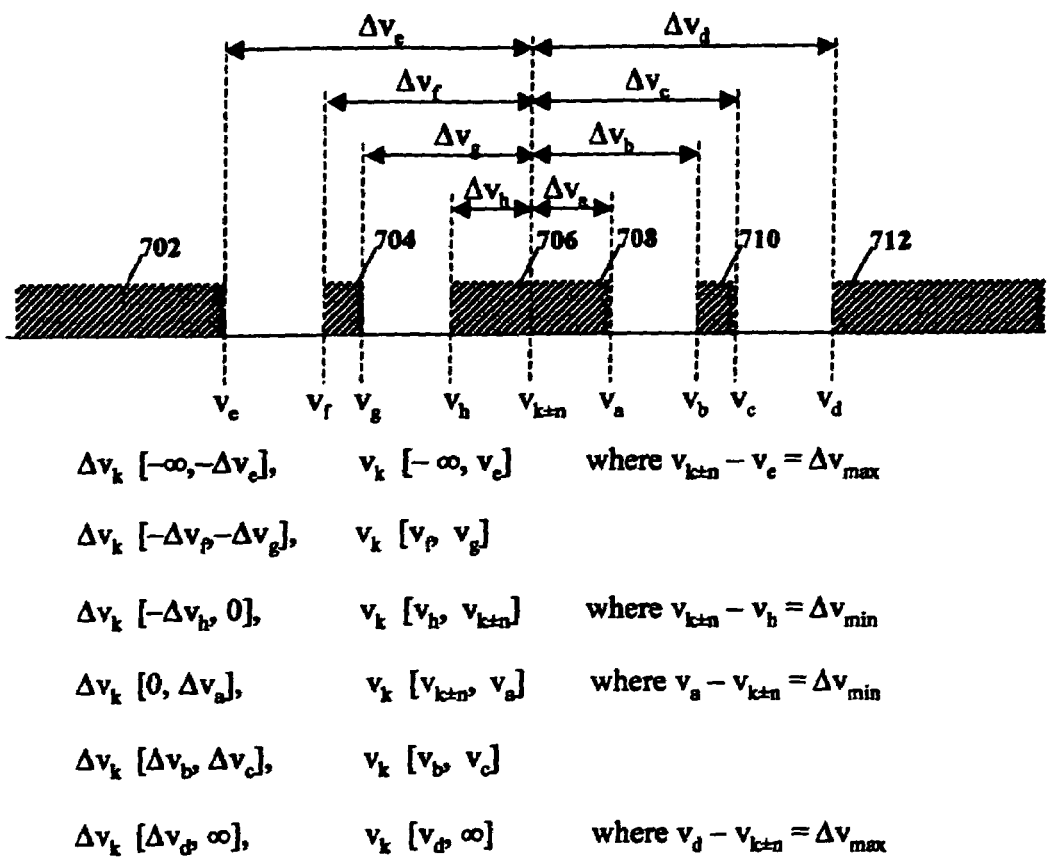
FIGURE 7. Non-allowable Regions Relative to Characteristic Value of Any Other Pulse

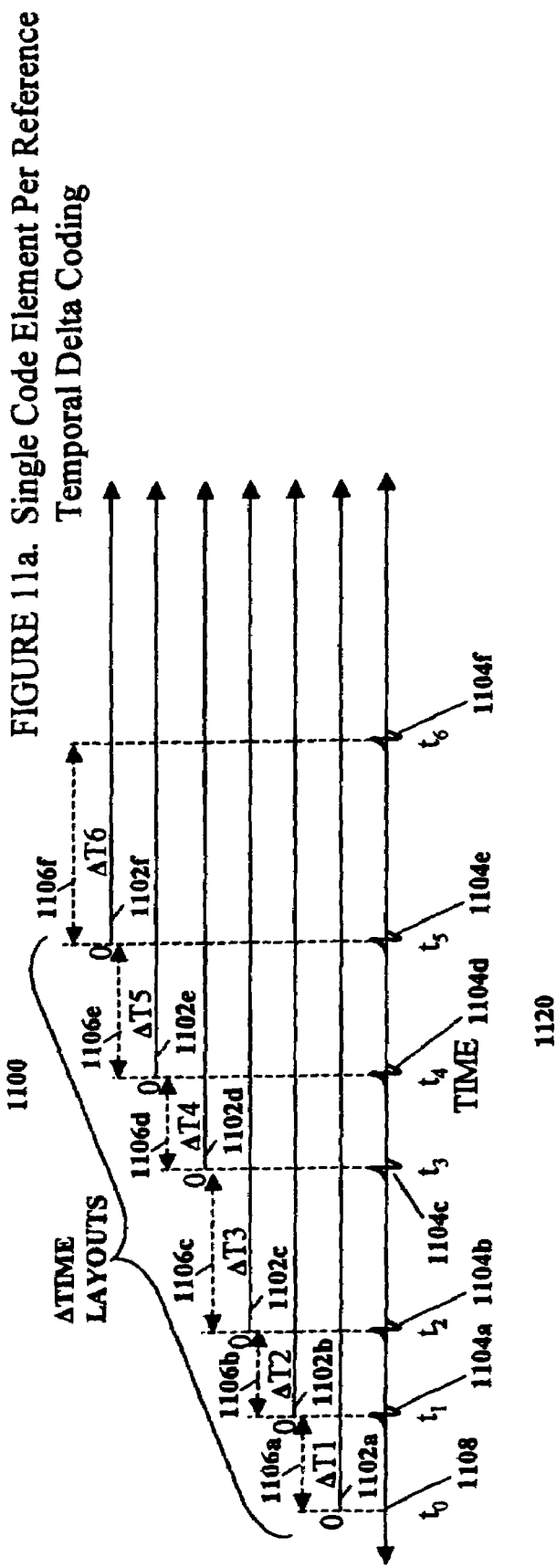
FIGURE 11a. Single Code Element Per Reference Temporal Delta Coding

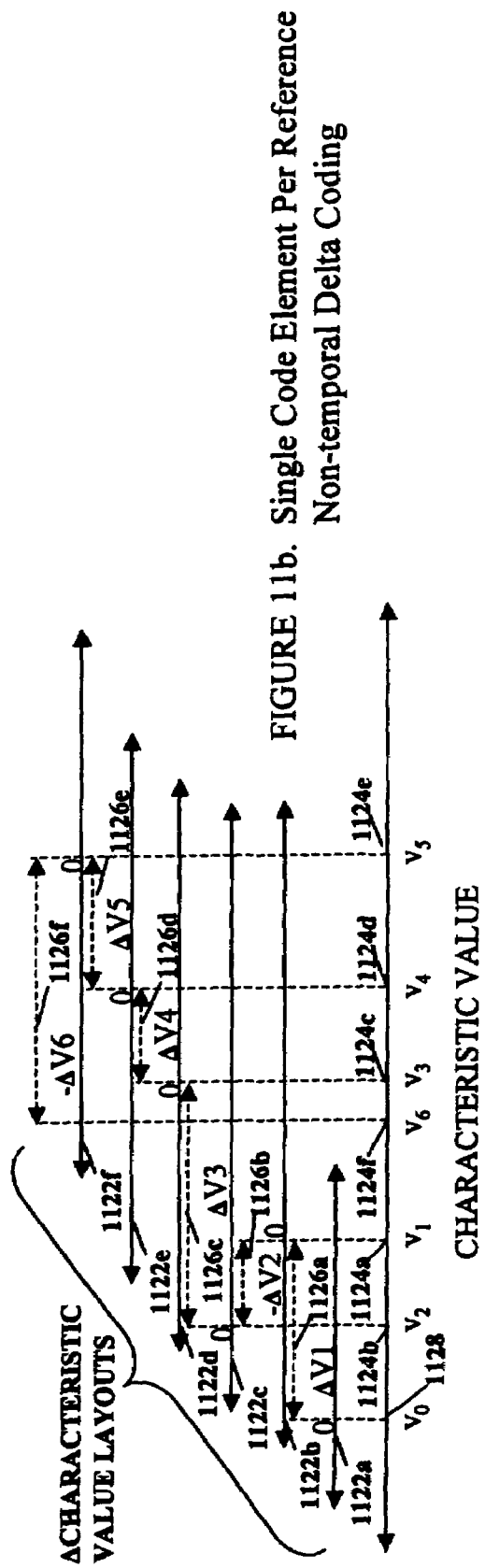
FIGURE 11b. Single Code Element Per Reference Non-temporal Delta Coding

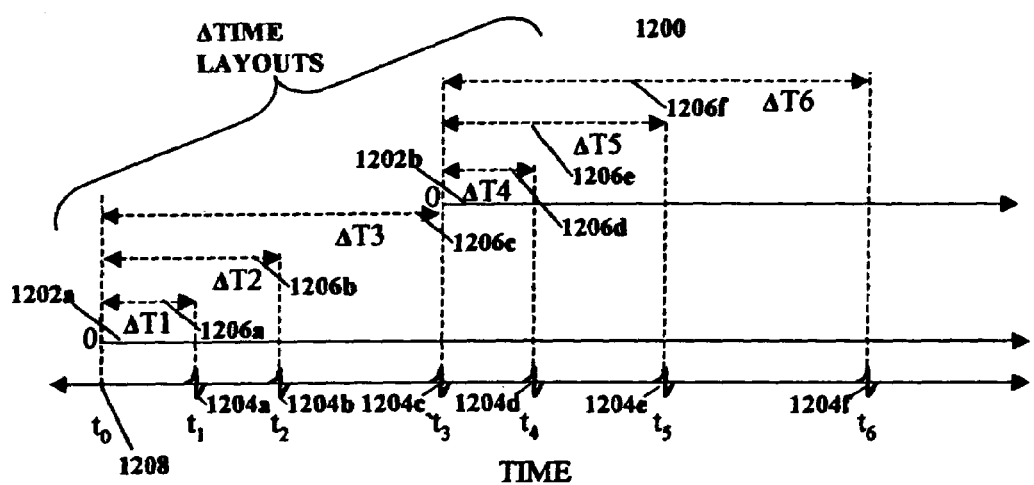
FIGURE 12a. Multiple (3) Code Elements Per Reference Temporal Delta Coding

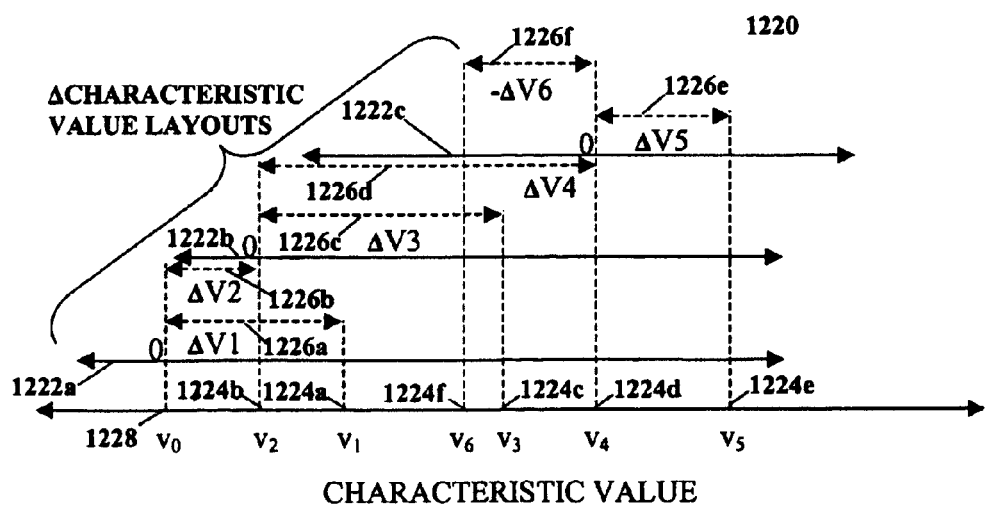
FIGURE 12b. Multiple (2) Code Elements Per Reference Non-temporal Delta Coding

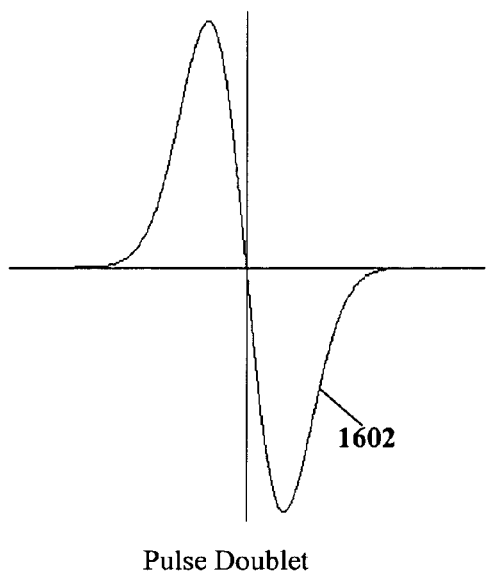 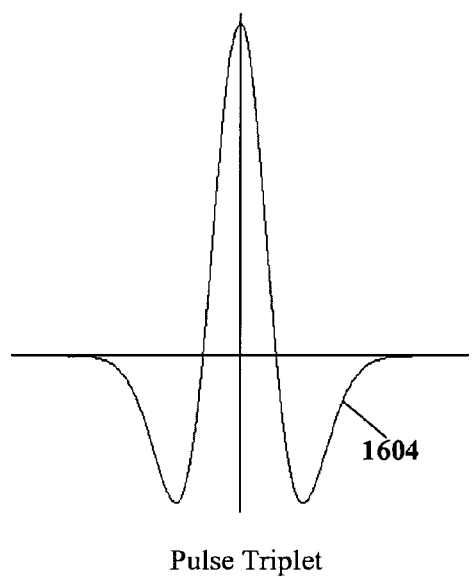
Pulse Doublet                     Pulse Triplet
FIGURE 16a                        FIGURE 16b

Typical Time-Coded UWB Pulse Trains

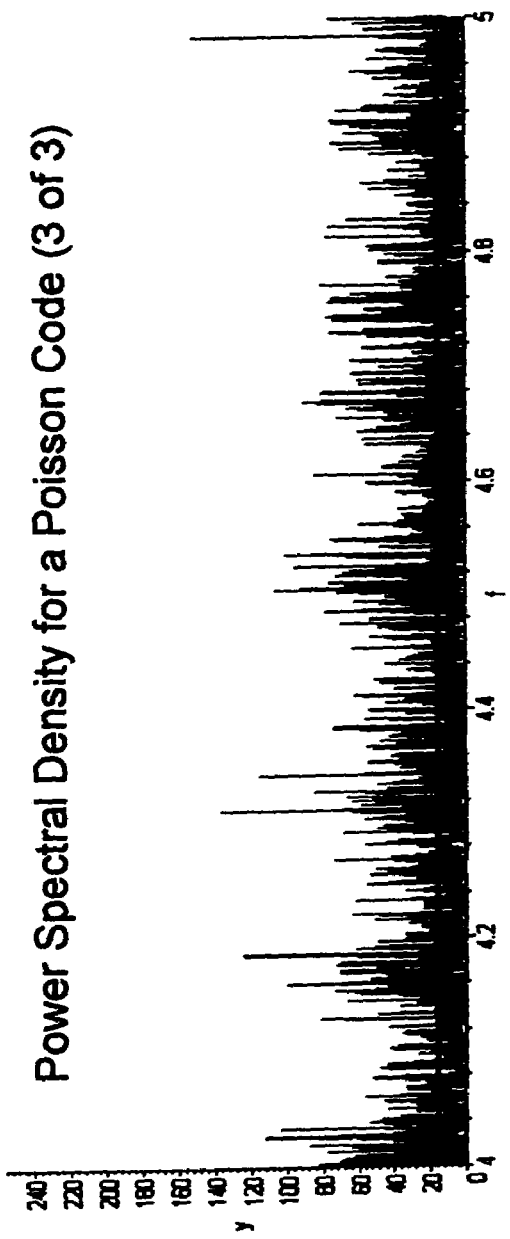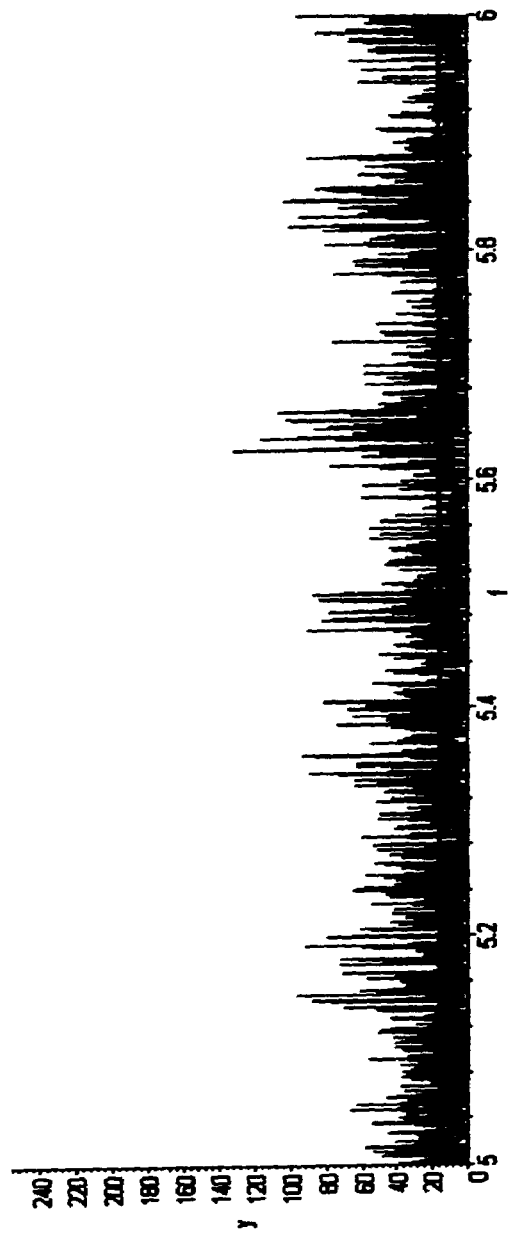
FIGURE 20c

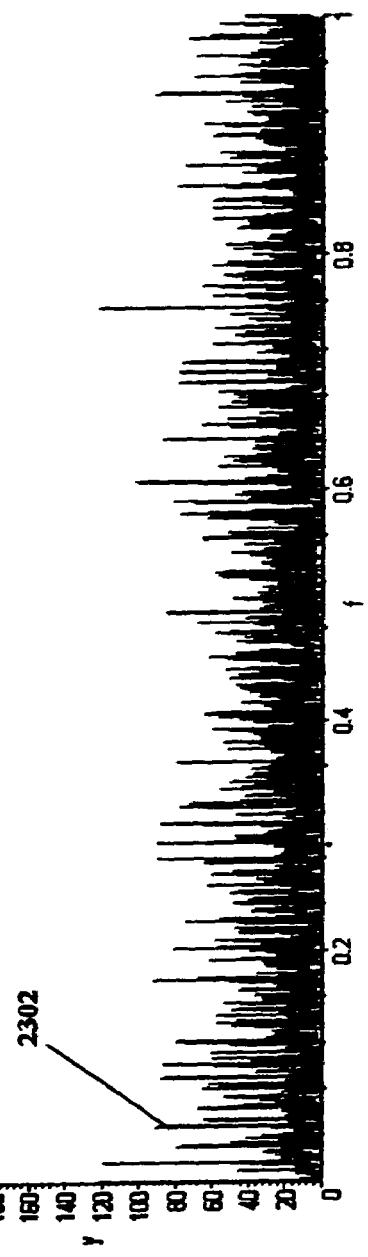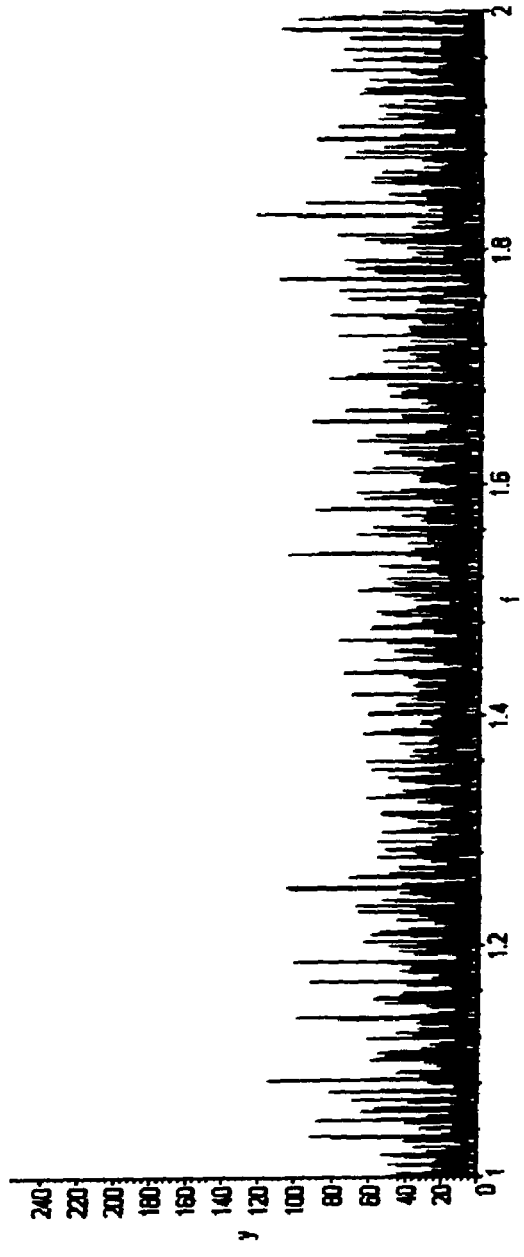
FIGURE 23a

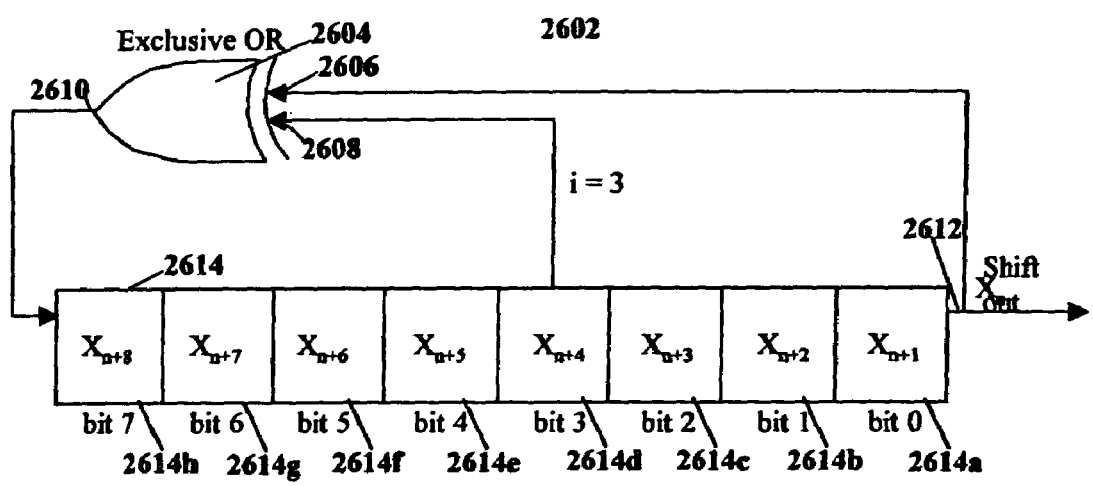
FIGURE 26a. Linear Feedback Shift Register

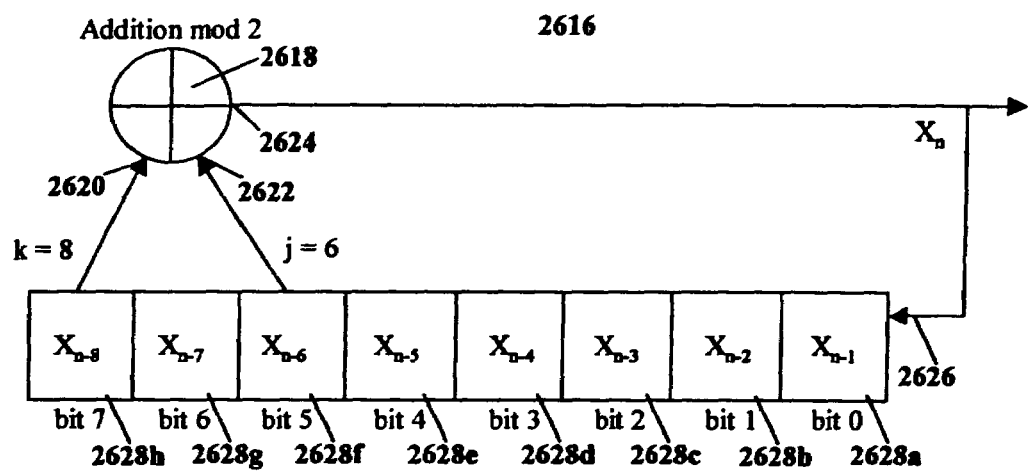
FIGURE 26b. Lagged-Fibonacci Shift Register Generator

Flow Diagram for Iterated Generation of Delta Codes

METHOD AND APPARATUS FOR MAPPING PULSES TO A NON-FIXED LAYOUT

CROSS-REFERENCE TO OTHER APPLICATIONS

This application is a Continuation-in-Part of Ser. No. 09/591,691, filed Jun. 12, 2000.

The following applications of common assignee may contain common disclosure with the present application:

U.S. patent application Ser. No. 09/592,250 entitled "A METHOD FOR SPECIFYING NON-TEMPORAL PULSE CHARACTERISTICS", filed concurrently herewith.

U.S. patent application Ser. No. 09/591,690 entitled "A METHOD AND APPARATUS FOR APPLYING CODES HAVING PRE-DEFINED PROPERTIES", filed concurrently herewith.

U.S. patent application Ser. No. 09/592,249 entitled "A METHOD AND APPARATUS FOR POSITIONING PULSES USING A LAYOUT HAVING NON-ALLOWABLE REGIONS", filed concurrently herewith.

U.S. patent application Ser. No. 09/592,248 entitled "A METHOD AND APPARATUS FOR POSITIONING PULSES IN TIME", filed concurrently herewith.

U.S. patent application Ser. No. 09/592,288 entitled "A METHOD AND APPARATUS FOR SPECIFYING PULSE CHARACTERISTICS USING A CODE THAT SATISFIES PREDEFINED CRITERIA ", filed concurrently herewith.

U.S. patent application Ser. No. 09/592,290 entitled "METHOD FOR SPECIFYING PULSE CHARACTERISTICS USING CODES", filed concurrently herewith.

U.S. patent application Ser. No. 09/592,289 entitled "A METHOD FOR SPECIFYING NON-ALLOWABLE PULSE CHARACTERISTICS", filed concurrently herewith.

The above-listed applications are incorporated herein by reference in their entireties.

BACKGROUND OF THE INVENTION

1. Field of the Invention

The present invention relates to impulse radio systems and, more particularly, to a method of applying time-hopping codes for time positioning of pulses in an impulse radio system.

2. Related Art

As the availability of communication bandwidth in the increasingly crowded frequency spectrum is becoming a scarce and valuable commodity, Time Modulated Ultra Wideband (TM-UWB) technology provides an excellent alternative for offering significant communication bandwidth, particularly, for vari ous wireless communications applications. Because TM-UWB communication systems are based on communicating extremely short-duration pulses (e.g., pico-seconds in duration), such systems are also known as impulse radio systems. Impulse radio systems were first described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,057 (issued Nov. 8, 1994) to Larry W. Fullerton, and U.S. Pat. No. 5,677,927 (issued Oct. 14, 1997), U.S. Pat. No. 5,687,169 (issued Nov. 11, 1997), and U.S. Pat. No. 5,832,035 (issued Nov. 3, 1998) to Larry W. Fullerton, et al. These patents are incorporated herein by reference.

Multiple access impulse radio systems are radically different from conventional Code Division Multiple Access (CDMA), Time Division Multiple Access (TDMA) and Frequency Division Multiple Access (FDMA) systems. Unlike such systems, which use continuous sinusoidal waveforms for transmitting information, a conventional impulse radio transmitter emits a low power electromagnetic train of short pulses, which are shaped to approach a Gaussian monocycle. As a result, the impulse radio transmitter uses very little power to generate noise-like communication signals for use in multiple-access communications, radar and positioning applications, among other things. In the multi-access communication applications, the impulse radio systems depend, in part, on processing gain to achieve rejection of unwanted signals. Because of the extremely high achievable processing gains, the impulse radio systems are relatively immune to unwanted signals and interference, which limit the performance of systems that use continuous sinusoidal waveforms. The high processing gains of the impulse radio systems also provide much higher dynamic ranges than those commonly achieved by the processing gains of other known spread-spectrum systems.

Impulse radio communication systems transmit and receive the pulses at precisely controlled time intervals, in accordance with a time-hopping code. As such, the time-hopping code defines a communication channel that can be considered as a unidirectional data path for communicating information at high speed. In order to communicate the information over such channels, typical impulse radio transmitters use position modulation, which is a form of time modulation, to position the pulses in time, based on instantaneous samples of a modulating information signal. The modulating information signal may for example be a multi-state information signal, such as a binary signal. Under this arrangement, a modulator varies relative positions of a plurality of pulses on a pulse-by-pulse basis, in accordance with the modulating information signal and a specific time-hopping code that defines the communication channel.

In applications where the modulating information signal is a binary information signal, each binary state may modulate the time position of more than one pulse to generate a modulated, coded timing signal that comprises a train of identically shaped pulses that represent a single data bit. The impulse transmitter applies the generated pulses to a specified transmission medium, via a coupler, such as an antenna, which electromagnetically radiates the pulses for reception by an impulse radio receiver. The impulse radio receiver typically includes a single direct conversion stage. Using a correlator, the conversion stage coherently converts the received pulses to a baseband signal, based on a priori knowledge of the time-hopping code. Because of the correlation properties of the selected time-hopping codes, the correlator integrates the desired received pulses coherently, while the undesired noise signals are integrated non-coherently such that by comparing the coherent and non-coherent integration results, the impulse receiver can recover the communicated information.

Conventional spread-spectrum code division multiple access (SS-CDMA) techniques accommodate multiple users by permitting them to use the same frequency bandwidth at the same time. Direct sequence CDMA systems employ pseudo-noise (PN) codewords generated at a transmitter to "spread" the bandwidth occupied by transmitted data beyond the minimum required by the data. The conventional SS-CDMA systems employ a family of orthogonal or quasi-orthogonal spreading codes, with a pilot spreading code sequence synchronized to the family of codes. Each user is assigned one of the spreading codes as a spreading function. One such spread-spectrum system is described in U.S. Pat.

No. 4,901,307 entitled SPREAD-SPECTRUM MULTIPLE ACCESS COMMUNICATION SYSTEM USING SATELLITE OR TERRESTRIAL REPEATERS by Gilhousen et al.

Unlike spread-spectrum systems, the time-hopping code for impulse radio communications is not necessary for energy spreading, because the monocycle pulses themselves have an inherently wide bandwidth. Instead, the impulse radio systems use the time-hoping codes for channelization, energy smoothing in the frequency domain, and interference suppression. The time-hoping code defines a relative position of each pulse within a group of pulses, or pulse train, such that the combination of pulse positions defines the communications channel. In order to convey information on such communication channel, each state of a multi-state information signal varies a relative pulse position by a predefined time shift such that a modulated, coded timing signal is generated comprising a train of pulses, each with timing corresponding to the combination of the time position coding and the multi-state modulation.

In one conventional binary approach, pulses are time-modulated forward or backward about a nominal position. More specifically, each pulse is time modulated by adjusting its position within a time frame to one of two or more possible times. For example, in order to send a "0" binary bit during the time frame, the pulse may be offset from a nominal position of the time frame by about −50 picoseconds. For a "I" binary state, the pulse may be offset from the nominal position by about +50 pico-seconds. Conventional coders that generate the time-hoping code do so in response to a periodic timing signal that corresponds to the data-rate of the multi-state information signal. The data rate of the impulse radio transmission may for example be a fraction of a periodic timing signal that is used as a time base or time reference.

In practice, decoding errors are minimized using distinctive time-hopping codes with suitable autocorrelation and cross-correlation properties. The cross-correlation between any two time-hopping codes should be low for minimal interference between multiple users in a communications system or between multiple target reflections in radar and positioning applications. At the same time, the autocorrelation property of a time-hoping code should be steeply peaked, with small side-lobes. Maximally peaked time-hopping code autocorrelation yields optimal acquisition and synchronization properties for communications, radar and positioning applications.

Various coding schemes with known correlation characteristics are available. For example, algebraic codes, Quadratic Congruential (QC) codes, Hyperbolic Congruential (HC) codes and optical codes have been suggested in the past for coding in impulse radio systems. Generally, based on known assumptions, the coding schemes guarantee a maximum number of pulse coincidences, i.e., hits, for any defined time frame or time frame shift during which the codes are repeated. For example, HC codes are guaranteed a maximum of two hits for any sub-frame or frame shift.

McCorkle in U.S. Pat. No. 5,847,677 discloses a random number generator for generating a pseudorandom code for use with jittered pulse repetition interval radar systems. The code is generated by a random number generator that possesses certain attributes desirable for a jittered radar. As disclosed, the attributes related to a flat frequency spectrum, a nearly perfect spike for an autocorrelation function, a controllable absolute minimum and maximum interval, long sequences that do not repeat, and a reasonable average pulse rate.

One known coding technique for an impulse radio is disclosed by Barrett in U.S. Pat. No. 5,610,907, entitled "Ultrafast Time Hopping CDMA-RF Communications: Code-As-Carrier, Multichannel Operation, High data Rate Operation and Data Rate on Demand." According to the disclosed techniques, two levels of coding are used: major orthogonal codes are applied to provide multiple channels, and forward error correction (FEC) codes are applied to information data before transmission. The disclosed system relies on dividing time into repetitive super-frames, frames and sub-frames. As disclosed, a super-frame corresponds to a time interval of about 1 millisecond, representing one repetition of a code pattern, where as a frame is defined as a time interval of about 1 microsecond divided according to a code length. A sub-frame corresponds to a short time interval of about 1 nano second during which a pulse is time positioned.

Because of practical limitations associated with arbitrarily positioning of pulses in adjacent frames, each frame may have to be divided into allowable and non-allowable time regions for positioning a pulse. One such limitation is associated with hardware limitation on minimum pulse-to-pulse time for respective positioning of two pulses on adjacent frames arbitrarily. The system disclosed in Barrett uses a fraction of frame time for encoding and designates the remainder as a RESET period. The inventors have found that the presence of the RESET period affects the correlation properties of the codes used in Barrett.

Time-hopping code generation techniques that employ a repeating frame-based time layout, such as those disclosed in Barrett, have an inherent predictability due to the repetitive nature of the frames. Such predictability opens the possibility of undesired signal interception by third parties, and is thus a liability for certain UWB applications, such as secure communications. Accordingly, there exists a need for general coding techniques that are not limited to the frame-based approach.

The method disclosed in McCorkle, while not frame-based, is specifically tailored towards radar applications. In addition, the specific code-generation methodology presented in McCorkle imposes limitations on the resulting codes that may not be acceptable for some applications. Therefore, there exists a need for more general non-frame-based coding techniques to address these limitations.

Finally, the coding techniques in both Barrett and McCorkle are limited to determining the temporal positioning of pulses emitted by UWB transmitters. Non-temporal pulse characteristics, such as pulse amplitude and pulse width, are also important factors in UWB signaling. Consequently, there exists a need for coding techniques that can be used to determine non-temporal pulse characteristics.

SUMMARY OF THE INVENTION

Briefly, according to the present invention, a coding method specifies temporal and/or non-temporal pulse characteristics in accordance with at least one non-fixed layout of characteristic delta value ranges and/or discrete delta values. Temporal pulse characteristics, for example, include time position. Non-temporal pulse characteristics, for example, include pulse amplitude and pulse width and other known characteristics. A delta code is used for specifying temporal and/or non-temporal pulse characteristics relative to the non-fixed layouts. In this way, the present invention specifies pulse characteristics relative to one or more non-fixed characteristic value references, for example, a characteristic value of a given pulse. Among others things, the given pulse may be a preceding pulse or a succeeding pulse.

According to some of the more detailed features of the present invention, allowable and non-allowable regions may be defined specifying pulse characteristics, with such regions being defined relative to the one or more non-fixed characteristic value references. Under this arrangement, the delta code may be applied to the allowable and non-allowable regions, which may be relative to one or more definable characteristic values within a layout. The one or more definable characteristic values may be relative to one or more characteristic value references.

Several embodiments are specified which incorporate specific mathematical algorithms to generate delta codes. These embodiments fall into two general categories: pseudorandom delta code generation techniques, and deterministic delta code generation techniques. Within these broad categories, numerous specific techniques are presented. Poisson Codes, Constrained Poisson Codes, and Uniform Delta Codes are exemplary embodiments of the pseudorandom delta code generation technique. The deterministic delta code generation technique incorporates two broad methodologies: sequential deterministic delta code generation, and iterative deterministic delta code generation. Exemplary embodiments of the sequential methodology include Rational Congruential Sequential Delta Codes. Exemplary embodiments of the iterative methodology include Rational Congruential Iterative Delta Codes, and Piece-wise Linear Iterative Delta Codes.

Further features and advantages of the invention, as well as the structure and operation of various embodiments of the invention, are described in detail below with reference to the accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the corresponding reference number. The foregoing and other features and advantages of the invention will be apparent from the following, more particular description of a preferred embodiment of the invention, as illustrated in the accompanying drawings, wherein:

FIG. 1 illustrates an exemplary pulse train repeating in time and a corresponding delta time value layout relative to a pulse position within the repeating pulse train.

FIG. 2 illustrates exemplary pulse train characteristic values and a delta non-temporal characteristic layout relative to a characteristic value of a pulse within the repeating pulse train.

FIG. 3 illustrates an exemplary generic pulse characteristic delta value range layout including exemplary layout parameters, and exemplary subdivisions of the value range including components, sub-components, smaller components, and even smaller components;

FIG. 6a illustrates non-allowable regions relative to a preceding pulse position within a temporal pulse characteristic delta value range layout;

FIG. 6b illustrates non-allowable regions relative to any preceding pulse position within a temporal pulse characteristic delta value range layout;

FIG. 6c illustrates non-allowable regions relative to a succeeding pulse position within a temporal pulse characteristic delta value range layout;

FIG. 6d illustrates non-allowable regions relative to any succeeding pulse position within a temporal pulse characteristic delta value range layout;

FIG. 7 illustrates non-allowable regions relative to the characteristic value of any pulse within a non-temporal pulse characteristic delta value range layout;

FIG. 11a illustrates an exemplary single code element per reference temporal delta coding approach.

FIG. 11b illustrates an exemplary single code element per reference non-temporal delta coding approach.

FIG. 12a illustrates an exemplary multiple code elements per reference temporal delta coding approach.

FIG. 12b illustrates an exemplary multiple code elements per reference non-temporal delta coding approach.

FIG. 16a illustrates a doublet pulse type that can be used in UWB transmitters;

FIG. 16b illustrates a triplet pulse type that can be used in UWB transmitters;

FIG. 20c illustrates part 3 of 3 parts of a plot of the power spectral density function for a specific Poisson Code;

FIG. 23a illustrates part 1 of 3 parts of a plot of the power spectral density function for a Uniform Delta Code;

FIG. 26a is an exemplary diagram depicting an exemplary linear feedback shift-register pseudorandom number generator;

FIG. 26b is an exemplary diagram of an additive Lagged-Fibonacci shift register pseudorandom number generator;

DETAILED DESCRIPTION OF AN EXEMPLARY EMBODIMENT OF THE INVENTION

Figure 4A:
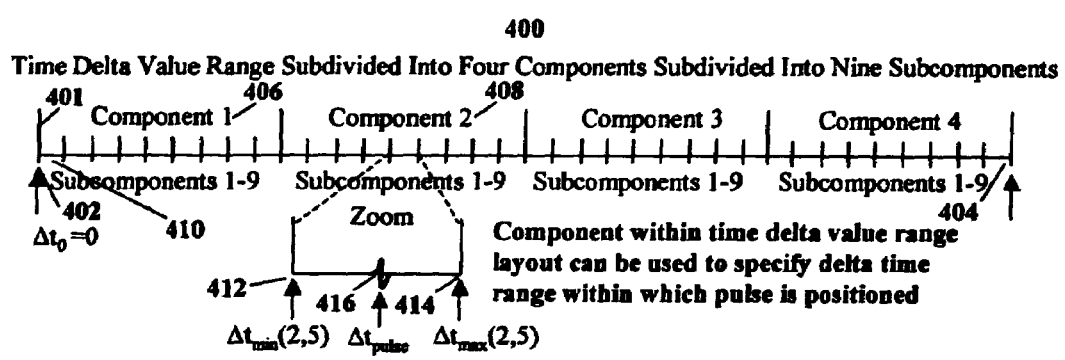
FIG. 4a illustrates an exemplary pulse time position delta value range layout of four exemplary components subdivided into nine exemplary sub-components.

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

I. Overview

In a time-hopping pulse transmission system, a sequence of pulses known as a pulse train is transmitted and received over a period of time. The relative positioning of the pulses in time defines a channel used by the system to transmit information. Time-hopping pulse transmission systems transmit these pulses such that they have the same non-temporal (i.e., non-time dependent) characteristics while varying the precise timing of the pulses per a time-hopping code mapped to frame-based time layout. (Non-temporal characteristics include amplitude, width, and other non-time dependent characteristics of a pulse or series of pulses.)

However, the inherent predictability of frame-based layouts makes such systems vulnerable to undesired signal interception. Although certain non-frame-based coding methods exist, such techniques are not generally applicable to a wide variety of TM-UWB applications. Consequently, it is desirable that generalized non-frame-based coding methods exist that are capable of transmitting pulses having the same or different non-temporal characteristics per non-frame-based temporal and/or non-temporal pulse characteristic layouts. Accordingly, the present invention provides a method of using one or more numerically generated delta codes to specify temporal and non-temporal characteristics of pulses within a pulse train for use in an impulse transmission system. The method (and accompanying system) includes: specifying temporal and/or non-temporal pulse characteristics in accordance with at least one non-fixed layout of characteristic delta value ranges and/or discrete delta values; generating at least one delta code using a numerical code generation technique; and mapping code element values to pulse characteristic values in accordance with the defined layout and code mapping approach.

II. Pulse Characteristic Delta Value Layouts

To facilitate mapping of codes to pulse characteristics, layouts of temporal and/or non-temporal pulse characteristic delta values can be defined. Temporal pulse characteristics may include, e.g., time position. Non-temporal pulse characteristics may include, e.g., pulse amplitude and pulse width (in time). Such layouts of pulse characteristic delta values can be defined in a multitude of ways to accommodate a wide variety of pulse transmission system applications. One way to characterize a delta value layout is by specifying a layout of pulse characteristic delta value ranges relative to some reference with the delta value ranges being restricted by defined beginning and ending values. Another way to characterize a layout requires specifying discrete delta pulse characteristic values relative to some reference with the discreet delta value being defined by a single value, as opposed to a range of values.

FIG. 1 depicts a train of pulse time positions 102 and a temporal delta value layout 104 used to map the time position of a pulse 106, $t_k$, relative to the time position of the previous pulse 108, $t_{k-1}$. The position of the preceding pulse 108, $t_{k-1}$, is given a zero delta value and all succeeding points in time are some delta time value, $\Delta T$, from that reference point. In a similar manner, FIG. 2 depicts non-temporal characteristic values 202 and a non-temporal delta value layout 204 used to map a non-temporal characteristic value of a pulse 206, $v_k$, relative to the non-temporal characteristic value of the preceding pulse 208, $v_{k-1}$. The non-temporal characteristic value of the preceding pulse 208, $v_{k-1}$, is given a zero delta value and all preceding and succeeding non-temporal characteristic values are some delta non-temporal characteristic value, $\Delta V$, from that reference point. A fundamental difference between temporal and non-temporal characteristics is evident when comparing FIG. 1 to FIG. 2, whereas temporal characteristics have an inherent order to them (e.g., $t_{k+1}$ is always greater than $t_k$), non-temporal characteristics do not (i.e., $v_{k+1}$ can be less than, greater than, or the same as $v_k$).

A. Delta Value Range Layout

One exemplary embodiment involves a pulse characteristic delta value range layout where various pulse characteristic delta values over some range are divided into smaller and smaller components to achieve a desired component resolution in order to facilitate mapping of a code element value to a characteristic delta value that resides within a layout component, which corresponds to some range of delta values. The below described exemplary embodiment performs this pulse characteristic delta value range layout using any of various temporal or non-temporal pulse characteristics. It should be noted that although the below described exemplary embodiments are described using particular exemplary temporal and/or non-temporal pulse characteristics; other pulse characteristics are equally applicable. For example, an exemplary embodiment may be described in terms of a non-temporal pulse amplitude characteristic. Layouts using other non-temporal pulse characteristics such as, e.g., pulse width, etc., are also possible. The different types of temporal and non-temporal pulse characteristics are described below. However, equivalent embodiments of the invention are also inherently included as a part of this description, as will be recognized by persons having ordinary skill in the relevant art.

FIG. 3 illustrates an exemplary delta value range layout which can represent a temporal, non-temporal, or combination of the two, pulse characteristic such as, e.g., timing of a pulse, and amplitude. FIG. 3 includes a delta value range layout 302. The pulse can take on characteristic delta values between a minimum delta value $\Delta v_0$ 310 and a maximum delta value $\Delta v_{max}$ 312 in layout 302. Layout 302, as shown, can be subdivided into components 304. Components 304 can in turn be divided into sub-components 306. Sub-components 306 can in turn be divided into smaller components 308. Smaller components 308 can then be divided into even smaller components, as shown. The process of subdividing components can be repeated, ad infinitum, so that smaller and smaller components can be obtained.

The process of subdividing a delta value range layout into components is now described in detail. In particular, FIG. 3 depicts an exemplary embodiment of pulse characteristic delta value range layout parameters. Specifically, a pulse characteristic delta value range 302 is shown. As depicted in FIG. 3, two layout parameters, $\Delta v_0$ and $\Delta v_{max}$, can be specified to define a pulse characteristic delta value range 302 bounded by a minimum delta value of $\Delta v_0$ and a maximum delta value of $\Delta v_{max}$. A second layout parameter, $N_{components}$, can be specified to divide the delta value range 302 into one or more components 304 of the same size, or of different sizes, with each component 304 (indexed by the letter-n) having a minimum delta value, $\Delta v_{min}(n)$, and a maximum delta value, $\Delta v_{max}(n)$, where n=1 to $N_{components}$.

The number and size of components 304 used in a given layout can be selected for various reasons. For example, the number and size of components 304 can be tailored to meet, e.g., specific application requirements, to remain within system implementation limits, to achieve one or more of a variety of system characteristics in areas such as, e.g., performance (i.e., bit rate), reliability (i.e., bit error rate), system-simplicity, ease-of-use, inter alia. When different sized components 304 are employed, minimum and maximum values can be specified for each component 304 indexed by n, wherein the minimum delta value for a given component, $\Delta v_{min}(n)$, equals the maximum delta value of the preceding component, $\Delta v_{max}(n-1)$, or $\Delta v_0$, and the maximum delta value of a given component, $\Delta v_{max}(n)$, equals the minimum delta value for the following component, $\Delta v_{min}(n+1)$, or $\Delta v_{max}$. When same sized components 304 are employed, the delta value range is evenly divided such that $\Delta v_{max}(n)-\Delta v_{min}(n)$ is equal for each component 304 indexed by n.

An array of layout parameters, $N_{sub-components}(N_{components})$, can be specified to subdivide each component 304 into sub-components 306 of the same size, or different sizes, with each sub-component 306 (indexed by m) of the component 304 (indexed by n) having a minimum delta value, $\Delta v_{min}(n,m)$, and a maximum delta value, $\Delta v_{max}(n,m)$, where n=1 to $N_{components}$ and m=1 to $N_{sub-components}(n)$. As with components 304, the number and size of sub-components 306 for a given component 304 used in a given delta value range layout 302 can also be tailored to meet, e.g., specific application requirements, to remain within system implementation limits, to achieve one or more of a variety of system characteristics in areas such as, e.g., performance (i.e., bit rate), reliability (i.e., bit error rate), system-simplicity, ease-of-use, etc., and/or for many other reasons. When different sized sub-components 306 are employed, minimum and maximum delta values are specified for each sub-component 306 indexed by m of each component 304 indexed by n, wherein the minimum delta value for a given sub-component, $\Delta v_{min}(n,m)$, equals the maximum delta value of the preceding sub-component, $\Delta v_{max}(n,m-1)$, or the minimum delta value of the component in which the sub-component resides, $\Delta v_{min}(n)$, and the maximum delta value of a given sub-component, $\Delta v_{max}(n,m)$, equals the minimum delta value for the following sub-component, $\Delta v_{min}(n,m+1)$, or the maximum delta value of the component in which the sub-component resides, $\Delta v_{max}(n)$. When same sized sub-components 306 are employed, components are evenly divided such that $\Delta v_{max}(n,m)-\Delta v_{min}(n,m)$ is equal for each sub-component 306 indexed by m of a component 304 indexed by n or for all components such that all sub-components 306 of a given component 304 are of the same size, wherein sub-component sizes may vary from component to component or all sub-components of all components are of the same size depending on the sizes of the components and the numbers of sub-components in the components.

In a manner consistent with the subdivision of components into sub-components, additional multi-dimensional arrays of layout parameters can be used to further subdivide sub-components 306 into smaller components 308 (as shown) of the same or different sizes, ad infinitum, until a smallest desirable component resolution is attained, with components at each resolution level having a minimum delta value, $\Delta v_{min}(n, m, \ldots, a)$, and a maximum delta value, $\Delta v_{max}(n, m, \ldots, a)$, where n=1 to $N_{components}$, m=1 to $N_{sub-components}(n), \ldots$, and a=1 to $N_{smallest\ components}(n, m, \ldots)$. Such further subdivision of sub-components into smaller and smaller components enables systems with finer and finer tuning resolution and thus higher and higher fidelity, increases modulation accuracy, and can be useful for other purposes. As with components 304 and sub-components 306, the number and size of these smaller components 308 can also be tailored, e.g., to meet specific application requirements, to remain within system implementation limits, to achieve one or more of a variety of system characteristics in areas such as performance (i.e., bit rate), reliability (i.e., bit error rate), system-simplicity, ease-of-use, etc., and/or for many other reasons. When different sizes of these smaller components 308 are employed, minimum and maximum delta values are specified for each smaller component 308 (indexed by a), wherein the minimum delta value for a component, $\Delta v_{min}(n, m, \ldots, a)$, equals the maximum delta value of the preceding component, $\Delta v_{max}(n, m, \ldots, a-1)$, or the minimum delta value of the next higher level component in which the component resides, $\Delta v_{min}(n, m, \ldots)$, and the maximum delta value of a given component, $\Delta v_{max}(n, m, \ldots, a)$, equals the minimum delta value for the following component, $\Delta v_{max}(n, m, \ldots, a+1)$, or the maximum delta value of the next higher level component in which the component resides, $\Delta v_{max}(n, m, \ldots)$. When same sized smaller components 308 are employed, the next higher level components 306 are evenly divided such that $\Delta v_{max}(n, m, \ldots, a)-\Delta v_{min}(n, m, \ldots, a)$ is equal for each smaller component 308 indexed by a of a given next higher level component or for all next higher level components such that all components of a given next higher level component are of the same size, wherein component sizes may vary from next higher level component to next higher level component or all components of all higher level components are of the same size depending on the sizes of the next higher level components and the numbers of components in the next higher level components.

At the top of FIG. 3, pulse characteristic delta value range 302 is depicted that is bounded by endpoints of $\Delta v_0$ 310 and $\Delta v_{max}$ 312. Beneath this illustration an equivalent delta value range 302 is shown that has been subdivided into four components 304 by setting the layout parameter $N_{components}$ to a value of four (4), and the size of each component has been established by setting the minimum and maximum delta values of each component, $\Delta v_{min}(n)$ and $\Delta v_{max}(n)$, where n=1 to 4. An enlargement of the second component 304 is then shown where the component has been subdivided into twenty sub-components 306 by setting the layout parameter $N_{sub-components}(2)$ to a value of twenty (20), and the size of each sub-component 306 has been established by setting the minimum and maximum delta values of the sub-components 308 within component two 304, $\Delta v_{min}(n,m)$ and $\Delta v_{max}(n,m)$, where n=2 and m=1 to 20. As illustrated, there are 20 sub-components 306 in component 304, indexed by n=2, and m=1–20, labeled $\Delta v_{min}(2,1)$ and $\Delta v_{max}(2,20)$.

An enlargement of the eighth sub-component 306 of component two 304 is then shown where the sub-component 306 has been subdivided into ten smaller components 308 by setting the layout parameter $N_{smaller\_components}(2,8)$ to a value of ten (10), and the size of each smaller component 308 has been established by setting the minimum and maximum delta values of the smaller components within sub-component eight 306 of component two 304, $\Delta v_{min}(n,m,l)$ and $\Delta v_{max}(n,m,l)$, where n=2, m=8, and l=1 to 10. As illustrated, there are 10 smaller components 308 in sub-component 306, indexed by n=2, m=8, and l=1 to 10, labeled $\Delta v_{min}(2,8,1)$ and $\Delta v_{max}(2,8,10)$.

It is then shown that these smaller components 308 could be subdivided into x even smaller components (whose size is not shown) using another layout parameter [e.g., $N_{even\_smaller\_components}(2,8,5)=x$], which can be further subdivided, ad infinitum. Also not shown in FIG. 3, are enlargements of the other components 304, sub-components 306, and smaller components 308, which in an exemplary embodiment could also contain twenty sub-components 306, ten smaller components 308, and x even smaller components, respectively.

By subdividing a delta value range layout into levels of smaller and smaller components and by varying or not varying the size of components at different levels, a multitude of different layout permutations can be defined.

It should be noted, however, that although the present exemplary embodiments illustrate various layouts, the invention is not limited to the illustrative examples, and other layouts including, e.g., infinite combinations of similar and different sized components, could also be used within the scope of the present invention. It should also be noted that the pulse characteristics could include any of various temporal, non-temporal, or both temporal and non-temporal characteristics, as will also be recognized by persons skilled in the relevant arts.

B. Specifying Ranges of Delta Values Using Value Range Layouts

Figure 4B:
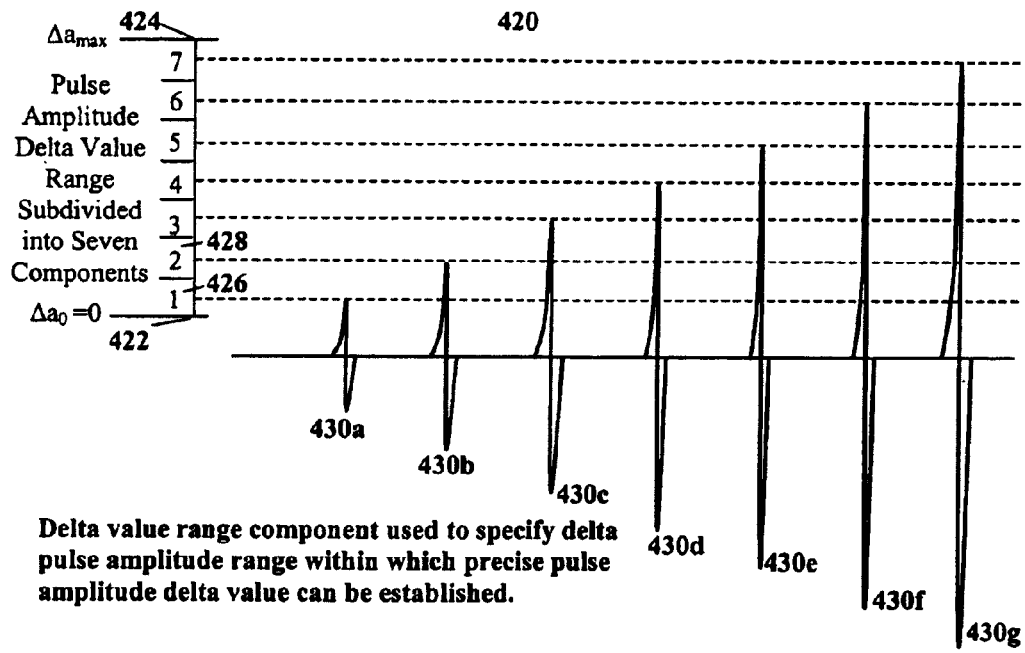
FIG. 4b illustrates an exemplary pulse amplitude delta value range layout of seven exemplary components.
Figure 4C:
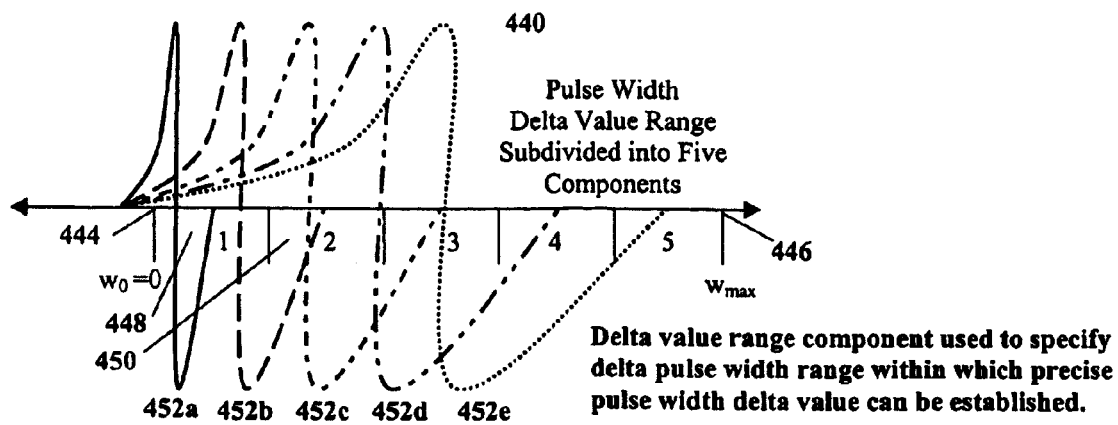
FIG. 4c illustrates an exemplary pulse width delta value range layout of five exemplary components.

FIGS. 4a through 4c illustrate the use of delta value range layouts to specify ranges of time position delta values, pulse amplitude delta values, and pulse width delta values. It will be apparent to those skilled in the art that delta value range layouts can be used to specify delta value ranges for other pulse characteristics in accord with the present invention.

Beginning with FIG. 4a, the figure depicts in an exemplary embodiment a diagram 400 illustrating a delta value range 401 of time position delta values between to 402 and $t_{max}$ 404. The time delta value range 401 has been subdivided into four (4) components (the first two components are labeled 406, 408) that have been subdivided into nine (9) sub-components 410, graphed horizontally. Hence, diagram 400 of FIG. 4a illustrates the delta value range 302 of FIG.

3, graphed horizontally, where the pulse characteristic specifies pulse time position. Each component 406 and sub-component 410 has a minimum time delta value 412 and a maximum time delta value 414 specifying a range of delta time as shown with the enlargement of the fifth sub-component 410 of the second component 408 which has a minimum time delta value 412 of $\Delta t_{min}(2,5)$ and a maximum time delta value 414 of $\Delta t_{max}(2,5)$. When a code element value maps to a component 406, sub-component 410, or smaller component within a time delta value range layout 401, a pulse 416 can be positioned at any time delta value within the delta value range specified by the component 406, sub-component 410, or smaller component. An exemplary embodiment of such mapping to a pulse position is shown in FIG. 4a where a pulse 416 is positioned between $\Delta t_{min}(2,5)$ 412 and $\Delta t_{max}(2,5)$ 414, in this example, approximately halfway in between.

FIG. 4b depicts a diagram 420 illustrating an exemplary embodiment of a range of amplitude delta values from $\Delta a_0$ 422 to $\Delta a_{max}$ 424 that has been subdivided into seven (7) components (the first two components are labeled 426, 428), vertically shown on the left side of diagram 420. Hence, the delta value range 302 of FIG. 3 is shown in diagram 420 of FIG. 4b as a vertical axis, corresponding to an amplitude pulse characteristic. Seven (7) exemplary pulses 430a, 430b, 430c, 430d, 430e, 430f and 430g, are shown in diagram 420 which correspond to representative pulses 430a–430g that could be specified using the layout relative to a some reference pulse amplitude. In an exemplary embodiment, the exact amplitude delta value of each pulse 430a–430g is determined by arbitrarily selecting the approximate middle delta value of the range component to which a code element value (i.e., 1 through 7) would map. It will be apparent to those skilled in the art that alternative delta values to the middle delta value of the delta value range can be similarly used. The exact delta values selected within the components 426, 428 could be any other common offset value or a different offset value for each pulse 430a–430g. The layout could also be further subdivided into smaller components (i.e., not shown) to provide greater value resolution.

FIG. 4c illustrates an exemplary embodiment of diagram 440 depicting a pulse width delta value range between $\Delta w_0$ 444 and $\Delta w_{max}$ 446 that has been subdivided into five (5) components (the first two components are labeled 448, 450) and shows five (5) representative pulses 452 that could be specified using the layout relative to some reference pulse width. Hence, diagram 440 of FIG. 4c illustrates the delta value range 302 of FIG. 3, graphed horizontally, corresponding to a pulse width characteristic. As with the pulse amplitude delta values of FIG. 4b, the pulse width delta values used for the five (5) representative pulses 452a, 452b, 452c, 452d and 452e were arbitrarily selected as the middle delta value within each component 448, 450. As will be apparent to those skilled in the relevant art, alternative values to the middle value of the range can be similarly used.

Referring to FIGS. 4b and 4c, for non-temporal pulse characteristics, delta value range layouts may include positive and negative delta range values. Accordingly, the reference characteristic value to which a non-temporal delta value range layout is relative may reside at any point within the layout.

C. Non-Allowable Regions within Delta Value Range Layouts

The present invention permits the establishment of allowable and non-allowable regions within a delta value range layout. One or more non-allowable regions are regions within a characteristic delta value range layout within which a characteristic value of a pulse is not allowed. A non-allowable region may fully or partially include (or overlay) one or more components, subcomponents or smaller components. A non-allowable region can be based on one or more components within a delta value range layout or can be based relative to a characteristic value of one or more other pulses. For example, a non-allowable region can be defined such that a pulse characteristic delta value cannot be less than a component minimum delta value or greater than a component maximum delta value. Non-allowable regions may also be bounded by minimum and maximum values within a delta value range layout (e.g., a subset of a component, subcomponent, etc.).

Non-allowable regions can be defined relative to other pulse characteristic values. For example, a minimum value difference between pulse characteristic values can be established by defining a non-allowable region about the characteristic value of another pulse such as the preceding pulse, succeeding pulse, or any other pulse. Similarly, a maximum value difference between pulse characteristic values can be established by defining a non-allowable region consisting of all values greater than or less than some difference from the characteristic value of another pulse. Non-allowable regions can also be defined that are bounded by a minimum and maximum difference in value between the characteristic value of the pulse and the characteristic value of another pulse.

Figure 5:
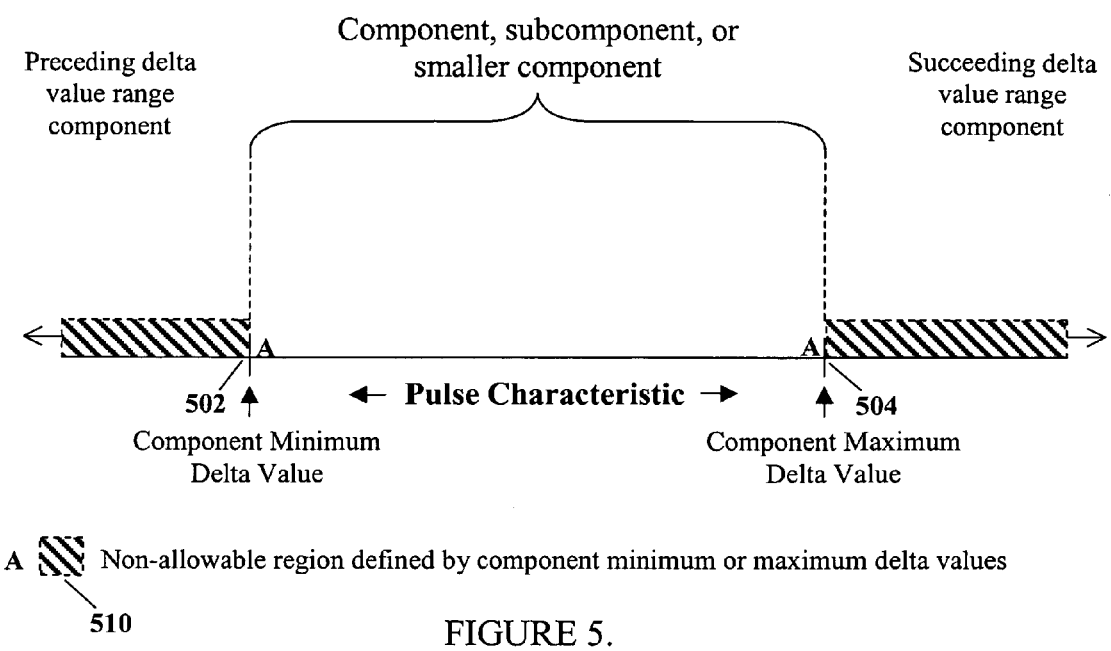
FIG. 5 illustrates a pulse characteristic delta value range layout (temporal or non-temporal) having non-allowable regions defined relative to component delta value limits.

FIG. 5 depicts non-allowable regions within a temporal or non-temporal pulse characteristic delta value range layout. In the top portion of the figure, a component, subcomponent, or smaller component is shown, which is bounded by a minimum delta value 502 and a maximum delta value 504.

Two non-allowable regions 510 are denoted A that are used to facilitate mapping a code element value. The leftmost region consists of all values less than the minimum characteristic delta value of the component to which a code element value is mapped and the rightmost region consists of all values greater than the maximum characteristic delta value of the same component.

FIGS. 6a through 6d depict non-allowable regions within temporal pulse characteristic delta value range layouts.

In FIG. 6a, non-allowable regions relative to a preceding pulse time position are shown. Specifically, a layout relative to a preceding pulse 602 at time position, $t_{k-1}$, is shown, where $t_a$, $t_b$, $t_c$, and $t_d$ are time values relative to the preceding pulse. Because time has an inherent order (i.e., by definition the time position value of the pulse in question succeeds the time position value of the preceding pulse), only those values after the preceding pulse are included in the non-fixed layout.

Four delta values, $\Delta t_a$, $\Delta t_b$, $\Delta t_c$, and $\Delta t_d$, illustrate how the time values can be translated into delta values in which case the time values $t_{k-1}$, $t_a$, $t_b$, $t_c$, and $t_d$ become 0, $\Delta t_a$, $\Delta t_b$, $\Delta t_c$, and $\Delta t_d$.

Three non-allowable regions 606–610, shown shaded with diagonal lines, are defined. The first region 606 enforces a minimum proximity limit, $\Delta t_{min}$, where $\Delta t_k$ cannot reside between 0 and $\Delta t_a$ and therefore $t_k$ cannot reside between $t_{k-1}$ and $t_a$. The second region 608 is bounded by minimum and maximum delta values, such that $\Delta t_k$ cannot reside between $\Delta t_b$ and $\Delta t_c$ and therefore $t_k$ cannot reside between $t_b$ and $t_c$. The third region enforces a maximum proximity limit, $\Delta t_{max}$, where $\Delta t_k$ cannot be greater than or equal to $\Delta t_d$ and therefore $t_k$ cannot be greater than or equal to $t_d$.

In FIG. 6b, non-allowable regions relative to any preceding pulse position are shown. Specifically, FIG. 6b illustrates that the non-allowable regions can be defined the same way relative to any preceding pulse, so that the only difference between FIGS. 6a and 6b is that $t_{k-1}$ becomes $t_{k-n}$.

FIGS. 6c and 6d illustrate that similar non-allowable regions can be defined relative to the succeeding pulse 612 position, $t_{k+1}$, and to any succeeding pulse 612 position, $t_{k+n}$, respectively. In the two figures, the first region 618 enforces a minimum proximity limit, $\Delta t_{min}$, where $\Delta t_k$ cannot reside between $-\Delta t_h$ and 0, and therefore $t_k$ cannot reside between $t_h$ and $t_{k+n}$. The second region 616 is bounded by minimum and maximum delta values, such that $\Delta t_k$ cannot reside between $-\Delta t_f$ and $-\Delta t_g$ and therefore $t_k$ cannot reside between $t_f$ and $t_g$. The third region 614 enforces a maximum proximity limit, $\Delta t_{max}$, where $\Delta t_k$ cannot be less than or equal to $-\Delta t_e$ and therefore $t_k$ cannot be less than or equal to $t_e$.

FIG. 7 illustrates non-allowable regions within a non-fixed non-temporal characteristic value layout relative to any other pulse having some characteristic value, $v_{k\pm n}$. This figure is consistent with (and similar to a combination of) FIGS. 6b and 6d. Here, six non-allowable regions 702–712 are shown with the three leftmost regions 702–706 mirroring the three rightmost regions 708–712. Note the figure is two-sided as opposed to one-sided since a non-temporal characteristic value of a pulse can be less than, greater than, or the same as that of any other pulse.

Non-allowable regions within delta value range layouts may be governed by limitations established on the absolute pulse characteristic values to which the delta value range layout relates. Accordingly, non-allowable regions within a delta value range layout may change as the reference pulse characteristic value to which the delta value range layout is relative changes. For example, if a maximum pulse amplitude value is enforced (e.g., 8 volts) the positive portion of a delta value range layout from −8v to 8v would become non-allowable (i.e., 0v to 8v) if the amplitude of the preceding pulse to which the delta value range layout was relative was 8v (i.e., at the maximum pulse amplitude). Similarly, within the same delta value range layout a non-allowable region from 4v to 8v would be enforced if the amplitude value of the preceding pulse were 4v.

D. Discrete Value Layouts

Figure 8A:
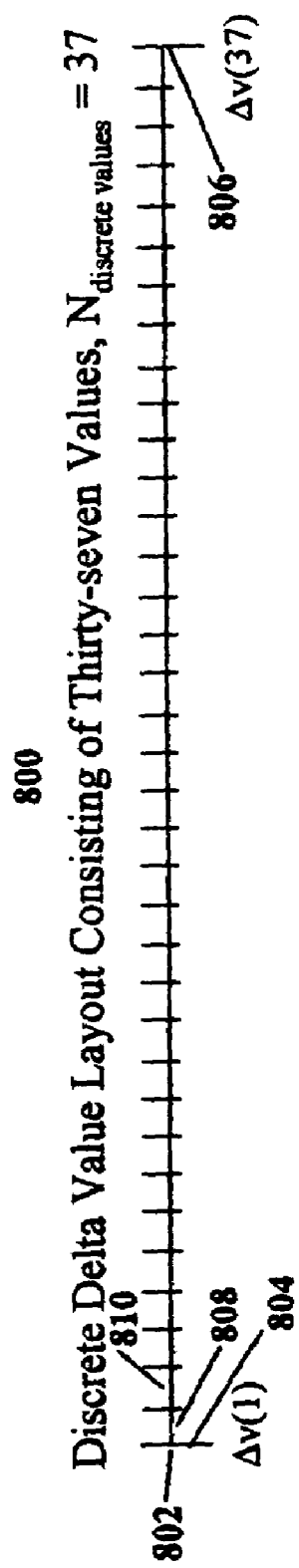
FIG. 8a illustrates an exemplary discrete delta value layout of thirty-seven exemplary evenly distributed delta values including exemplary layout parameters.
Figure 8B:
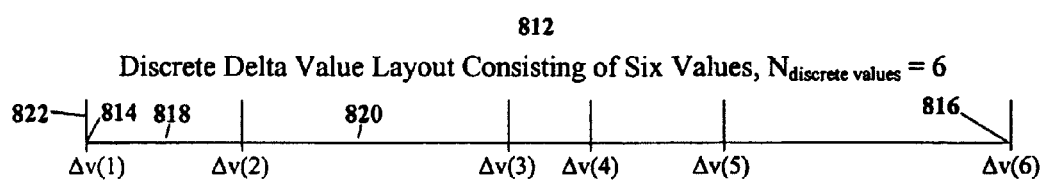
FIG. 8b illustrates an exemplary generic discrete delta value layout of six exemplary non-evenly distributed delta values including exemplary layout parameters.

Another exemplary embodiment of the present invention defines a pulse characteristic delta value layout by specifying a layout of discrete delta values to which individual code elements can map. As depicted in FIGS. 8a and 8b, a layout parameter, $N_{discrete\ values}$ can be specified to identify some number of discrete delta values within a layout 802 having a delta value, $\Delta v(n)$, with an index n, where n=1 to $N_{discrete\ values}$. Discrete delta values may, e.g., be evenly distributed, or not, as depicted in FIGS. 8a and 8b, respectively.

Beginning with FIG. 8a, a diagram 800 illustrates an exemplary embodiment in which thirty-seven (37) evenly-distributed (the first two width values are labeled 808, 810) discrete delta values, $\Delta v(1)$ 804 through $\Delta v(37)$ 806, are shown. In the exemplary embodiment, the number of discrete values 804, 806 within layout 802 is thirty-seven (37) and is referred to as $N_{discrete\ values}=37$.

FIG. 8b depicts, in an exemplary embodiment, a diagram 812 illustrating six (6) non-evenly-distributed (the first two width values are labeled 818 and 820) discrete delta values, $\Delta v(1)$ 814 through $\Delta v(6)$ 816. In the exemplary embodiment, the number of discrete delta values 814, 816 within layout 822 is six (6) and is referred to as $N_{discrete\ values}=6$.

Referring to FIGS. 8a and 8b, for temporal characteristics, $\Delta v(1)$ must be greater than zero since inherently a succeeding pulse occurs at some time after a preceding pulse. However, for non-temporal pulse characteristics, delta values may be positive or negative. Accordingly, the absolute characteristic value to which a non-temporal discrete delta value layout is relative may reside at any discrete value within the layout, e.g., $\Delta v(3)$, in which case $\Delta v(3)=0$.

Figure 9A:
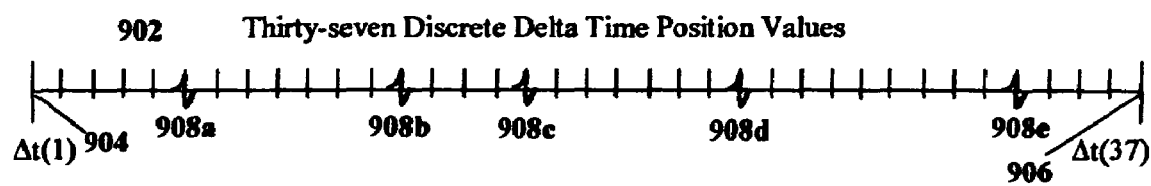
FIG. 9a illustrates an exemplary discrete delta time position value layout.
Figure 9B:
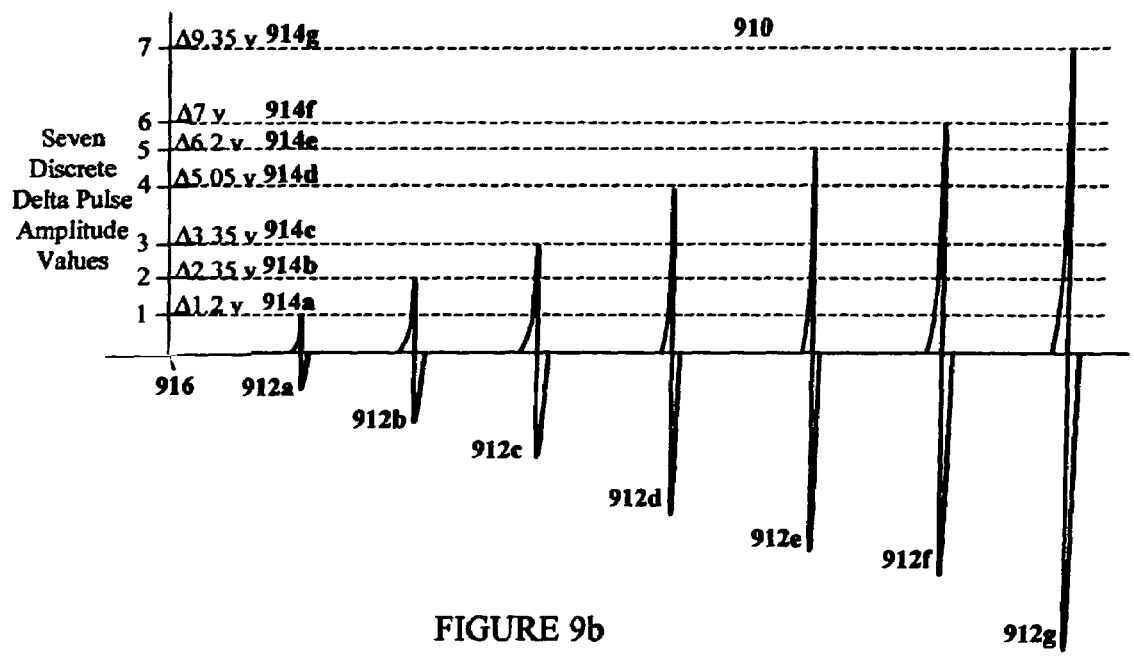
FIG. 9b illustrates an exemplary discrete delta pulse amplitude value layout.
Figure 9C:
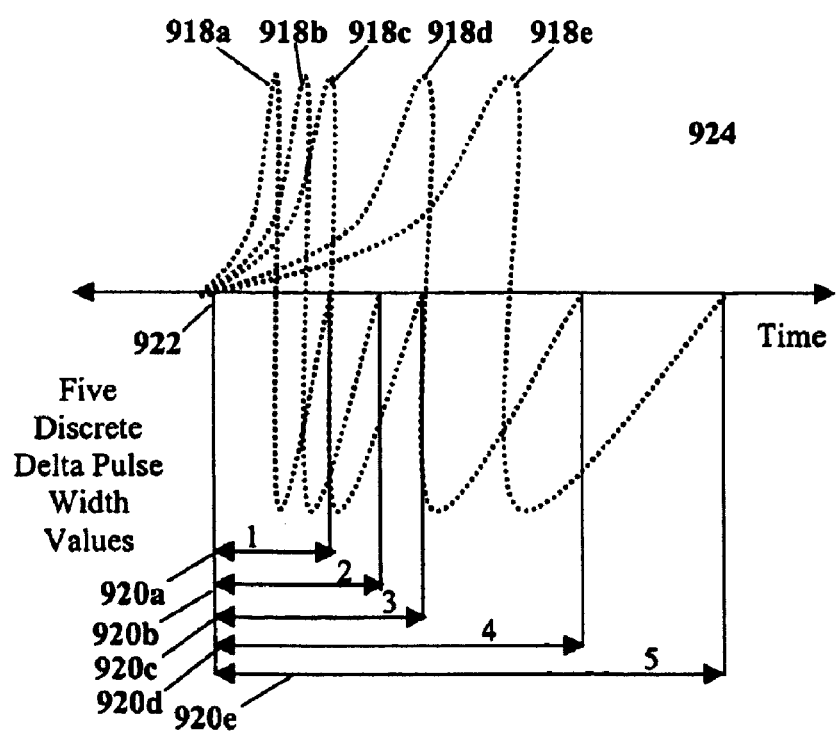
FIG. 9c illustrates an exemplary discrete delta pulse width value layout.

FIGS. 9a through 9c illustratively depict exemplary embodiments of discrete delta value layouts for exemplary temporal and non-temporal pulse characteristics, including, e.g., time position, amplitude, and width pulse characteristics, respectively.

FIG. 9a depicts a diagram 902, illustrating an exemplary embodiment of the invention having thirty-seven (37) discrete time values from $\Delta t(1)$ 904 through $\Delta t(37)$ 906. Diagram 902 includes five (5) representative pulses 908a, 908b, 908c, 908d and 908e, representing placement at five of the 37 time positions from $\Delta t(1)$ 904 through $\Delta t(37)$ 906 relative to a reference position equal to a $\Delta t(1)$ of zero.

FIG. 9b depicts a diagram 910, illustrating an exemplary embodiment of the invention having seven (7) discrete delta values 914a, 914b, 914c, 914d, 914e, 914f and 914g, corresponding to exemplary voltage amplitude delta values, $\Delta 1.2v$, $\Delta 2.34v$, $\Delta 3.35v$, $\Delta 5.05v$, $\Delta 6.2v$, $\Delta 7v$ and $\Delta 9.35v$, respectively. Diagram 910 includes representative pulses 912a, 912b, 912c, 912d, 912e, 912f and 912g, depicted having amplitudes 1.2v–9.35v greater than some reference amplitude 916 (e.g., 0.1v), that correspond to the seven discrete delta values 914a–914g, respectively. Unlike the representative pulses depicted in FIG. 4b, which can have any amplitude delta value within a given delta value range component, the amplitude delta values $\Delta 1.2v$–$\Delta 9.35v$ of discrete pulse amplitude delta values 914a–914g of the seven representative pulses 912a–912g of the exemplary embodiment of FIG. 9b must equal a discrete amplitude delta value.

Similarly to FIG. 9b, FIG. 9c depicts a diagram 924, illustrating an exemplary embodiment of the invention having a layout of five (5) discrete pulse width delta values 920a, 920b, 920c, 920d and 920e, and five (5) representative pulses 918a, 918b, 918c, 918d and 918e. Each pulse 918a–918e has a width that corresponds to the discrete pulse width delta values 920a–920e plus some reference pulse width 922.

E. Non-Allowable Regions within Discrete Delta Value Layouts

As with delta value range layouts, non-allowable regions within discrete delta value layouts may be governed by limitations established on the absolute pulse characteristic values to which the delta value range layout is relative. Accordingly, non-allowable regions within a delta value range layout may change as the reference pulse characteristic value to which the delta value range layout is relative changes. For example, if a maximum pulse amplitude value is enforced (e.g., 8 volts) positive discrete delta values within a delta value range layout having discrete delta values from −8v to 8v would become non-allowable (i.e., 0v to 8v) if the amplitude of the preceding pulse to which the discrete delta value layout was relative was 8v (i.e., at the maximum pulse amplitude). Similarly, within the delta value range layout a non-allowable region from 4v to 8v would be enforce if the amplitude value of the preceding pulse was 4v, and thus any discrete delta values between 4v and 8v would be non-allowable.

F. Combinations of Delta Value Range and Discrete Delta Value Layouts

In one exemplary embodiment of the present invention, the discrete delta value layout embodiments illustrated in FIGS. 8a and 8b, described above, can be combined with an embodiment of a delta value range layout such as, e.g., the layout 401 of FIG. 4a, enabling code element values to specify, e.g., a component 406, 408 within the delta value range layout 401 and a discrete delta value layout within the component 406, 408 (not shown). The use of a combination of the discrete layout and value range layout approaches is shown in FIG. 10.

Figure 10:
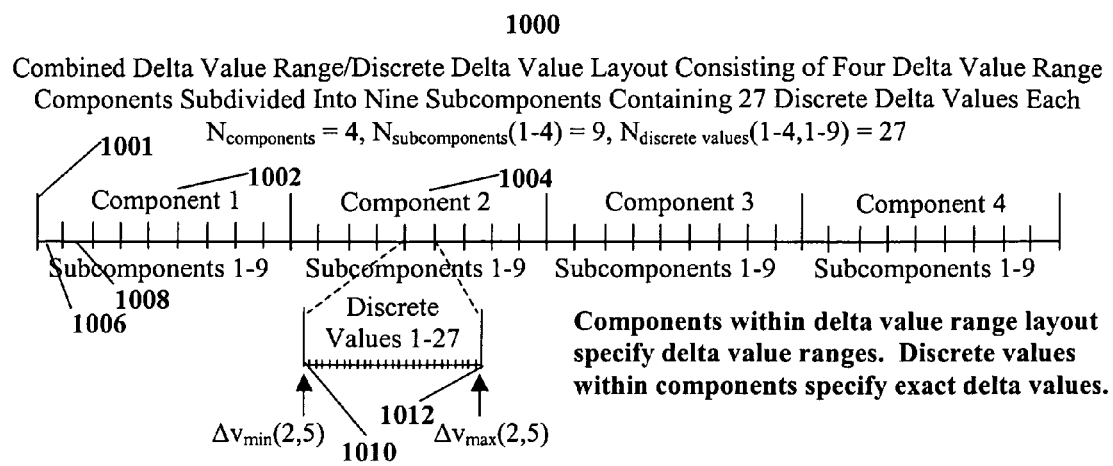
FIG. 10 illustrates an exemplary combined delta value range/discrete delta value layout of four exemplary components subdivided into nine exemplary sub-components containing 27 exemplary discrete delta values each including exemplary layout parameters.

Specifically, FIG. 10 illustratively depicts a diagram 1000 showing an exemplary embodiment of the invention using a combination of a discrete delta value layout similar to the one depicted in FIG. 8a, and a delta value range layout the same as shown in FIG. 4a. Referring now to FIG. 10, a delta value range layout 401 (as shown in FIG. 4a) is subdivided into four (4) components (the first two are labeled 1002, 1004) that are subdivided into nine (9) sub-components (the first two are labeled 1006, 1008). Component 2 1004 is shown with a sub-component 1006 which has been further expanded to illustrate discrete delta values from $\Delta v_{min}(2,5)$ 1010 to $\Delta v_{max}(2,5)$ 1012. Thus, as illustrated, each sub-component 1006 contains 27 discrete delta values. The layout 1001 of the exemplary embodiment of diagram 1000 could, e.g., be specified by setting $N_{components}=4$, $N_{sub-components}(1-4)=9$, and $N_{discrete\ values}(1-4, 1-9)=27$.

III. Code Mapping Approaches

A multitude of exemplary delta code mapping embodiments can be employed in conjunction with pulse characteristic delta value layouts to accommodate pulse transmission system implementation requirements and to optimize system performance for specific applications.

In one exemplary embodiment of the invention, a code element within a delta code may be mapped relative to a characteristic value of any pulse within a pulse train including the immediately preceding pulse, any preceding pulse, the immediately succeeding pulse, or any succeeding pulse. In another embodiment of the invention a code element within a delta code may be mapped relative to some statistical quantity based on characteristic values of a subset of pulses within a pulse train (e.g., an average characteristic value).

According to the present invention, delta codes may be mapped relative to one or more reference values, a reference value may change with each code element, and reference values may change after some number of code elements (e.g., every third code element). FIGS. 11a and 11b depict examples of temporal and non-temporal delta coding where a single code element exists per reference value. In FIG. 1a, diagram 1100 illustrates six temporal delta value layouts 1102a–1102f and six pulse time positions 1104a–1104f specified by six delta values ΔT1–ΔT6 (1106a–1106f), where the first delta value 1106a is mapped to a delta value range layout 1102a that is relative to an initial reference 1108 and the other five delta values 1106b–1106f are mapped to delta value range layouts 1102b–1102f that are relative to the time positions of the preceding pulses. Specifically, ΔT1 1106a indicates a difference in time to the first pulse 1104a on a layout 1102a that is relative to an initial reference time 1108. ΔT2 1106b indicates a difference in time to the second pulse 1104b on a layout 1102b that it is relative to the time position of the first pulse 1104a. ΔT3 1106c indicates a difference in time to the third pulse 1104c on a layout 1102c that is relative to the time position of the second pulse 1104b. ΔT4 1106d indicates a difference in time to the fourth pulse 1104d on a layout 1102d that is relative to the time position of the third pulse 1104c. ΔT5 1106e indicates a difference in time to the fifth pulse 1104e on a layout 1102e that is relative to the time position of the fourth pulse 1104d. ΔT6 1106f indicates a difference in time to the sixth pulse 104f on a layout 1102f that is relative to the time position of the fifth pulse 1104e.

FIG. 11b provides a diagram 1120 that depicts six non-temporal delta value layouts 1122a–1122f and the characteristic values of six pulses 1124a–1124f specified by mapping six delta values ΔV1–ΔV6 (1126a–1126f), where the first delta value 1126a is mapped to a delta value range layout 1122a that is relative to an initial reference value 1128 and the other five delta values 1126b–1126f are mapped to delta value layouts 1122b–1122f that are relative to the characteristic values of the preceding pulses. Similar to FIG. 11a, ΔV1 126a indicates a characteristic value difference to the characteristic value of the first pulse 1124a on a layout 1122a that is relative to an initial reference value 1128. ΔV2 1126b indicates a characteristic value difference to the characteristic value of the second pulse 1124b on a layout 1122b that is relative to the characteristic value of the first pulse 1124a. ΔV3 1126c indicates a characteristic value difference to the characteristic value of the third pulse 1124c on a layout 1122c that is relative to the characteristic value of the second pulse 1124b. ΔV4 1126d indicates a characteristic value difference to the characteristic value of the fourth pulse 1124d on a layout 1122d that is relative to the characteristic value of the third pulse 1124c. ΔV5 1126e indicates a characteristic value difference to the characteristic value of the fifth pulse 1124e on a layout 1122e that is relative to the characteristic value of the fourth pulse 1124d. ΔV6 1126f indicates a characteristic value difference to the characteristic value of the sixth pulse 1124f on a layout 1122f that is relative to the characteristic value of the fifth pulse 1124e. Negative delta values were included in FIG. 11b to illustrate that, as described previously, non-temporal characteristic values do not have an inherent order, as do temporal characteristic values.

FIGS. 12a and 12b depict examples of temporal and non-temporal delta coding where multiple code elements exist per reference value. In FIG. 12a, diagram 1200 illustrates two temporal delta value layouts 1202a and 1202b, and six pulse time positions 1204a–1204f specified by six delta values ΔT1–ΔT6 (1206a–1206f), where the first three delta values 1206a–1206c are mapped to a delta value layout 1202a that is relative to an initial time reference 1208 and the last three delta values 1206d–1206f are mapped to a delta value layout 1202b that is relative to the time position of the third pulse 1204c. Specifically, ΔT1 1206a indicates a difference in time to the first pulse 1204a on a layout 1202a that is relative to an initial reference time 1208. ΔT2 1206b indicates a difference in time to the second pulse 1204b on a layout 1202a that is relative to an initial reference time 1208. ΔT3 1206c indicates a difference in time to the third pulse 1204c on a layout 1202a that is relative to an initial reference time 1208. ΔT4 1206d indicates a difference in time to the fourth pulse 1204d on a layout 1202b that is relative to the time of the third pulse 1204c. ΔT5 1206e indicates a difference in time to the fifth pulse 1204e on a layout 1202b that is relative to the time of the third pulse 1204c. ΔT6 1206f indicates a difference in time to the sixth pulse 1204f on a layout 1202b that is relative to the time of the third pulse 1204c.

FIG. 12b provides a diagram 1220 that depicts three non-temporal delta value layouts 1222a–1222c and the characteristic values of six pulses 1224a–1224f specified by six delta values ΔV1–ΔV6 (1226a–1226f), where the first two delta values 1226a–1226b are mapped to a delta value layout 1224a that is relative to an initial reference value 1228, the third and fourth delta values 1226c–1226d are mapped to a delta value layout 1224*b* that is relative to the characteristic value of the second pulse 1224*b*, and the fifth and sixth delta values 1226*e*–1226*f* are mapped to a delta value layout 1224*c* that is relative to the characteristic value of the fourth pulse 1224*d*. Similar to FIG. 12*a*, ΔV1 1226*a* indicates a characteristic value difference to the characteristic value of the first pulse 1224*a* on a layout 1222*a* that is relative to the initial value reference 1228. ΔV2 1226*b* indicates a characteristic value difference to the characteristic value of the second pulse 1224*b* on a layout 1222*a* that is relative to the initial value reference 1228. ΔV3 1226*c* indicates a characteristic value difference to the characteristic value of the third pulse 1224*c* on a layout 1222*b* that is relative to the characteristic value of the second pulse 1224*b*. ΔV4 1226*d* indicates a characteristic value difference to the characteristic value of the fourth pulse 1224*d* on a layout 1222*b* that is relative to the characteristic value of the second pulse 1224*b*. ΔV5 1226*e* indicates a characteristic value difference to the characteristic value of the fifth pulse 1224*e* on a layout 1222*c* that is relative to the characteristic value of the fourth pulse 1224*d*. ΔV6 1226*f* indicates a characteristic value difference to the characteristic value of the sixth pulse 1224*f* on a layout 1222*c* that is relative to the characteristic value of the fourth pulse 1224*d*. A negative delta value was also included in FIG. 12*b* to again illustrate that, as described previously, non-temporal characteristic values do not have inherent ordering, as do temporal characteristic values.

It should be noted, however, that although the present exemplary embodiments illustrating multiple code elements per reference maintained a constant code element per reference ratio (i.e., 3-to-1 and 2-to-1, respectively), the code element ratio per reference ratio can be varied without departing from the scope of the present invention, as will be apparent to those skilled in the relevant art.

A code specifying pulse characteristic can include elements having, e.g., integer or floating-point numbers. The integer or floating-point numbers can map to characteristic delta values within defined characteristic layouts. In an exemplary embodiment, the value of each integer code element or the non-fractional part of each floating-point code element value can identify a component, sub-component or smaller component (or even smaller component, calculated ad infinitum) corresponding to a range of characteristic delta values within a defined layout.

In an exemplary embodiment, the numbering scheme used for a code must be consistent with the numbering scheme used for the defined characteristic layout. The use of a consistent numbering scheme can allow mapping of code element values to delta values within the layout. For example, components within a delta value range layout or delta values within a discrete delta value layout can be numbered beginning with zero, one, or any other number. Components produced by subdividing higher level components, such as, e.g., sub-components or smaller components, can be numbered per higher level component such that sub-component numbering can begin again with each higher level component, or alternatively can be numbered in sequence independent of the higher level component in which they reside.

In an exemplary embodiment, once an integer value or non-fractional part of a floating-point value has been used to map to a delta value range corresponding to, e.g., a component, sub-component, or smaller component (or even a smaller component, ad infinitum), an established offset value can be used to specify the exact characteristic delta value within the component, sub-component, or smaller component. An absolute offset value can be used to specify an exact characteristic delta value that is a common value difference from the minimum characteristic delta values of the components, sub-components, or smaller components to which code elements are mapped.

Alternatively, in another exemplary embodiment, a relative position offset value can be used to specify an exact characteristic delta value that is a fraction of the difference between the minimum and maximum characteristic delta values of the components, sub-components, or smaller components (or even smaller components, ad infinitum) to which code elements are mapped. For floating-point codes, the fractional part of each floating-point code element can be used to specify the relative offset used to specify an exact characteristic delta value that is a fraction of the difference between the minimum and maximum characteristic delta values of the component, sub-component, or smaller component (or even smaller component, calculated ad infinitum) to which the non-fractional part of the floating-point code element is mapped.

Figure 13A:
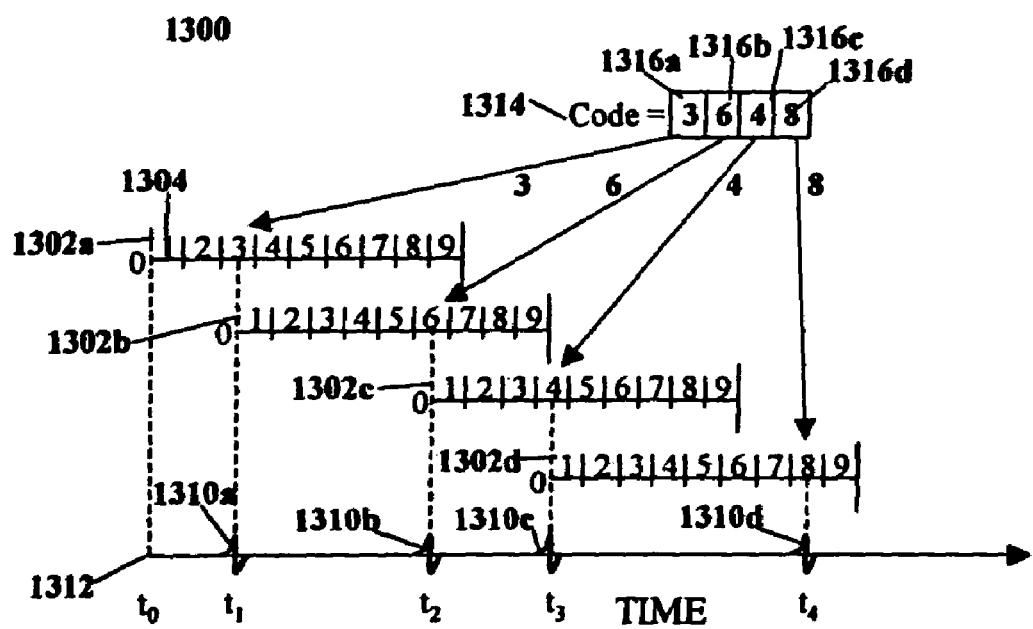
FIG. 13a illustrates an exemplary delta code mapping approach, depicting exemplary pulses mapped to exemplary time position delta value range layouts based on integer code element values of a code, where one integer code element exists per reference, layouts are relative to an initial reference position or to the previous pulse position, and pulse positions are further specified using an absolute or relative offset value.
Figure 13B:
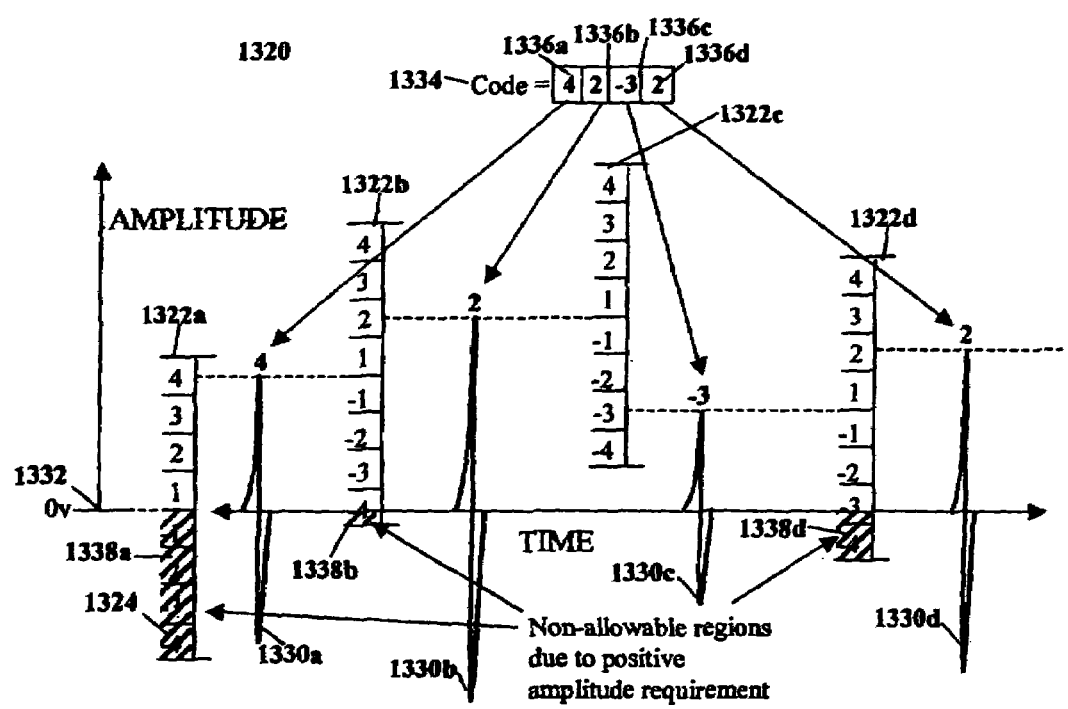
FIG. 13b illustrates an exemplary delta code mapping approach, depicting exemplary pulses mapped to exemplary amplitude delta value range layouts based on integer code element values of a code, where one integer code element exists per reference, layouts are relative to an initial reference amplitude or to the previous pulse amplitude, and pulse amplitude values are further specified using an absolute or relative offset value.

Unlike integer codes, where an absolute or relative offset value can be used to specify exact characteristic delta values in a common manner, the fractional portions of floating-point values can vary per code element. The variance of fractional portions of floating-point values per code element, allows each pulse characteristic value to be established independent of other pulse characteristic values. FIG. 13*a* through FIG. 13*c* below, illustrate an exemplary embodiment of the component numbering and code mapping embodiments involving integer code element values mapping to delta value range layouts.

FIG. 13*a* depicts a diagram 1300 of an exemplary embodiment illustrating pulses 1310*a*–1310*d* mapped to positions within (in the exemplary embodiment) components 1304 numbered one through nine (1–9) within delta value range layouts 1302*a*–1302*d* shown relative to an initial reference 1312 and to preceding pulse position values 1310*a*–1310*c*. Diagram 1300 includes a delta code 1314 of integer code elements 1316*a*–1316*d* that map to the four layouts 1302*a*–1302*d*. Each integer code element 1316*a*–1316*d* is, for example, mapped to a component 1304 within its corresponding layout. Specifically, the first code element value 1316*a* maps to the third component 1304 of the first delta value range layout 1302*a* that is relative to the initial reference 1312. The second code element value 1316*b* maps to the sixth component 1304 of the second delta value range layout 1302*b* that is relative to the first pulse position 1310*a*. The third code element value 1316*c* maps to the fourth component 1304 of the third delta value range layout 1302*c* that is relative to the second pulse position 1310*b*. The fourth code element value 1316*d* maps to the eighth component 1304 of the fourth delta value range layout 1302*d* that is relative to the third pulse position 1310*c*. The exact positions of the pulses 1310*a*–1310*d* within the components 1304 specified by integer codes 1316*a*–1316*d* can be determined using, e.g., an absolute, or a relative position offset value. An offset equal to approximately half of a delta value range component was used in the figure. Note that FIG. 13*a* provides an example of employing a delta value range layout with the single code element per reference temporal delta coding approach described above and illustrated in FIG. 11*a*.

FIG. 13*b* depicts a diagram 1320 of an exemplary embodiment illustrating pulses 1330*a*–1330*d* mapped to amplitude values within (in the exemplary embodiment) components 1324 numbered −4, −3, −2, −1, 1, 2, 3, 4 within delta value range layouts 1322*a*–1322*d* shown relative to an initial value reference 1332 and to preceding pulse amplitude values 1330a–1330c. Diagram 1320 includes a delta code 1334 of integer code elements 1336a–1336d that map to the four layouts 1322a–1322d. Each integer code element 1336a–1336d is, for example, mapped to a component 1324 within its corresponding layout. Specifically, the first code element value 1336a maps to the eighth component 1324 of the first delta value range layout 1322a that is relative to the initial reference 1332. The second code element value 1336b maps to the sixth component 1324 of the second delta value range layout 1322b that is relative to the first pulse amplitude value 1330a. The third code element value 1336c maps to the second component 1324 of the third delta value range layout 1322c that is relative to the second pulse amplitude value 1330b. The fourth code element value 1336d maps to the sixth component 1324 of the fourth delta value range layout 1322d that is relative to the third pulse amplitude value 1330c. The exact delta amplitude values of the pulses 1330a–1330d within the components 1324 specified by integer codes 1336a–1336d can be determined using, e.g., an absolute, or a relative position offset value. An offset equal to approximately half of a delta value range component was used in the figure. Three non-allowable regions 1338a, 1338b, 1338d, shown shaded with diagonal lines, are defined due to a requirement that pulse amplitude be a positive value. The non-allowable region 1338a within the first delta value range layout 1322a encompasses the first four components 1324 that would map to amplitude values less than zero. The non-allowable region 1338b within the second delta value range layout 1322b encompasses a portion of the first component 1324 that would map to amplitude values less that zero. The non-allowable region 1338d within the fourth delta value range layout 1322d encompasses the first component 1324 and a portion of the second component 1324 that would map to amplitude values less than zero. Note that FIG. 13b provides an example of employing a delta value range layout with the single code element per reference non-temporal delta coding approach described above and illustrated in FIG. 11b.

Figure 14A:
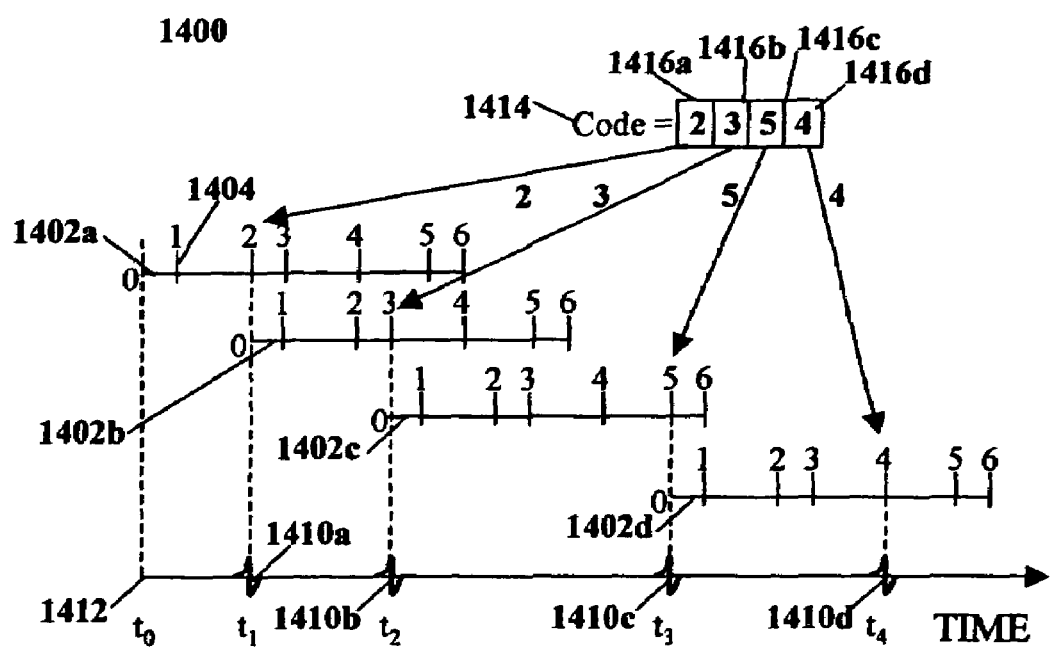
FIG. 14a illustrates an exemplary delta code mapping approach, depicting exemplary pulses mapped to exemplary time position discrete delta value layouts based on integer code element values of a code, where one integer code element exists per reference and layouts are relative to an initial reference position or to the previous pulse.
Figure 14B:
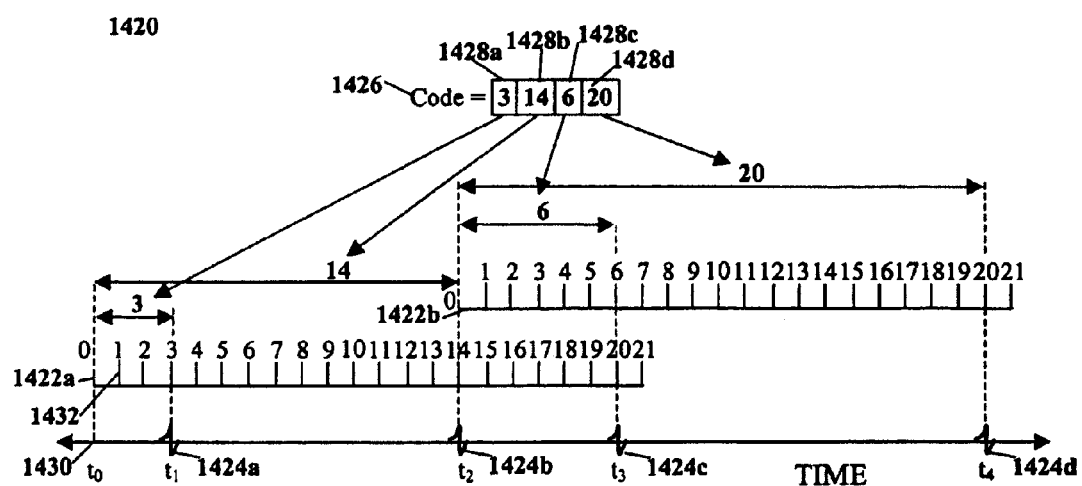
FIG. 14b illustrates an exemplary delta code mapping approach, depicting exemplary pulses mapped to values within exemplary time position discrete delta value layouts based on integer code element values of a code, where two integer code elements exist per reference and layouts are relative to an initial reference position or to the second pulse position.
Figure 14C:
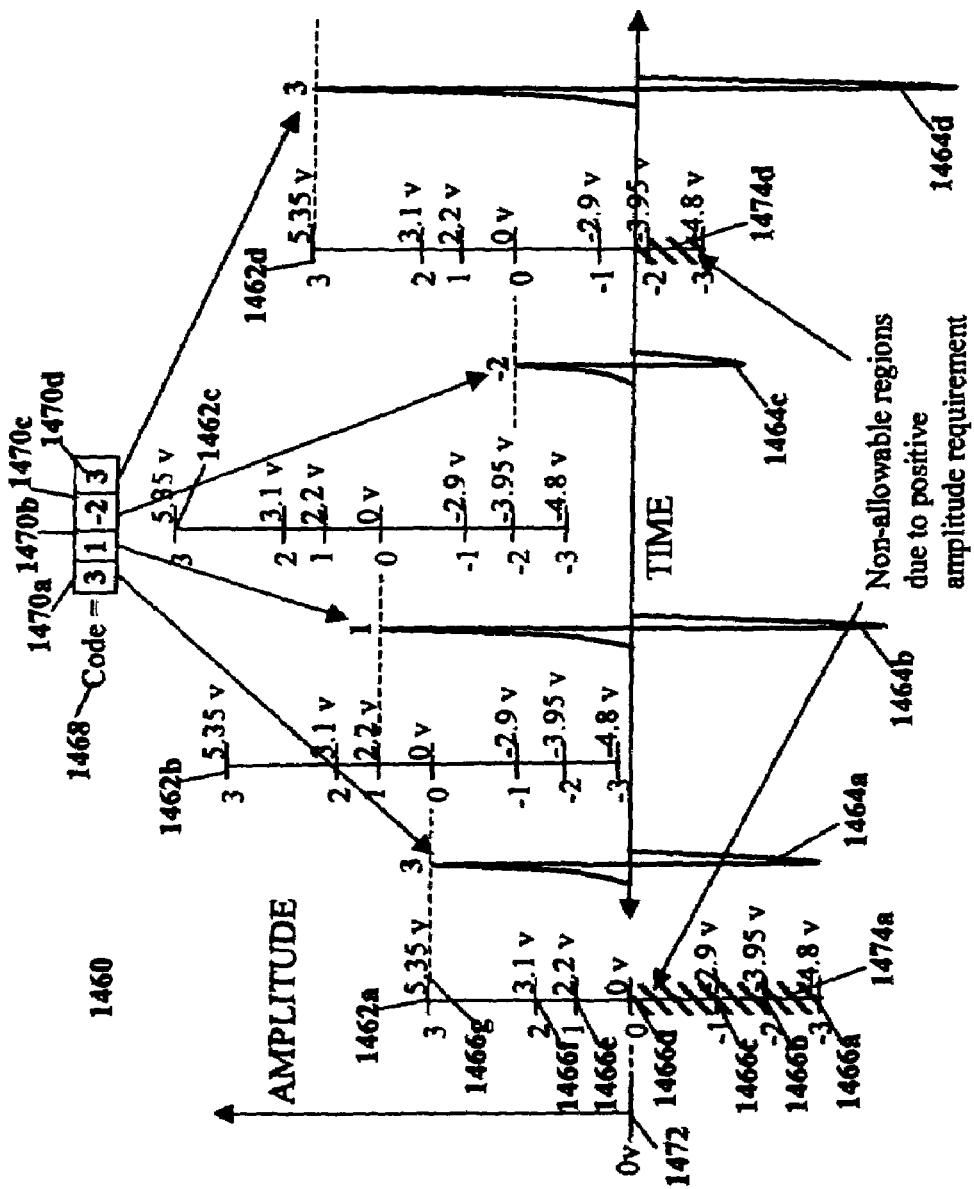
FIG. 14c illustrates an exemplary delta code mapping approach, depicting exemplary pulses mapped to exemplary amplitude discrete delta value layouts based on integer code element values of a code, where one integer code element exists per reference and layouts are relative to an initial reference amplitude or to the previous pulse amplitude.

FIG. 14a through FIG. 14c below, illustrate an exemplary embodiment of the component numbering and code mapping embodiments involving integer code element values mapping to discrete delta value layouts.

FIG. 14a depicts a diagram 1400 of an exemplary embodiment illustrating pulses 1410a–1410d mapped to positions within (in the exemplary embodiment) discrete delta values 1404 numbered one through six (1–6) within discrete delta value layouts 1402a–1402d shown relative to an initial time reference 1412 and to preceding pulse values 1410a–1410c. Diagram 1400 includes a delta code 1414 of integer code elements 1416a–1416d that map to the four layouts 1402a–1402d. Each integer code element 1416a–1416d is, for example, mapped to a discrete delta value 1404 within its corresponding layout. Specifically, the first code element value 1416a maps to the second discrete value 1404 of the first discrete delta value layout 1402a that is relative to the initial reference 1412. The second code element value 1416b maps to the third discrete value 1404 of the second discrete delta value layout 1402b that is relative to the first pulse position 1410a. The third code element value 1416c maps to the fifth discrete value 1404 of the third discrete delta value layout 1402c that is relative to the second pulse position 1410b. The fourth code element value 1416d maps to the fourth delta value 1404 of the fourth discrete delta value layout 1402d that is relative to the third pulse position 1410b. Note that FIG. 14a provides an example of employing a discrete delta value layout with the single code element per reference temporal delta coding approach described above and illustrated in FIG. 11a.

FIG. 14b depicts diagram 1420 including an exemplary embodiment of the invention illustrating pulses 1424a–1424d mapped to discrete time position values (1432) within two temporal discrete delta value layouts 1422a and 1422b, each numbered 1–21. Layout 1422a is relative to an initial time reference 1430 and layout 1422b is relative to the second pulse position 1424b. With this embodiment, integer code element values 1428a–1428d of a delta code 1426 specify discrete values where the first and second code elements are mapped to the first layout 1422a that is relative to an initial reference 1430, and the third and fourth code elements are mapped to the second layout 1422b that is relative to the position of the second pulse 1424b. Specifically, the first code element 1428a indicates the number of discrete values 1432 from the initial reference 1430 at which to position the first pulse 1424a. Similarly, the second code element 1428b indicates the number of discrete values 1432 from the initial reference 1430 at which to position the second pulse 1424b. After positioning the second pulse the reference changes to the position of the second pulse 1424b. The third code element 1428c indicates the number of discrete values 1432 from the second pulse position 1424b at which to position the third pulse 1424c. Similarly, the fourth code element 1428d indicates the number of discrete values 1432 from the second pulse position 1424b at which to position the fourth pulse 1424d. Note that FIG. 14b provides an example of employing a discrete delta value layout with the multiple code elements per reference temporal delta coding approach described above and illustrated in FIG. 12a.

FIG. 14c depicts a diagram 1460 including an exemplary embodiment of the invention illustrating code elements 1470a–1470d of a code 1468 mapped to discrete amplitude delta values 1466a–1466g within discrete value layouts 1462a–1462d. With this embodiment, integer code element values 1470a–1470d specify discrete values 1466a–1466g within layouts 1462a–1462d, where the first layout 1462a is relative to an initial reference amplitude 1472, e.g., zero volts, and the remaining layouts 1462b–1462d are relative to the amplitude of the preceding pulses 1464a–1464c. In the exemplary embodiment, an integer code element 1470a–1470d exists per pulse 1464a–1464d. Specifically, the first code element 1470a indicates the discrete delta value within the first layout 1462a specifying a delta amplitude value 1466g of 5.35v from an initial reference 1472 of zero volts and thereby specifying the amplitude of the first pulse as 5.35v. The second code element 1470b indicates the discrete delta value within the second layout 1462b specifying a delta amplitude 1466e of 2.2v relative to the amplitude of the first pulse 1464a and thereby specifying the amplitude of the second pulse 1464b as 7.55v (i.e., 5.35v+2.2v). The third code element 1470c indicates the discrete delta value within the third layout 1462c specifying a delta amplitude 1466b of −3.95v relative to the amplitude of the second pulse 1464b and thereby specifying the amplitude of the third pulse 1464c as 3.6v (i.e., 7.55v−3.95v). The fourth code element 1470d indicates the discrete delta value within the fourth layout 1462d specifying a delta amplitude 1466g of 5.35v relative to the amplitude of the third pulse 1464c and thereby specifying the amplitude of the fourth pulse 1464d as 8.95v (i.e., 3.6v+5.35v). Two non-allowable regions 1474a and 1474d, shown shaded with diagonal lines, are defined due to a requirement that pulse amplitude be a positive value. The non-allowable region 1474a within the first discrete delta value layout 1462a encompasses the first four discrete values 1466a–1466d that would map to amplitude values less than or equal to zero. The non-allowable region 1474d within the fourth discrete delta value layout 1462d encompasses the first two discrete values 1466a and 1466b that would map to amplitude values less than zero. Note that FIG. 14c provides an example of employing a discrete delta value layout with the single code element per reference non-temporal delta coding approach described above and illustrated in FIG. 11b.

Figure 15A:
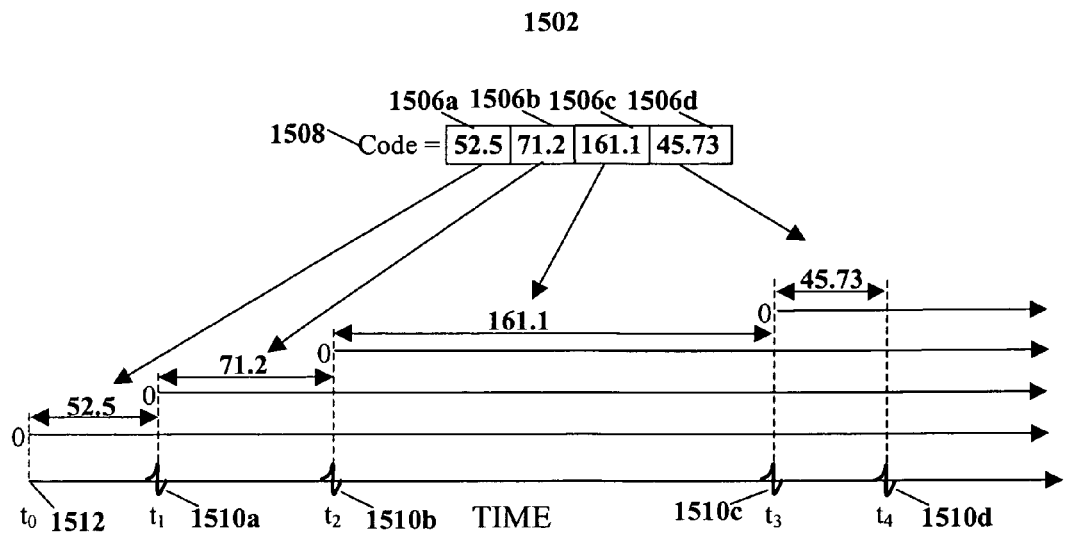
FIG. 15a illustrates exemplary mapping pulses to positions within an exemplary time position delta value range layout based on exemplary floating-point code element values of a code via an exemplary single code element per reference temporal delta coding approach.
Figure 15B:
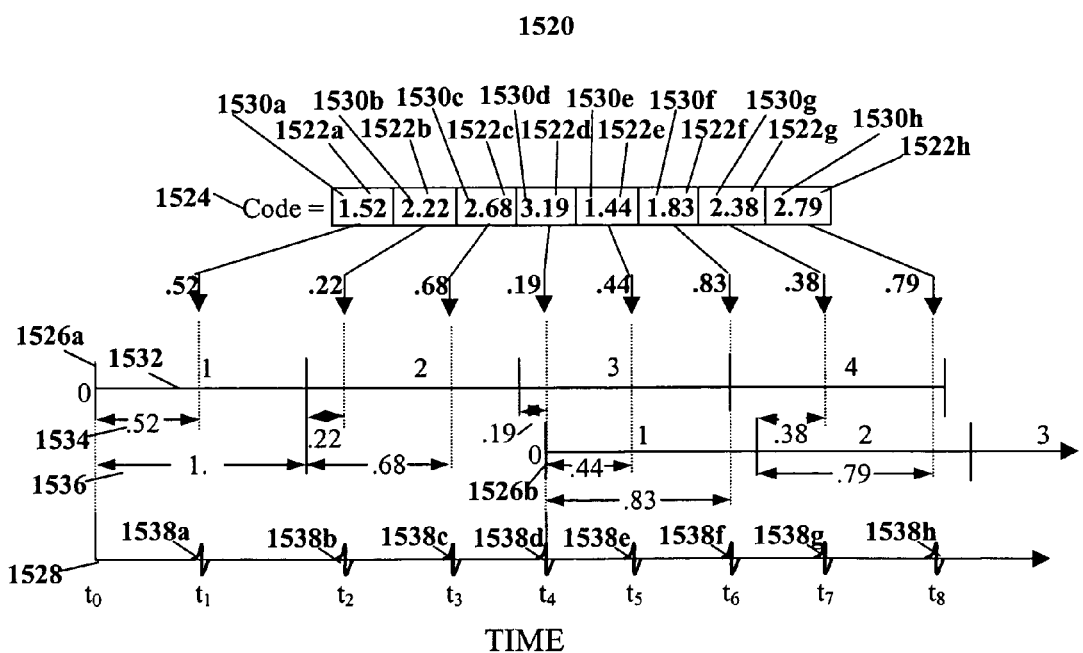
FIG. 15b illustrates an exemplary diagram depicting mapping pulses to components within an exemplary temporal delta value range layout using the non-fractional part of a floating point code element value of a code and mapping pulses to exemplary positions within components using the fractional part of the floating-point code element values via an exemplary multiple code element per reference temporal delta coding approach.
Figure 15C:
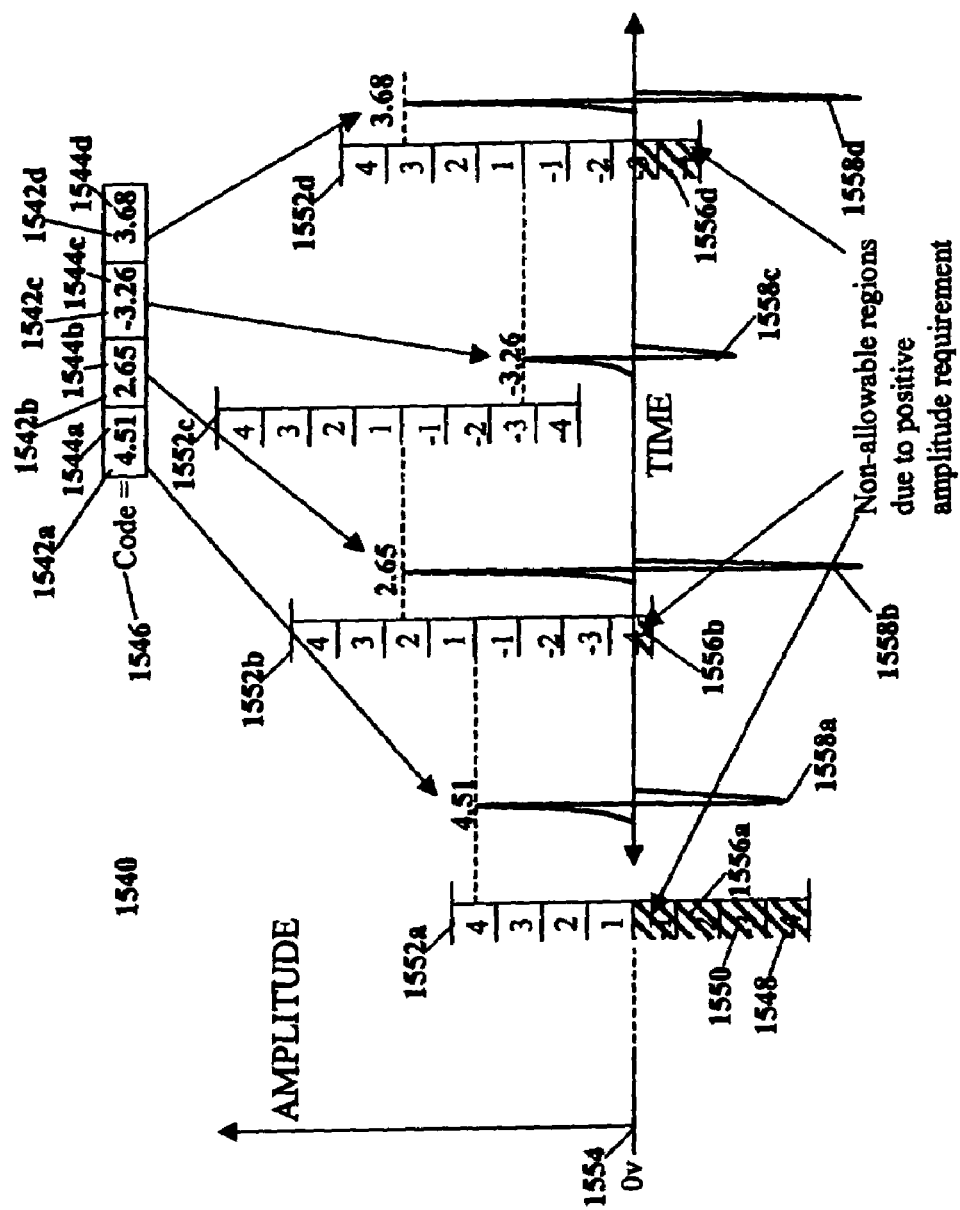
FIG. 15c illustrates an exemplary diagram depicting mapping pulse amplitudes to components within exemplary pulse amplitude delta value range layouts using the non-fractional part of a floating point code element value and mapping to exemplary exact amplitude delta values within components using the fractional part of the floating-point code element values via an exemplary single code element per reference non-temporal delta coding approach.

FIGS. 15a through 15c depict three exemplary embodiments of the invention illustrating methods mapping floating-point code element values to delta value range layouts. FIG. 15a depicts a diagram 1502 including an exemplary embodiment illustrating each floating-point code element value 1506a–1506d (collectively 1508) mapping a pulse 1510a–1510d to a position in time (as shown). With this embodiment, floating-point code element values 1506a–1506d of a code 1508 specify differences in time between consecutive pulses where the first code element 1506a is relative to an initial reference 1512, and the remaining code elements 1506b–1506d are relative to the preceding pulse position. Specifically, assuming nanosecond time units, the first pulse 1510a is positioned 52.5 nanoseconds after the initial time reference 1512, the second pulse 1510b is positioned 71.2 nanoseconds after the first pulse 1510a, the third pulse 1510c is positioned 161.1 nanoseconds after the second pulse 1510b, and the fourth pulse 1510d is positioned 45.73 nanoseconds after the third pulse 1510c.

FIG. 15b depicts a diagram 1520 including an exemplary embodiment of the present invention illustrating the non-fractional part 1530a–1530h and fractional part 1522a–1522h of each floating-point code element value of the code 1524 mapping a pulse 1538a–1538h, respectively, to a position in time per one of two delta value range layouts. With this embodiment, the first four code elements map to a delta value range layout 1526a relative to an initial reference 1528 of zero and the last four code elements map to a delta value range layout 1526b relative to the position in of time of the fourth pulse 1530d. In an exemplary embodiment of the invention, the non-fractional part of each code element value 1530 indicates the component 1532 within the given delta value range layout 1526 to which the code element is mapped. The fractional part of each code element value 1522 indicates a fraction 1534 of the distance 1536 in time between the minimum and time values of the component 1532 specified by the non-fractional part of the code element value 1530 at which to place a pulse 1538. Note that FIG. 15b provides an example of employing a delta value range layout with the multiple code elements per reference temporal delta coding approach described above and illustrated in FIG. 12a.

FIG. 15c depicts diagram 1540 illustrating non-fractional portions 1542a–1542d and fractional portions 1544a–1544d of each floating-point code element value of the code 1546 mapping a pulse 1558a–1558d to an amplitude value per one of four delta value range layouts 1552a–1552d. With this embodiment, the non-fractional portion of the first floating-point code element value 1542a maps to a delta value range layout 1552a that is relative to an initial value reference 1554 of zero, and the non-fractional portion of the last three floating-point code element values 1542b–1542d map to delta value layouts 1552b–1552d that are relative to the amplitude value of the preceding pulse. Diagram 1540 also includes fractional portions 1544a–1544d of each floating-point code element specifying the fractional difference between the minimum and maximum amplitude values of each mapped component 1548 used to determine the exact amplitude value for a pulse 1558a–1558d. Specifically, the non-fractional part of the first code element 1542a indicates the fourth component 1548 from the initial reference value 1554 and thereby specifies the eighth component in the layout 1552a. The fractional part of the first code 1544a specifies that the first pulse amplitude be at a value that is 51 percent of the eighth component. The non-fractional part of the second code element 1542b indicates the second component 1548 from the amplitude value of the first pulse 1558a and thereby specifies the sixth component in the layout 1552b. The fractional part of the second code 1544b specifies that the second pulse amplitude be at a value that is 65 percent of the sixth component 1548. The non-fractional part of the third code element 1542c indicates a delta of minus three components 1548 relative to the amplitude of the second pulse 1554b and thus specifies the second component 1548 in the layout 1552c. The fractional part of the third code 1544c specifies that the third pulse amplitude be at a value that is 26 percent of the second component 1548. The non-fractional part of the fourth code element 1542d indicates a delta of three components 1548 from the amplitude of the third pulse 1554c and thus specifies the seventh component 1548 in the layout 1552d. The fractional part of the fourth code 1544d specifies that the fourth pulse amplitude be at a value that is 68 percent of the seventh component 1548. Three non-allowable regions 1556a, 1556b, and 1556d, shown shaded with diagonal lines, are defined because of a requirement that pulse amplitude be a positive value. The non-allowable region 1556a within the first delta value range layout 1552a encompasses the first four components 1548 that would map to amplitude values less than or equal to zero. The non-allowable region 1556b within the second delta value range layout 1552b encompasses a portion of the first component 1548 that would map to amplitude values less than or equal to zero. The non-allowable region 1556d within the fourth discrete delta value layout 1552d encompasses the first component 1548 and the portion of the second component 1550 that would map to amplitude values less than or equal to zero. Note that FIG. 15c provides an example of employing a delta value range layout with the single code element per reference non-temporal delta coding approach described above and illustrated in FIG. 11b.

The exemplary code mapping embodiments shown in FIGS. 15a through 15c can be applied at any component, sub-component, smaller component, even smaller component, ad infinitum, level defined within a delta value range layout.

IV. Delta Code Generation

After the characteristic layout and code mapping approach have been established, a code is generated using a delta code generation technique as described below. It will be recognized, by those skilled in the art, that the described delta code generation may be applied to temporal and non-temporal pulse characteristics.

FIGS. 16a and 16b depict typical pulse shapes used in UWB transmission systems. Specifically, a first pulse shape 1602 and a second pulse shape 1604 are illustrated.

Figure 17A:
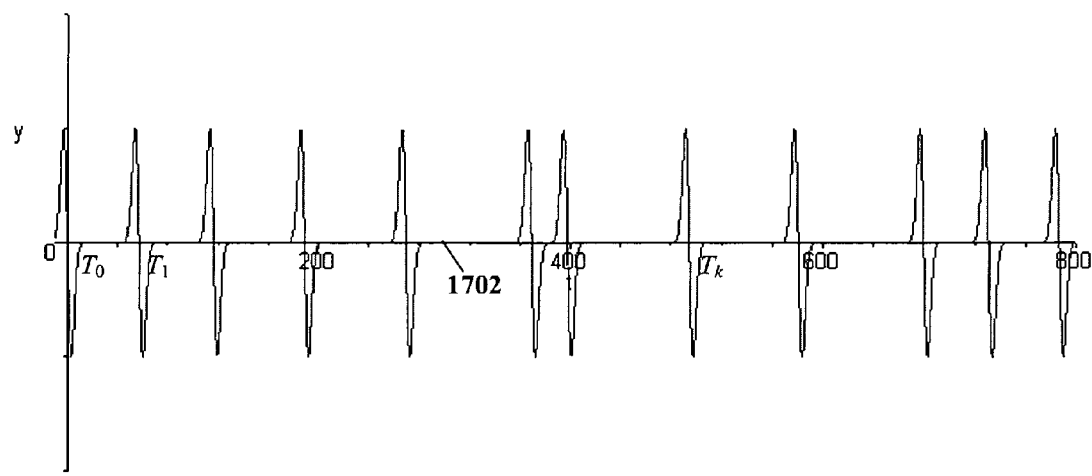
FIG. 17a illustrates a typical UWB pulse train of doublet waveforms.
Figure 17B:
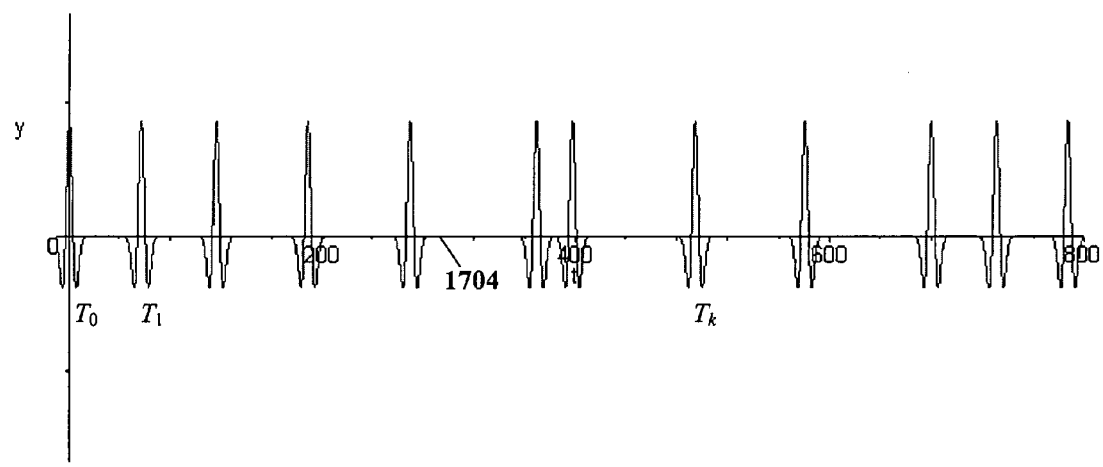
FIG. 17b illustrates a typical UWB pulse train of triplet waveforms.

FIGS. 17a and 17b depict two time-coded pulse trains, which are sequences of such pulses transmitted according to a time-hopping code $C=(T_k, 0 \leq k \leq N-1)$. The first pulse train 1702 comprises pulses 1602, while the second pulse train 1704 comprises pulses 1604. The length of the time-hopping code for both pulse trains is N, and the values $T_k$ specify the transmission times of the individual pulses in the time-coded pulse train.

For the purposes of this discussion, the length N of the time-hopping code C can either be finite or infinite. If N is finite, the code is presumed to repeat after a finite time T, where $T > T_{N-1}$. Infinite-length codes do not occur in practice, of course, but serve as useful models for repeating codes with very long repeat periods, as well as for long codes that are generated dynamically during transmission.

The difference sequence $\Delta C = (\Delta T_k = T_k - T_{k-1}, 1 \leq k \leq N-1)$ represents the inter-pulse times, i.e. the time delays between the transmissions of successive pulses in the time-coded pulse train. Note that since $T_k = T_{k-1} + \Delta T_k$, the time-hopping code C is completely specified by an initial time $T_0$, a difference sequence $\Delta C$, and in the case of repeating codes, a repeat time T:

$$T_k = T_0 + \sum_{j=1}^{k} \Delta T_j, 0 \leq k \leq N-1$$

Thus the difference sequence effectively specifies the time positioning of the kth pulse relative to the previous pulse, through the relation $T_k = T_{k-1} + \Delta T_k$. In one embodiment, the method of the present invention is to design time-hopping codes by constructing difference sequences in certain specific ways. Time-hopping codes produced in these ways will be referred to as one type of delta codes.

The second-order difference sequence, $\Delta^2 C = (\Delta^2 T_k = T_k - T_{k-2}, 2 \leq k \leq N-1)$, specifies the distance between non-adjacent pulse pairs which have one intervening pulse between them. Similarly, the $r^{th}$ order difference sequence $$\Delta^r C = (\Delta^r T_k = T_k - T_{k-r}, r \leq k \leq N-1)$$

specifies the distance between non-adjacent pulse pairs which have r-1 intervening pulses between them. These higher order difference sequences can be used to position a pulse relative to not only the preceding pulse, but relative to some or all of the preceding pulses. These sequences can also be used to position pulses with respect to succeeding, as well as preceding pulses, although such "temporal look-ahead" methods obviously must be done off-line.

Any design methodology for time-hopping codes must take into account several attributes and parameters that are desirable for codes used in impulse radar, communication, and positioning systems. Among these attributes are (1) flat frequency response of the time-hopping codes, (2) steeply peaked auto-correlation with small side-lobes, (3) flexibility in controlling the inter-pulse times, (4) flexibility in controlling the length of the code, and (5) the ability to adjust the average Pulse Repetition Frequency (PRF). These parameters affect numerous system properties, including susceptibility to interference, probability of interception, and data throughput. In additions, hardware limitations make flexibility in adjusting these parameters essential for constructing workable impulse radar/com/positioning systems.

Each of the above-mentioned parameters can be related back to the difference sequence $\Delta C$ associated with the time-hopping code C. For instance, the power-spectral density function of the time-hopping code (defined as the squared-magnitude of the Fourier transform of a sequence of unit impulses transmitted at the times specified by the time-hopping code) is $$S(\omega) = S(\omega, \Delta C) = N + 2 \sum_{j=0}^{N-1} \sum_{k=j+1}^{N-1} \cos\left(\omega \sum_{l=j+1}^{k} \Delta T_l\right).$$

The auto-correlation function of the code can be found through an inverse Fourier transform of the above power-spectral density function. Control over the inter-pulse times can be achieved in many ways. For instance, a constraint of the form $$t_{low} \leq \Delta T_k \leq t_{high}$$

is easily implemented at code design-time, and ensures that no two pulses are ever closer than $t_{low}$ in time, nor further apart than $t_{high}$. Such a constraint also guarantees a PRF that is between $PRF_{low} = t_{high}^{-1}$ and $PRF_{high} = t_{low}^{-1}$. There are additional ways of controlling the PRF through the difference sequence, such as by controlling the average value of the $\Delta T_k$'s that form the difference sequence. The current invention addresses all these parameters through the construction of the difference sequences used to generate the time-hopping code.

Delta coding techniques can be applied to non-temporal characteristics as well as temporal ones. For instance, the amplitude, width, or polarity of a given pulse may be specified in terms of a previous or succeeding pulse or pulses. The essential idea remains the same: specifying pulse characteristics with respect to a non-fixed reference.

Difference sequences for constructing delta codes can be constructed in at least two general ways: (1) pseudorandomly, utilizing random-number generators, or, (2) deterministically. These methods are described in detail below. Those skilled in the art will recognize that the embodiments set forth below are exemplary in nature only, and that the general methodologies can be implemented in various ways without departing from the scope of the present invention.

A. Pseudorandom Generation of Delta Codes

Delta codes constructed through difference sequences that have been generated via some random process can possess statistical properties that make them highly desirable for implementing robust impulse communication systems. In this case we have $$\Delta T_k = \eta_k, 0 \leq k \leq N-1$$

where the $\eta_k$'s are samples drawn from some probability distribution P. Standard random-number generation techniques can be used to produce the sequence of $\eta_k$ values used to generate the delta-code. There are standard techniques for relating the expected power-spectral density and auto-correlation functions for these codes to the probability distribution P. Additionally, the value-range and discrete layouts described above, as well as combinations of these, can be implemented through the selection of an appropriate probability distribution function P. Layout specifications of non-allowable regions or values simply translate into requirements that the probability density or mass functions for P be zero for certain values.

1. Poisson Codes

Figure 18:
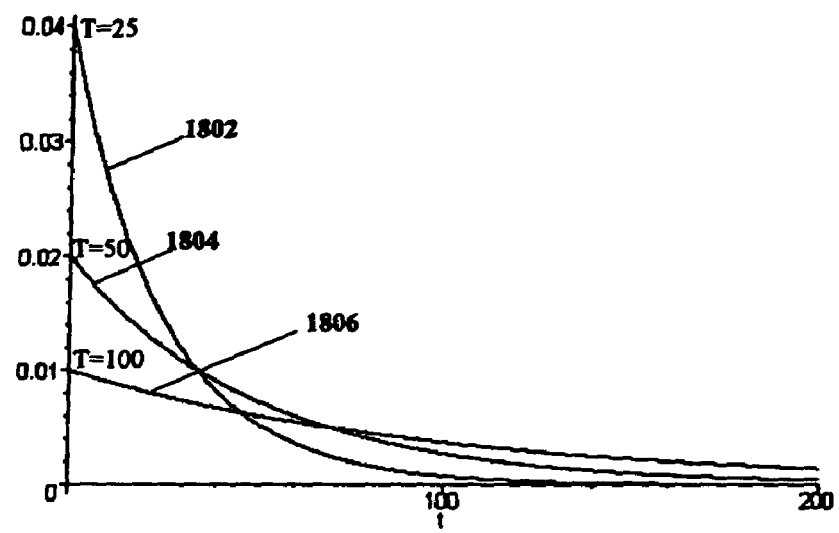
FIG. 18 illustrates probability density functions for three different exponential distributions used to construct Poisson Codes.

Of particular interest are difference sequences in which the inter-pulse times are independent, identically distributed (i.i.d.) exponential random variables. Here, the distribution P above is constrained to be an exponential probability distribution with mean T. FIG. 18 shows graphs of the probability density function $$p(x) = \frac{1}{T} 1(x \geq 0) e^{-x/T}$$

of this distribution, for several different values of T. (Here, the notation 1(P), where P is a proposition, refers to the function that is 1 when P is true, and 0 otherwise. Thus $1(x \geq 0)$ is the function that is 0 when x is negative, and 1 otherwise.) Specifically, T=25 for the first graph 1802, T=50 for the second graph 1804, and T=100 for the third graph 1806. Because the inter-pulse times are exponentially distributed random variables, the pulse transmission times generated by this method form realizations of a Poisson process, a fundamental process in the theory of probability. For this reason, we will refer to delta-codes generated by this method as Poisson codes.

Figure 19:
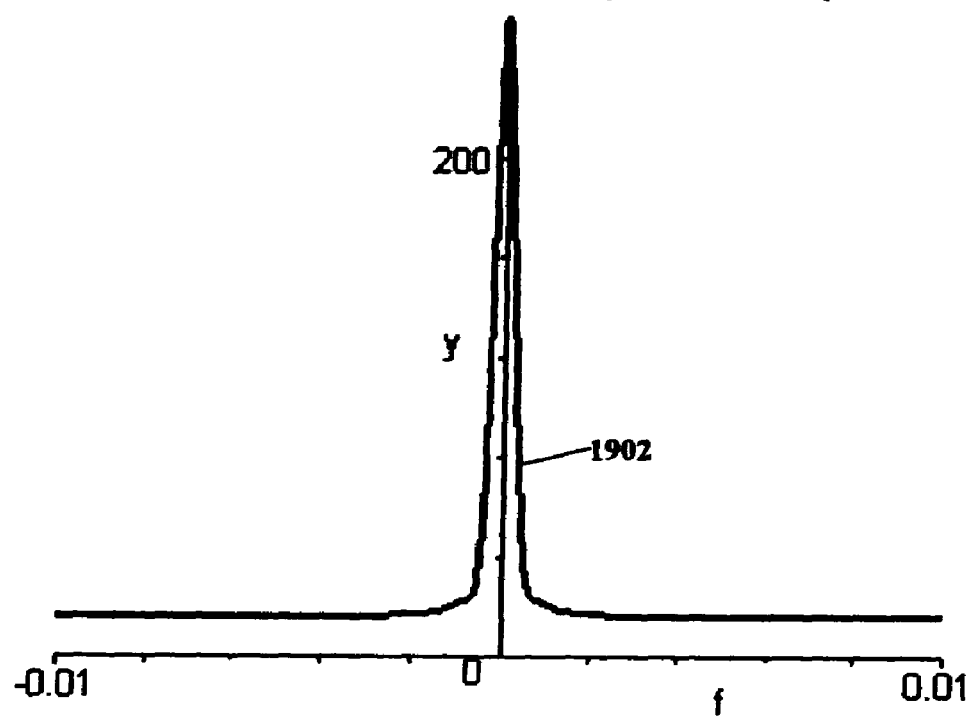
FIG. 19 illustrates the expected (ensemble average) power spectral density function for a Poisson Code.

Poisson codes have statistical properties that make them useful for UWB impulse transmission systems. It can be shown that the expected (ensemble average) power-spectral density function for a Poisson code is given by $$S(\omega) = N + 2 \sum_{k=1}^{N} (N-k) \cos^k(\theta) \cos(k\theta),$$

where $\theta = \arctan(\omega T)$. FIG. 19 shows a graph 1902 of this expected power-spectral density function (the values N=16 and T=100 were used in producing the graph). The frequency units in FIG. 19 are gigahertz; the expected power-spectral density is flat for frequencies above 4 megahertz. The low-frequency artifacts are a function of the length of the code, and become smaller as the code length increases. In the N→∞ limit (and after a suitable rescaling), the average power-spectral density function converges to $$S_\infty(\omega) = \frac{1}{T}\left(1 + \frac{2\pi}{T}\delta(\omega)\right)$$

Figure 20A:
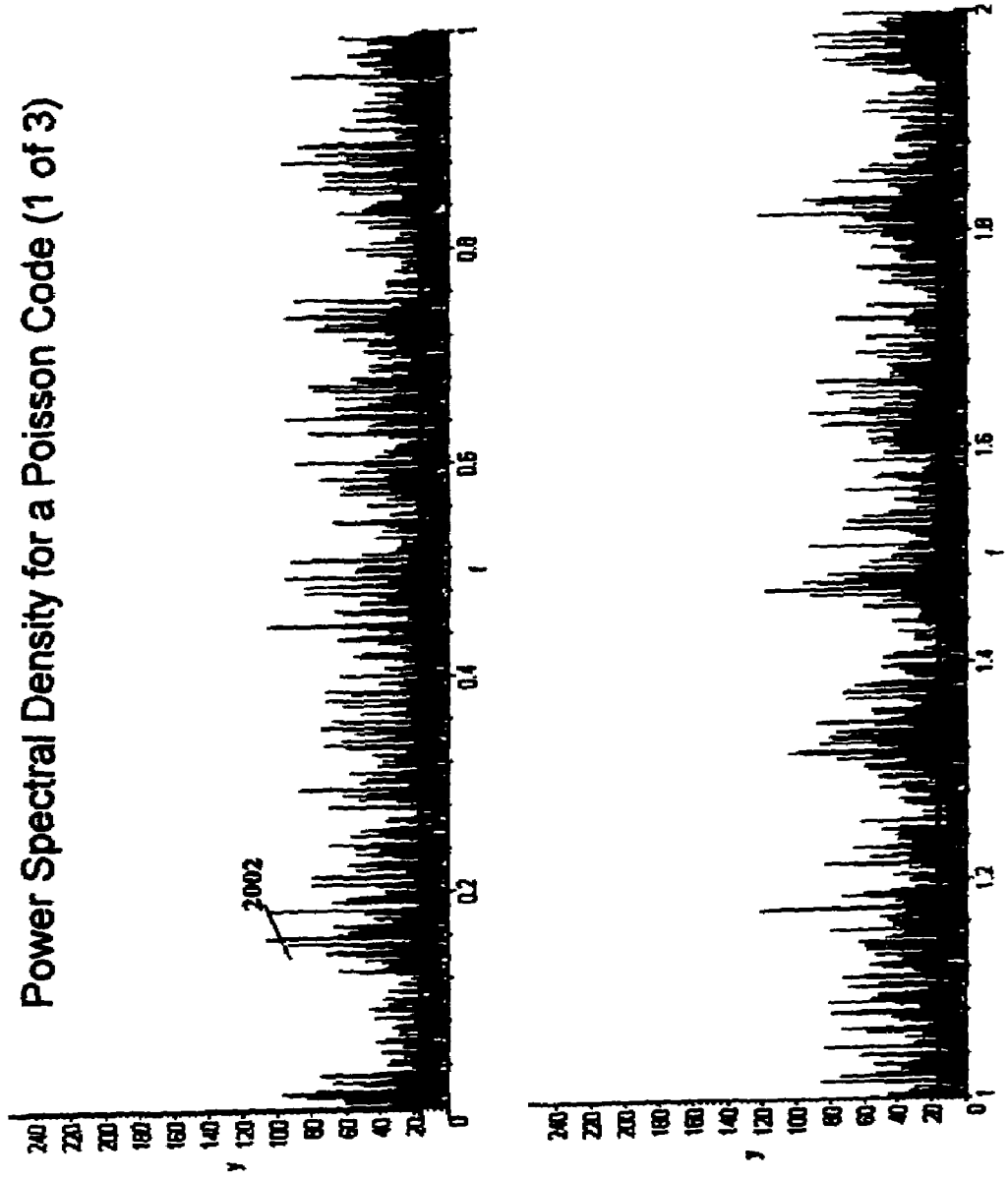
FIG. 20a illustrates part 1 of 3 parts of a plot of the power spectral density function for a specific Poisson Code.
Figure 20B:
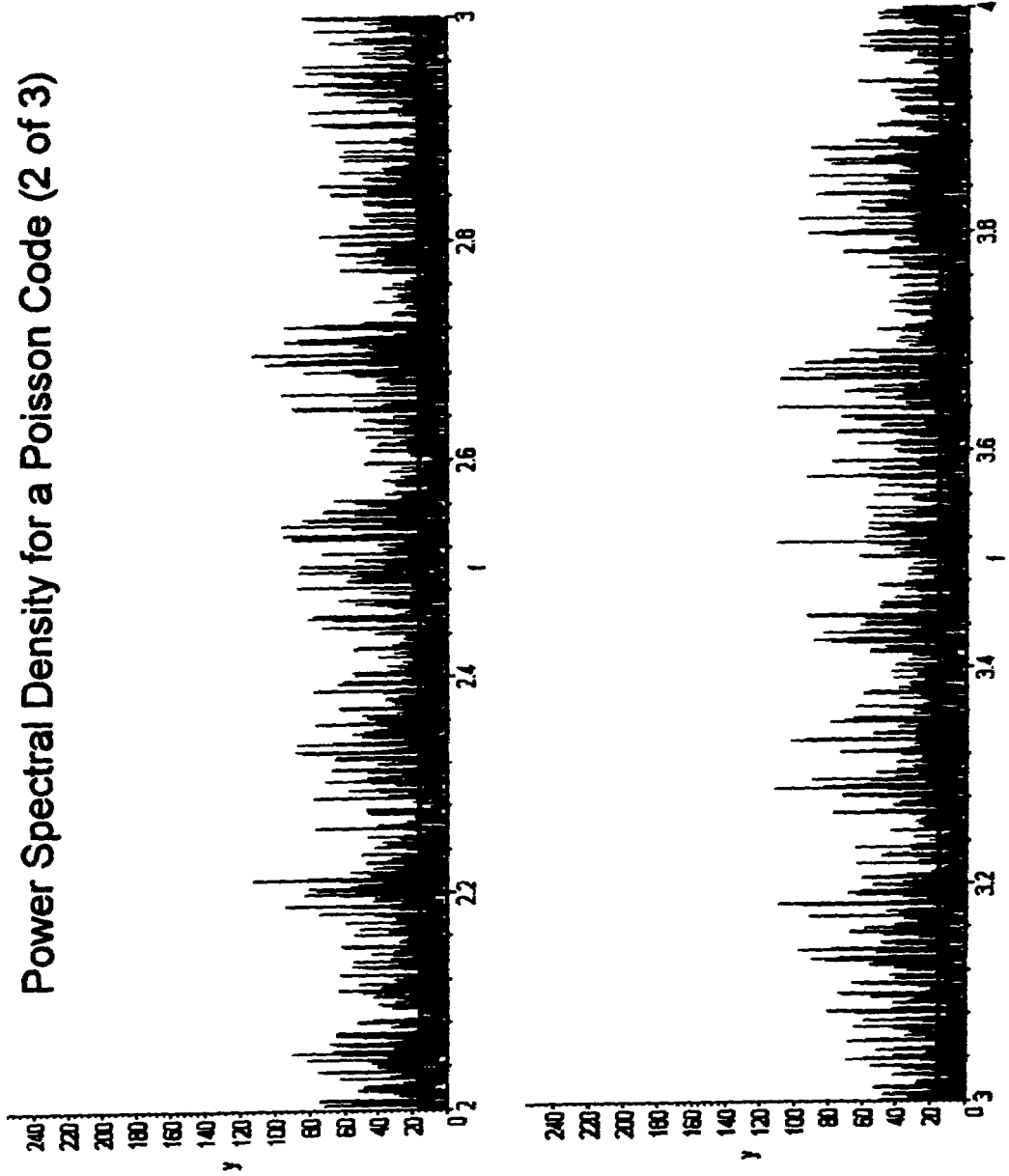
FIG. 20b illustrates part 2 of 3 parts of a plot of the power spectral density function for a specific Poisson Code.

(here $\delta(w)$ is the familiar Dirac impulse function). As is readily apparent, this function is completely flat, except for a spike at $\omega=0$. The corresponding auto-correlation function is given by $$R_\infty(\tau) = \frac{1}{T}\left(\frac{1}{T} + \delta(t)\right)$$

which again is close to ideal. Of course, the spectral and auto-correlation functions for any specific Poisson code will oscillate randomly about these expected values. FIGS. 20a, 20b, and 20c together depict a graph 2002 of the power spectral density for a Poisson code of length N=16.

Average PRF for Poisson codes is completely specified by the mean inter-pulse time T. The average PRF is given by $$\overline{PRF} = \frac{1}{T}$$

It should be noted that pure Poisson codes have no constraints on the inter-pulse times $\Delta T_k$. As a consequence, long Poisson codes will probably contain pulse pairs that are extremely closely spaced, as well as other successive pulse pairs that are very widely separated. Such occurrences may well violate hardware constraints, and thus there needs to be a mechanism for correcting them. Constraints on the inter-pulse times, such as $t_{low} \leq \Delta T_k \leq t_{high}$, can achieve this. These constraints can be implemented by changing the distribution P that controls the generation of the inter-pulse times. Two embodiments that implement this idea are constrained Poisson codes and uniform delta codes.

2. Constrained Poisson Codes and Uniform Delta Codes

With constrained Poisson codes, inter-pulse times are sampled from a modified exponential distribution on the interval $[t_{low}, t_{high}]$. In this way, the inter-pulse times are still random, but satisfy the constraint $t_{low} \leq \Delta T_k \leq t_{high}$, thus in effect implementing a delta value range layout with two non-allowable regions, as described previously and illustrated in FIG. 5. The probability density function of the modified exponential distribution is given by $$p(x) = \begin{cases} \lambda \cdot 1(x \in [t_{low}, t_{high})) \dfrac{e^{-\lambda(x - t_{low})}}{1 - e^{-\lambda(t_{high} - t_{low})}} & \text{if } \lambda \neq 0 \\ \dfrac{1}{t_{high} - t_{low}} 1(x \in [t_{low}, t_{high})) & \text{if } \lambda = 0. \end{cases}$$

Figure 21:
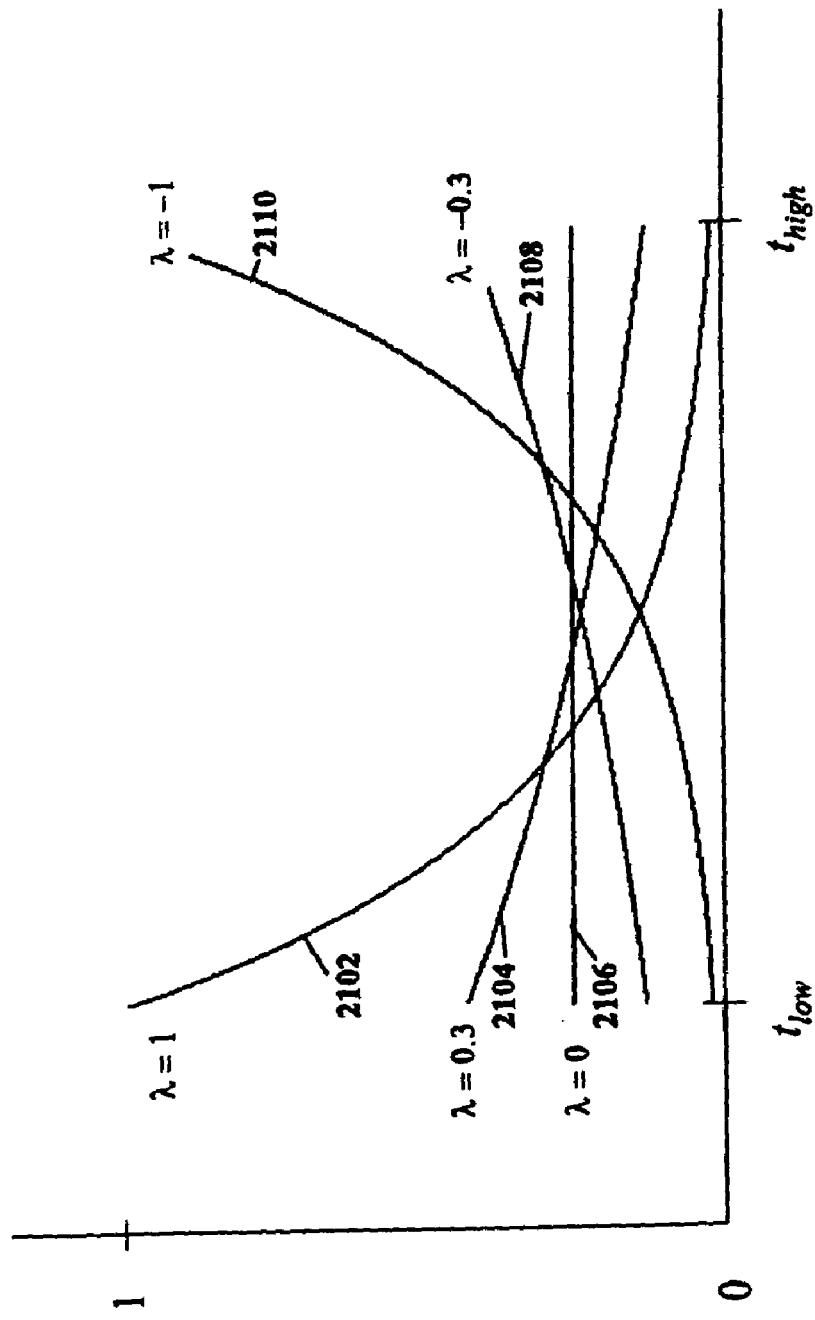
FIG. 21 illustrates probability density functions for five different modified exponential distribution functions used to construct Constrained Poisson Codes and Uniform Delta Codes.

Here $\lambda$ is a constant controlling the mean value of the distribution. Graphs of this density function are shown in FIG. 21 for several values of $\lambda$. Specifically, $\lambda=1.0$ for graph 2102, $\lambda=0.3$ for graph 2104, $\lambda=0$ for graph 2106, $\lambda=-0.3$ for graph 2108, and $\lambda=-1.0$ for graph 2110. Notice that when $\lambda=0$ we have the uniform distribution on $[t_{low}, t_{high}]$; in this case, the resulting codes are called uniform delta codes. The mean inter-pulse time is given by $$T = t_{low} + \frac{1 - e^{-\lambda(t_{high} - t_{low})}(1 + \lambda(t_{high} - t_{low}))}{\lambda(1 - e^{-\lambda(t_{high} - t_{low})})},$$

and the average PRF is again $$\overline{PRF} = \frac{1}{T}.$$

Figure 22:
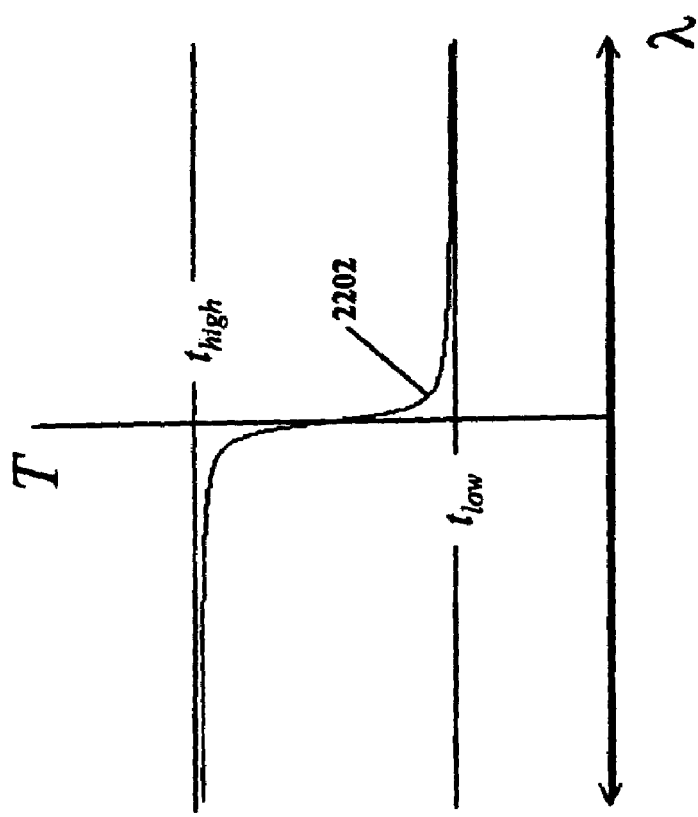
FIG. 22 illustrates the expected inter-pulse time delays as a function of the modified exponential distribution.

The parameter $\lambda$, which can be any real number, controls the mean inter-pulse time; it can be shown that as $\lambda$ runs from $-\infty$ through 0 and on to $\infty$, the mean inter-pulse time runs from $t_{high}$ through $(t_{low}+t_{high})/2$ and on to $t_{low}$. FIG. 22 depicts a graph 2202 of the mean inter-pulse time as a function of the parameter $\lambda$.

Figure 23B:
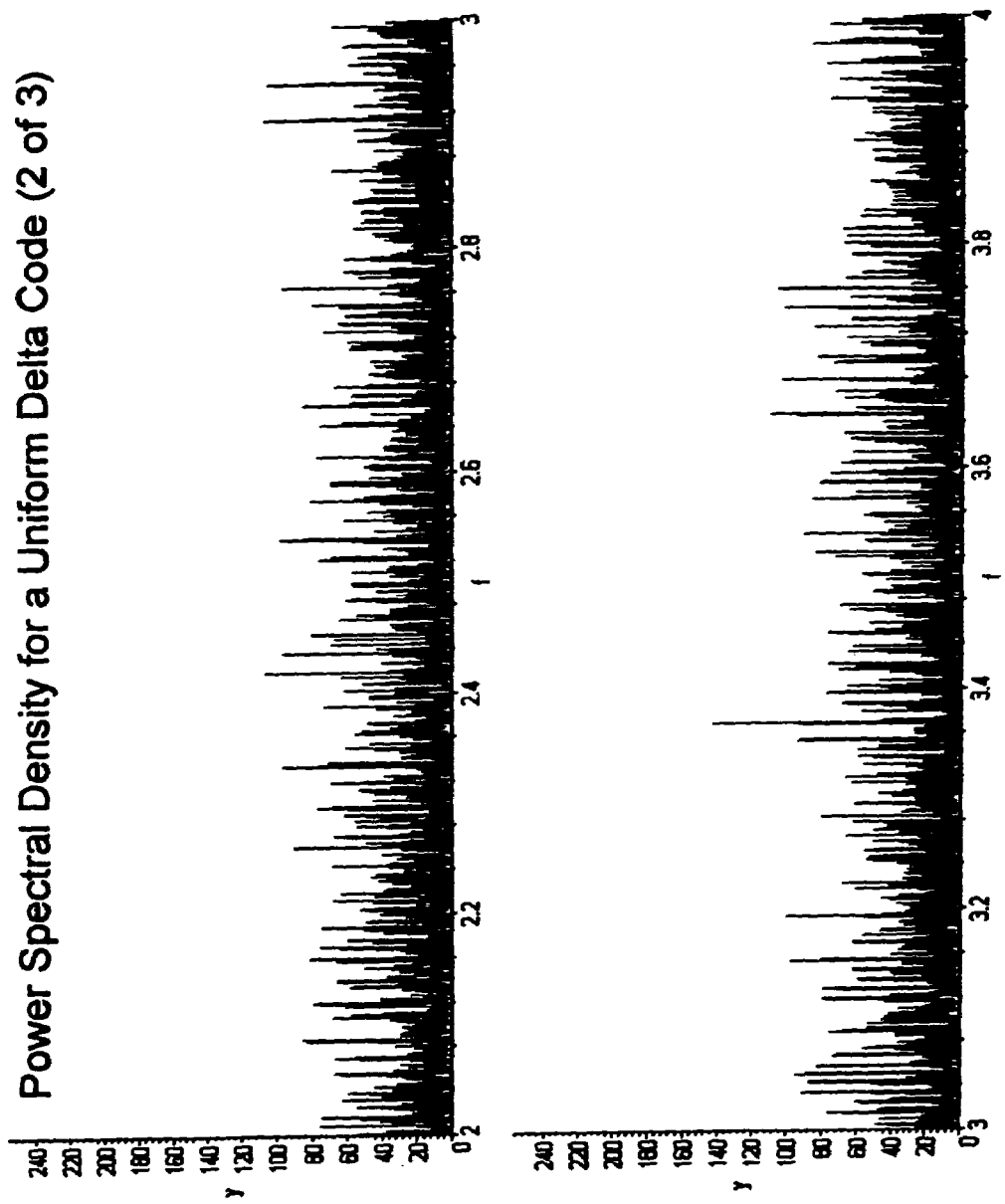
FIG. 23b illustrates part 2 of 3 parts of a plot of the power spectral density function for a Uniform Delta Code.
Figure 23C:
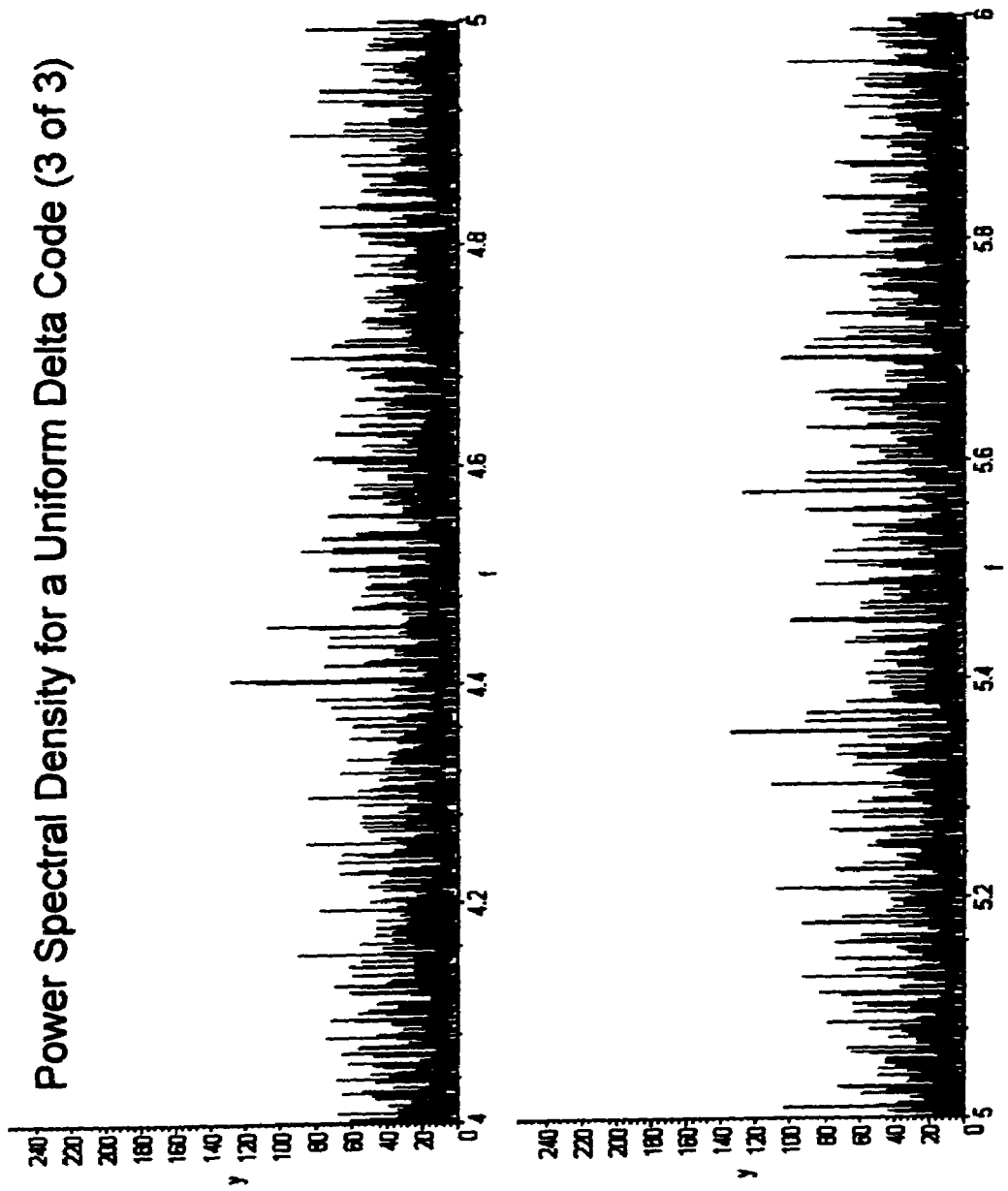
FIG. 23c illustrates part 3 of 3 parts of a plot of the power spectral density function for a Uniform Delta Code.

Naturally, constraining Poisson codes in this way will have an effect on the spectrum and auto-correlation functions of the resulting code. However, such effects can be predicted with theory, and controlled. FIGS. 23a, 23b, and 23c together depict a graph 2302 of the power-spectral density function for a constrained Poisson code of length 16. The value $\lambda=0$ was used in generating this particular code, so it is actually a uniform delta code.

Figure 24:
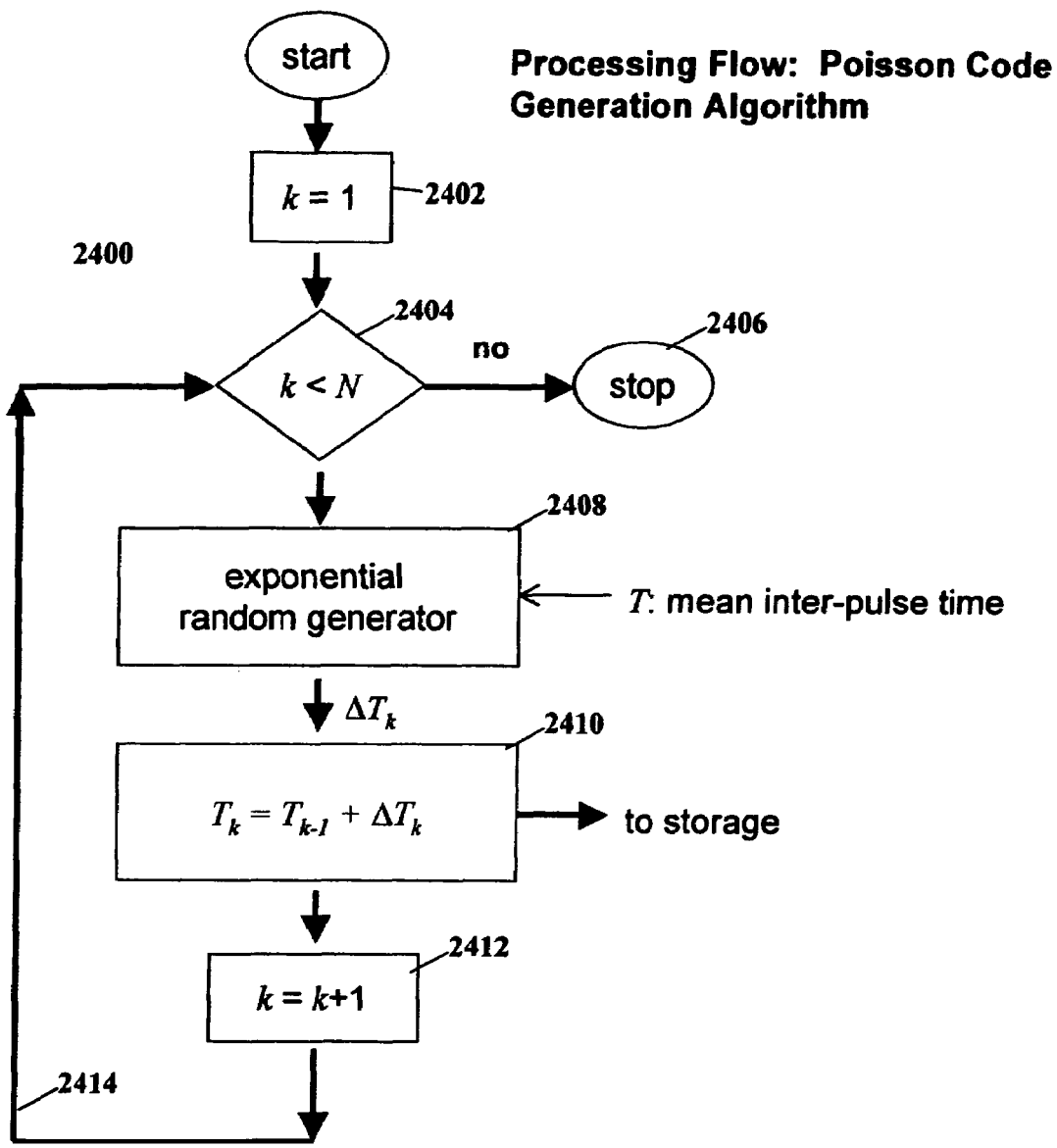
FIG. 24 diagrams the processing flow for a Poisson Code Generation algorithm.

The processing steps for an algorithm to generate Poisson codes are given below. Note that for simplicity, $T_0$ is set to 0. This is not essential to the algorithm; $T_0$ could be set to any arbitrary initial value. FIG. 24 presents a flow diagram 2400 for Poisson code generation algorithm.

Step 1 (2402). Set k=1, and $T_0$=0.

Step 2 (2404). If k<N, go to Step 3 (2408). Else, stop processing (2406).

Step 3 (2408). Set $\Delta T_k = \eta_k$, where $\square_k$ is the output of an exponential random number generator with mean T.

Step 4 (2410). Set $T_k = T_{k-1} + \square T_k$, and store $T_k$.

Step 5 (2412). Increment k.

Step 6 (2414). Go to Step 2 (2404).

Figure 25:
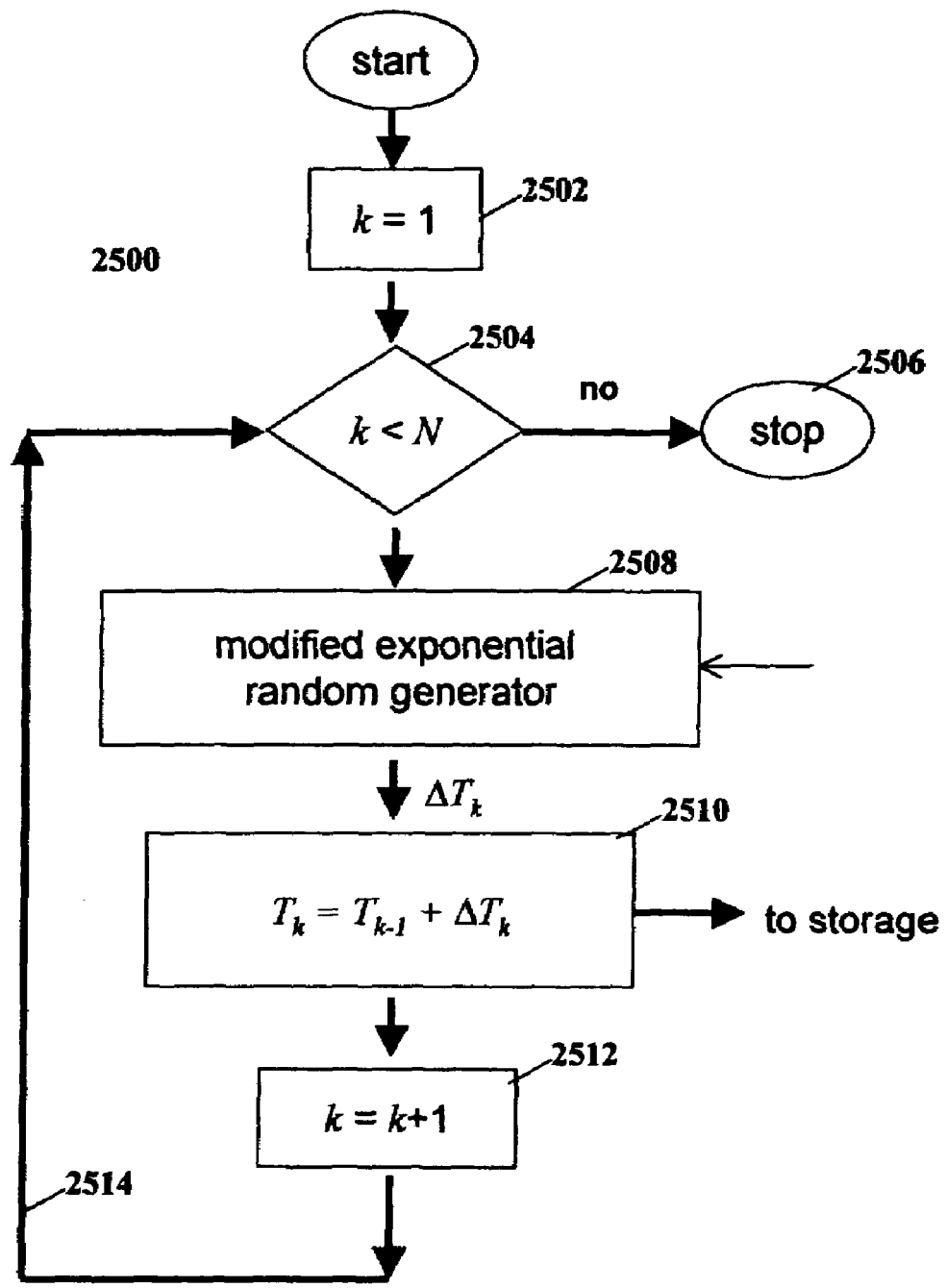
FIG. 25 diagrams the processing flow for a Constrained Poisson Code Generation algorithm.

The processing steps for an algorithm to generate constrained Poisson codes are given below. Setting the parameter $\square = 0$ results in the generation of uniform delta codes. Note that for simplicity, $T_0$ is set to 0. This is not essential to the algorithm; $T_0$ could be set to any arbitrary initial value. FIG. 25 provides a flow diagram 2500 for a constrained Poisson code generation algorithm.

Step 1 (2502). Set k=1, and $T_0$=0.

Step 2 (2504). If k<N, go to Step 3 (2508). Else, stop processing (2506).

Step 3 (2508). Set $\Delta T_k = \eta_k$, where $\square_k$ is the output of a modified exponential random number generator with control parameter $\square$, and limits $t_{low}$, $t_{high}$.

Step 4 (2510). Set $T_k = T_{k-1} + \square T_k$, and store $T_k$.

Step 5 (2512). Increment k.

Step 6 (2514). Go to Step 2 (2504).

3. Pseudorandom Numbers

Pseudorandom numbers can be generated using, e.g., a computer's random number generator, one or more binary shift-register(s) mapped to binary words, a chaotic code generation scheme, or another well-known technique.

Computer random number generator functions can in one embodiment employ a linear congruential generation (LCG) method, which generates an n-th random number, $x_n$, from a previous random number, $x_{n-1}$, using an equation of the general form as follows:

$$x_n = A x_{n-1} + c \,(\text{mod } m)$$

where n identifies a given random number in the generated random number sequence, and the generated sequence is characterized by the multiplier A, the additive constant c, the modulus m, and an initial seed $x_0$. These random number generator functions can be referred to as LCG(a,c,m,$x_0$), which determines the sequence generated.

Another exemplary embodiment of another method that can be used as a computer random number generator is known as a Additive Lagged-Fibonacci Generator (ALFG) method. The approach can be described by an equation of the form:

$$x_n = x_{n-j} + x_{n-k} (\text{mod } 2^m), j < k$$

where n identifies a given random number in the generated random number sequence, and j and k represent offsets to previously generated random numbers. The period of these generators is $(2^k - 1) 2^{m-1}$ and they are referred to as ALFG (l,k,m,$x_0$), which determines the sequence generated.

Binary shift-register pseudorandom number generators can be implemented in many different ways. In an exemplary embodiment, a linear feedback shift register as illustrated in FIG. 26a, can be used. FIG. 26a illustratively depicts a block diagram 2602 including an exemplary embodiment of an LCG linear feedback shift register, including exclusive OR logic gate 2604 having two inputs 2606, 2608 and one output 2610. Eight bit shift register 2614 (labeled bit 0 2614a through bit 7 2614h includes shift out output 2612 coupled to input 2606 of exclusive OR logic gate 2604. Bit 3 2614d is coupled to input 2608 of exclusive OR logic gate 2604, and output 2610 of exclusive OR logic gate 2604 is coupled as shown to bit 7 2614h.

The linear feedback shift register can be described by an equation of the form:

$$x_{n+k} = \sum_{i=0}^{k-1} a_i x_{n+i} (\text{mod} 2)$$

where n identifies a given random number in the generated random number sequence, k is the number of bits in the shift register, $a_i$ is the value of the i-th bit in the shift register. The sequence of bits that is generated depends on the initial shift-register state and which shift-register bit value 2614d, $a_i$, is fed back into the exclusive-OR device 2604 along with the shifted output 2612.

The ALFG method can also be implemented using a shift register and a modulo adder device 2618, as shown in FIG. 26b. FIG. 26b depicts diagram 2616 including an eight-bit shift register having bit 0 2628a through bit 7 2628h. Diagram 2616 also includes addition modulo 2 device 2618 having two inputs 2620 (coupled to bit 7 2628h) and 2622 (coupled to bit 5 2628f), and an output 2624 which can be outputted and can be fed back into input 2626 of the ALFG shift register at bit 0 2628a.

The ALFG shift register can be described by an equation of the form:

$$x_n = x_{n-j} + x_{n-k} (\text{mod } 2), j < k$$

where n identifies a given code in the generated code sequence, and j and k represent the shift-register bits 2628h, 2628f fed into the modulo adder device 2618.

In other exemplary embodiments of the present invention, many other different but related alternative approaches for generating pseudorandom number sequences can also be employed. For example, alternative embodiments include inversive congruential generators, explicit-inversive congruential generators, multiple recursive generators, and combined LCGs. Any of these or other similar traditional methods can be used to generate pseudorandom numbers without departing from the scope of the invention, as will be apparent to those skilled in the relevant art.

In addition to the embodiments already described for generating pseudorandom numbers, several other exemplary embodiments can be employed including, e.g., chaotic code generators and Optimal Golomb Ruler (OGR) code generators. Any of these, and other alternative methods can also be used to generate a pseudorandom number sequence without departing from the spirit and scope of the invention as will be apparent to those skilled in the relevant art.

B. Deterministic Generation of Delta Codes

Several options exist for generating delta codes deterministically. Properties of the resulting delta codes are of course dependent on the deterministic methods used to construct the delays. The current invention utilizes two broad methodologies for the deterministic generation of delta codes: sequential generation and iterated generation.

1. Sequential Generation Methodology

The sequential generation methodology works by directly specifying a sequence of delay values for the delta code. To be specific, let S be some set of states, and let N be a positive integer. Let $f$ be a mapping from $\{1, 2, \ldots, N-1\}$ into S, and let $g: S \to [0, \infty)$ be a mapping from S into the non-negative reals. The function $f$ describes how a given sequence is generated, while the function $g$ establishes a correspondence between the sequence values and the delay values to be used in constructing the delta code. Specifically, the difference sequence $\Delta C=(\Delta T_k=T_k-T_{k-1}, 1 \leq k \leq N-1)$ is generated according to the relation $$\Delta T_k=g(f(k)), 1 \leq k \leq N-1$$

Figure 27:
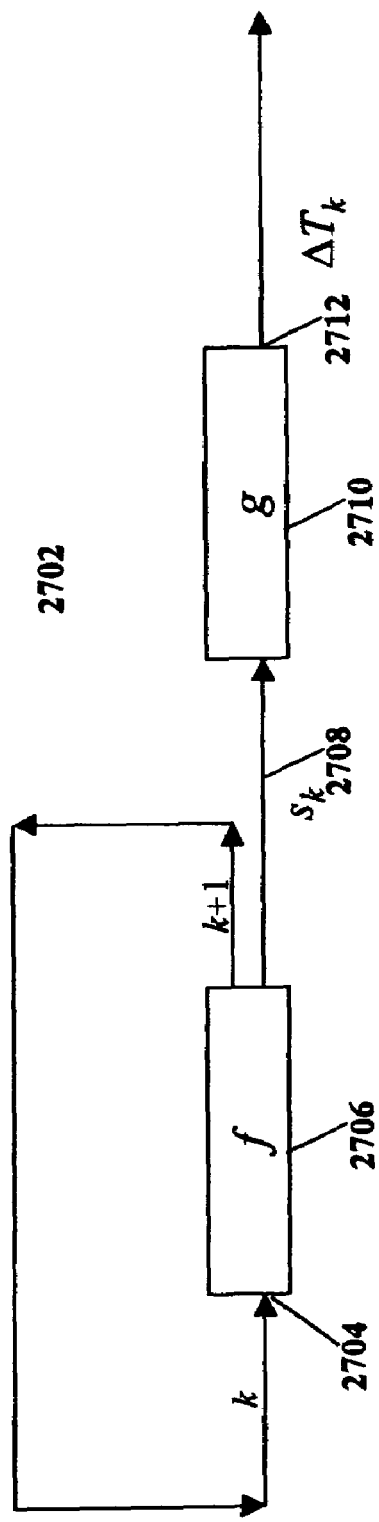
FIG. 27 illustrates the top-level processing flow of the Sequential Generation Methodology for deterministic generation of delta codes.

FIG. 27 depicts a simplified top-level flow diagram 2702 for sequential generation of delta codes. Specifically, to determine the delta time value to the next pulse, function $f$ 2706 receives as input pulse index k (2704) and produces an output $s_k$ 2708 that is input to function g 2710, which produces an output $\Delta T_k$ 2712. Typically, though not always, $f$ will be chosen to provide useful correlation or spectral properties, while g will be chosen to satisfy PRF and other timing constraints.

Rational Congruential delta codes are a specific embodiment of this methodology in the current invention. These codes are generated through functions $f$ of the form $$f(x)=r(x) \bmod M,$$

where N is a positive integer, and r is a rational function defined on $Z_M$, the set of integers modulo M. In particular, the following special cases are identified:

Hyperbolic Congruential delta codes: $f(x;a)=ax^{-1} \bmod M$
Linear Congruential delta codes: $f(x;a)=ax \bmod M$
Quadratic Congruential delta codes: $f(x;a)=ax^2 \bmod M$
Cubic Congruential delta codes: $f(x;a)=ax^3 \bmod M$ In these formulae, a is a parameter, with possible values 1, 2, ..., M−1. For each possible value of a, the function $f$ generates a sequence which can then be used to construct a delta code. Thus the parameter a provides for the possibility of families of delta codes, which can be used together to enable a multi-channel communication system. In most cases, the integer M will be prime number, but this is not always necessary. For instance, in the linear congruential case, all that is required is that a and M be relatively prime.

Figure 28:
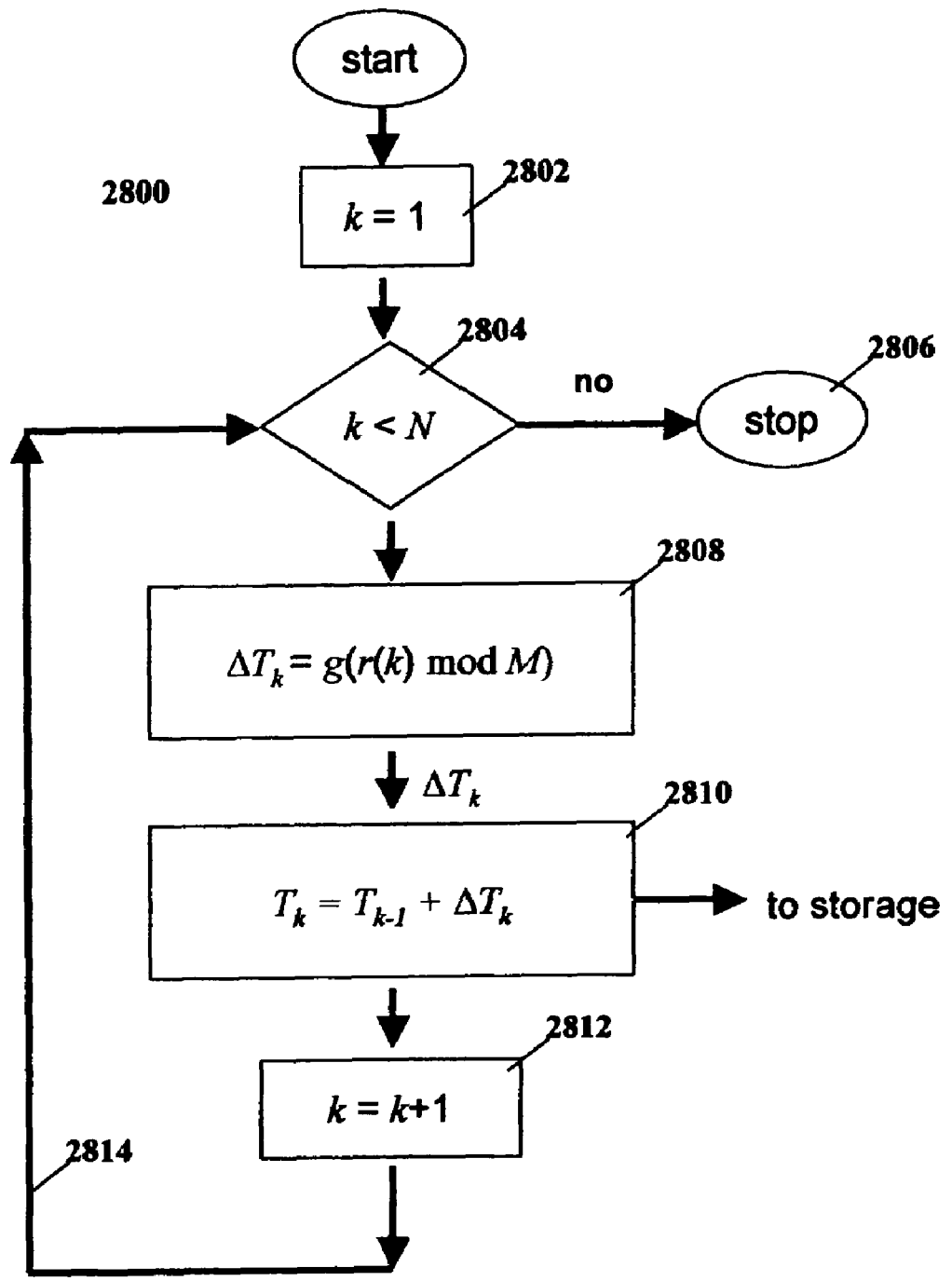
FIG. 28 diagrams the processing flow for a Rational Congruential Sequential Delta Code Generation algorithm.

The processing steps for an algorithm to generate rational congruential sequential delta codes are given below. Note that for simplicity, $T_0$ is set to 0. This is not essential to the algorithm; $T_0$ could be set to any arbitrary initial value. FIG. 28 provides a flow diagram 2800 for a rational congruential sequential delta code generation algorithm.

Step 1 (2802). Set k=1, and $T_0$=0.
Step 2 (2804). If k<N, go to Step 3 (2808). Else, stop processing (2806).
Step 3 (2808). Set $\Delta T_k=g(r(k) \bmod M)$, where r is a rational function defined on $Z_M$, the set of integers modulo M.
Step 4 (2810). Set $T_k=T_{k-1}+\Delta T_k$, and store $T_k$.
Step 5 (2812). Increment k.
Step 6 (2814). Go to Step 2 (2804).

As a simple example, consider a quadratic congruential sequential delta code with the following parameters:
M=5
a=1
$f(x)=ax^2 \bmod M$
$g(s)=40.0 \cdot s$ The sequence $\Delta C$ is easily seen to be (40.0, 160.0, 160.0, 40.0), leading to the time-hopping code C=(0.0, 40.0, 200.0, 360.0).

2. Iterated Generation Methodology

The iterated methodology utilizes iterated function systems as the mechanism for generating delta codes determin- istically. The basic methodology is as follows. Let S be some set of states, and let $f:S \to S$ be a mapping from S into itself. The function $f$ describes how transitions are made from one state to another. Let $g:S \to [0, \infty)$ be a mapping from S into the non-negative real numbers. The function g establishes a correspondence between the states in S and the time delays used to generate the delta code. Given an initial state $s_1 \in S$, a difference sequence $\Delta C=(\Delta T_k=T_k-T_{k-1}, 1 \leq k \leq N-1)$ can now be generated according to the following recursion:

$$\Delta T_1 = g(s_1)$$

$$s_{k+1}=f(s_k)$$

$$\Delta T_{k+1}=g(s_{k+1})$$

$$i=1,2,\ldots,N-2$$

Figure 29:
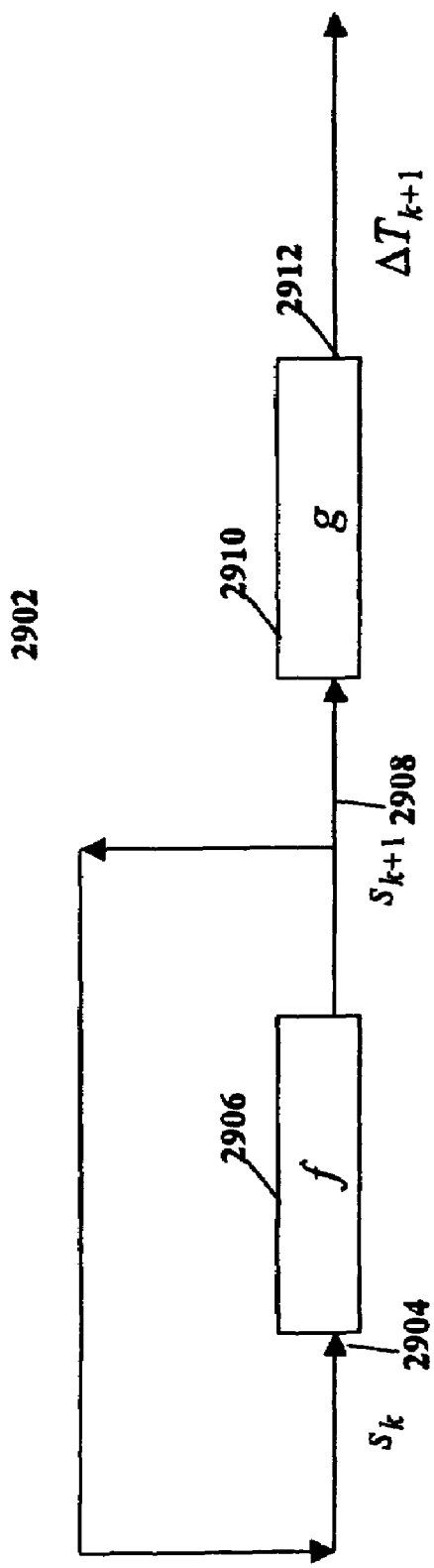
FIG. 29 illustrates the top-level processing flow of the Iterated Generation Methodology for deterministic generation of delta codes.

FIG. 29 depicts a simplified top-level flow diagram 2902 for this process. Specifically, given an initial state 2904 as input, function $f$ 2906 outputs a new state 2908 which is input back into function $f$ 2906 and is also input into function g 2910, which outputs $\Delta T_{k+1}$ 2912. Typically, though not always, $f$ will be chosen to provide useful correlation or spectral properties, while g will be chosen to satisfy PRF and other timing constraints.

Figure 30:
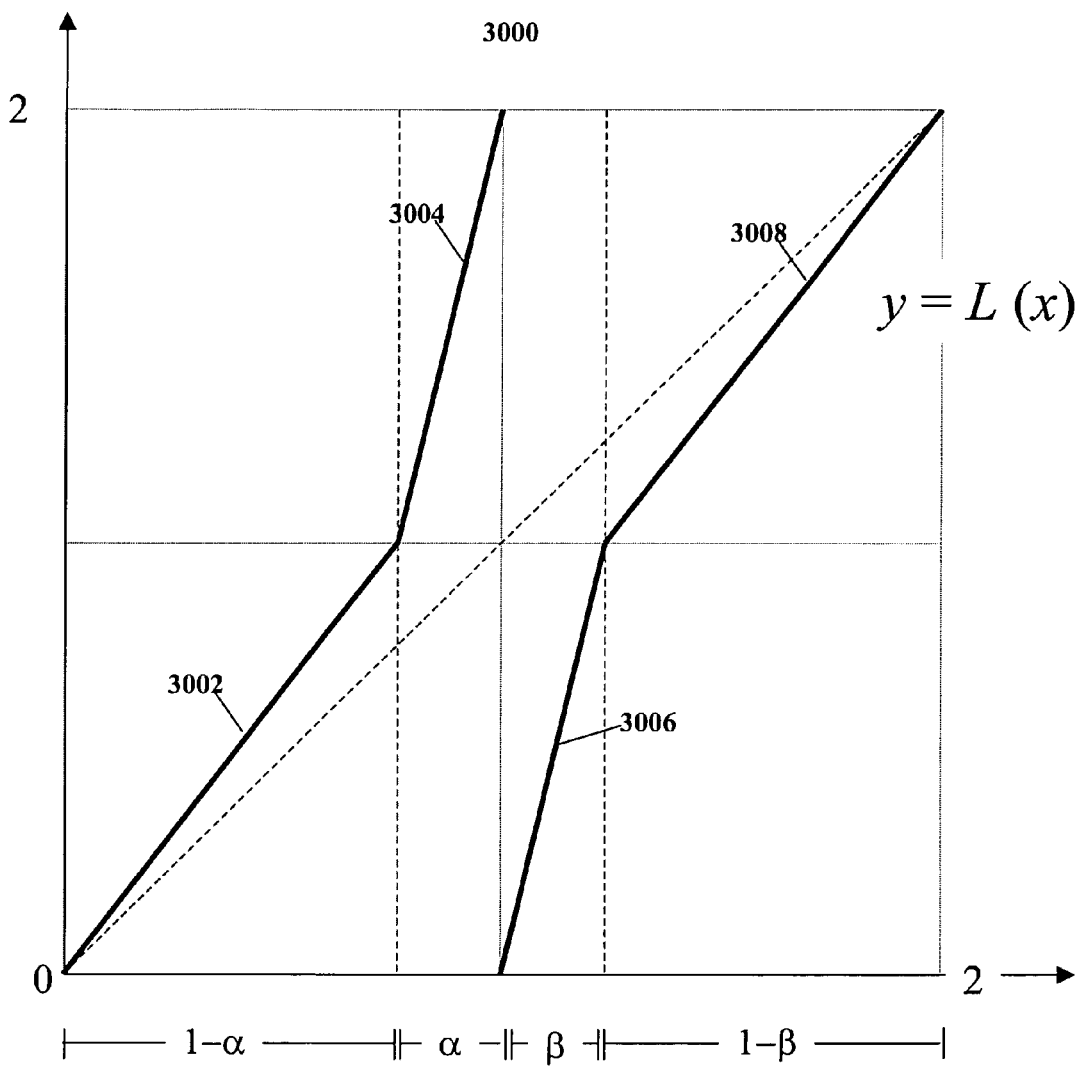
FIG. 30 illustrates the graph of a piece-wise linear function of the type used by a Piece-wise Linear Iterative Delta Code Generation algorithm.

The rational congruential maps introduced above for the sequential generation method can also be used for this iterated generation method, providing a specific embodiment for this invention. For instance, we could take $f(x)=r(x) \bmod M$, where r is again a rational function, and $g(x)=\lambda x$, where $\square$ is some positive real number. FIG. 30 is the flow diagram for a Rational Congruential Iterative Delta Code generation algorithm.

Piece-wise linear maps of an interval into itself provide another specific embodiment of the iterated methodology in the current invention. Consider the function L(x), whose graph 3000 appears in FIG. 30; its equation is $$L(x) = \frac{x}{1-\alpha} 1(x \in [0, 1-\alpha)) + \frac{x+2\alpha-1}{\alpha} 1(x \in [1-\alpha, 1)) + \frac{x-\beta}{\beta} 1(x \in [1, 1+\beta)) + \frac{x-2\beta}{1-\beta} 1(x \in [1+\beta, 2)),$$

where $\square$ and $\square$ are arbitrary constants satisfying $0<\alpha$, $\beta<1$. Specifically, line 3002 plots L(x) for $0 \leq x \leq \alpha$, line 3004 plots L(x) for $\alpha \leq x \leq 1$, line 3006 plots L(x) for $1 \leq x \leq 1+\beta$, and line 3008 plots L(x) for $1+\beta \leq x \leq 2$. For $x \in [0, 2)$ define $$Q(x)=1(x \in [1, 2))$$

Note that Q(x)=0 if $x \in [0, 1)$, while Q(x)=1 if $x \in [1, 2)$. Now define $$\eta(x)=\min \{n \geq 1 : Q(L^{(n)}(x)) \neq Q(x)\}$$

Here $L^{(n)}(x)$ denotes the n-fold composition of L with itself, applied at x. If x is such that the set on the right is empty, $\square$ is undefined at that value of x. It can in fact be shown that $\square$ is defined for almost every (in the sense of Lebesgue measure) x in [0, 2). For these values of x, define $$f(x)=L^{(\eta(x))}(x).$$

This function now serves as the $f$ in the original recursion that defines the iterated methodology. A number of choices for g are possible in this case, the simplest of which is probably $$g(x)=\eta(x).$$

It is worth noting that, for this choice of $f$, there exist choices of g that result in delta codes that are good statistical approximations of the pseudo-random Poisson codes introduced above. It is also possible to modify the definition of the function L so that constraints of the form $t_{low} \leq \Delta T_k \leq t_{high}$ can be implemented in this method.

Figure 31:
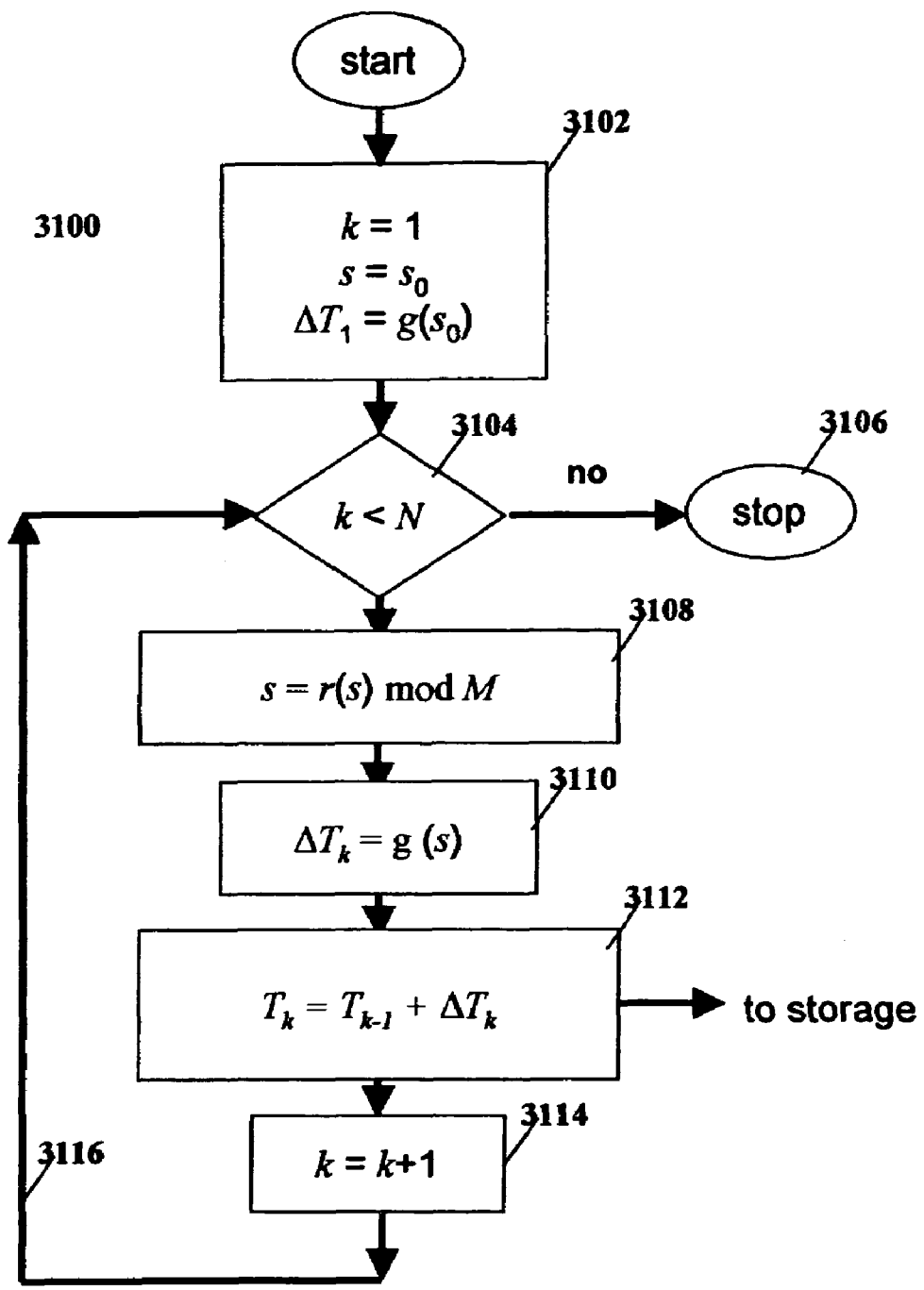
FIG. 31 diagrams the processing flow for a Rational Congruential Iterative Delta Code Generation algorithm.

The processing steps for an algorithm to generate rational congruential iterative delta codes are given below. Note that for simplicity, $T_0$ is set to 0. This is not essential to the algorithm; $T_0$ could be set to any arbitrary initial value. FIG. 31 depicts a flow diagram 3100 for a rational congruential iterative delta code generation algorithm.

Step 1 (3102). Set k=1, $T_0$=0, s=$s_0$, and $\Box T_1$=g($s_0$).

Step 2 (3104). If k<N, go to Step 3 (3108). Else, stop processing (3110).

Step 3 (3108). Set s=r(s) mod M, where r is a rational function defined on $Z_M$, the set of integers modulo M.

Step 4 (3110). Set $\Box T_k$=g(s).

Step 5 (3112). Set $T_k$=$T_{k-1}$+$\Box T_k$, and store $T_k$.

Step 6 (3114). Increment k.

Step 7 (3116). Go to Step 2 (3104).

Figure 32:
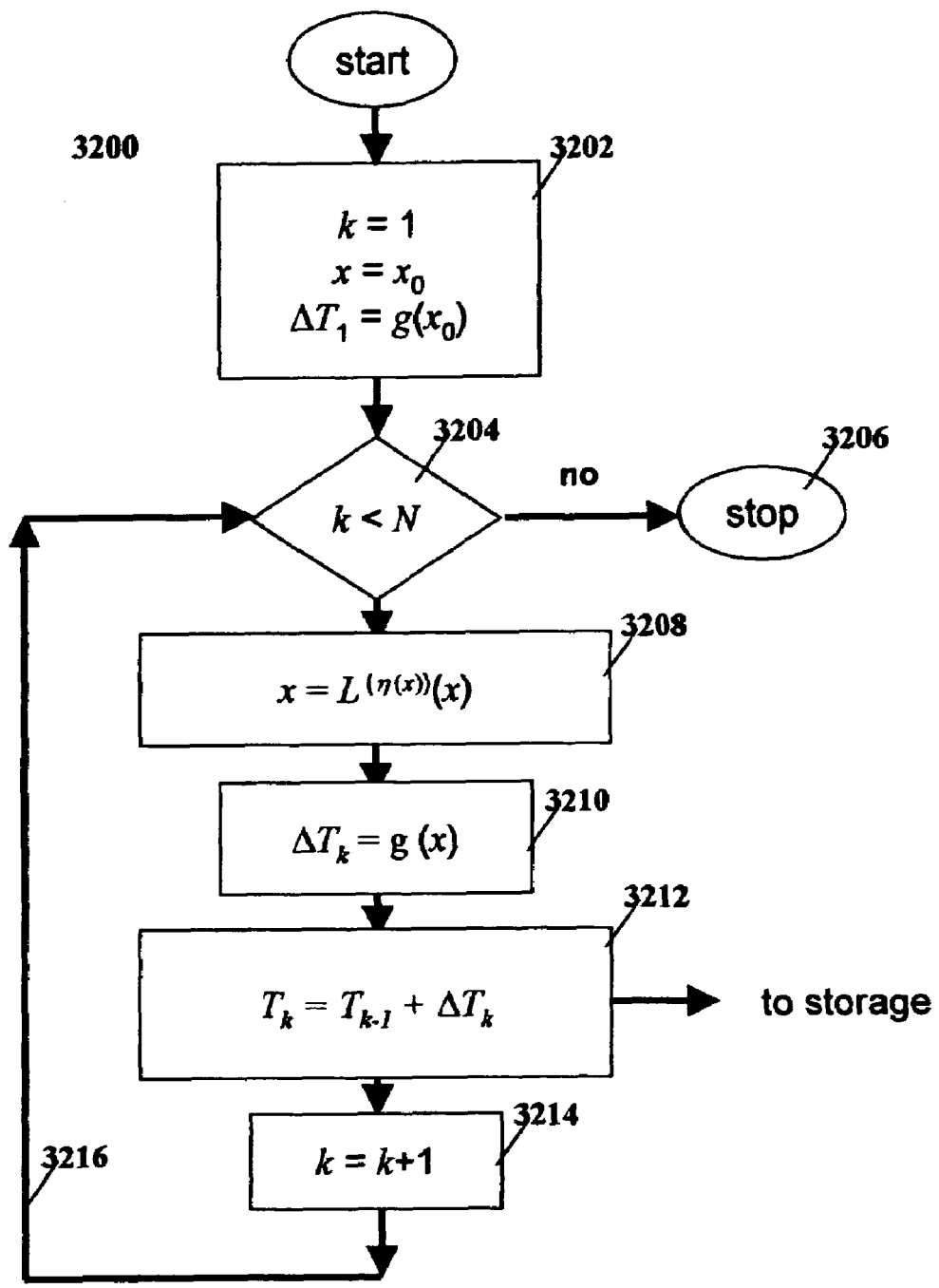
FIG. 32 diagrams the processing flow for a Piece-wise Linear Iterative Delta Code Generation algorithm.

The processing steps for an algorithm to generate piecewise linear iterative delta codes are given below. Note that for simplicity, $T_0$ is set to 0. This is not essential to the algorithm; $T_0$ could be set to any arbitrary initial value. FIG. 32 depicts a flow diagram 3200 for a rational congruential iterative delta code generation algorithm.

Step 1 (3202). Set k=1, $T_0$=0, x=$x_0$, and $\Box T_1$=g($x_0$).

Step 2 (3204). If k<N, go to Step 3 (3208). Else, stop processing (3206).

Step 3 (3208). Set x=$L^{(n(x))}$(x), where L and $\Box$ are as described above.

Step 4 (3210). Set $\Box T_k$=g(x).

Step 5 (3212). Set $T_k$=$T_{k-1}$+$\Box T_k$, and store $T_k$.

Step 6 (3214). Increment k.

Step 7 (3216). Go to Step 2 (3204).

V. Mapping Code Elements to Pulse Characteristic Values

After a delta code has been generated using one of the delta code generation techniques, the code element values can be mapped to specific pulse characteristic values per the defined characteristic layouts and the employed code mapping approach. Pulse characteristic values can at a minimum include pulse position, width, or amplitude.

According to the present invention, temporal and/or non-temporal characteristics of pulses within a pulse train are specified by generating and applying one or more delta codes relative to one or more non-fixed references. One or more delta value range and/or discrete delta value layouts may be defined relative to the one or more non-fixed references. Such layouts may include allowable and non-allowable regions.

As described previously, a temporal pulse characteristic corresponds to a pulse position in time and a non-temporal pulse characteristic corresponds to pulse width or pulse amplitude. A non-fixed reference is at least one characteristic value of at least one pulse including any preceding pulse and any succeeding pulse. A non-fixed reference may be a statistical quantity based on the characteristic values of a subset of pulses in the pulse train, e.g., an average pulse characteristic value.

Pulse characteristics may be specified using a pseudorandom delta code such as a Poisson code or a constrained Poisson code, which includes the special case uniform delta code. Alternatively, pulse characteristics may be specified using deterministic delta codes including those generated using a sequential generation methodology, e.g., a rational congruential sequential delta code. In four separate exemplary embodiments of the invention, rational congruential sequential delta codes may employ a hyberbolic congruential, linear congruential, quadratic congruential function, or cubic congruential function. In another exemplary embodiment rational congruential sequential delta codes may employ a function of the form $f(x;a)=ax^n$ mod M.

Deterministic delta codes may also be generated using an iterative generation methodology, e.g., a rational congruential iterative delta code. In four separate exemplary embodiments of the invention rational congruential iterative delta codes may employ a hyberbolic congruential, linear congruential, quadratic congruential function, or cubic congruential function. In another exemplary embodiment rational congruential iterative delta codes may employ a function of the form $f(x;a)=ax^n$ mod M. Furthermore, deterministic iterative delta codes may be generated using the piecewise linear iterative delta code generation methodology.

VI. Exemplary Transceiver Implementation

A. Transmitter

Figure 33:
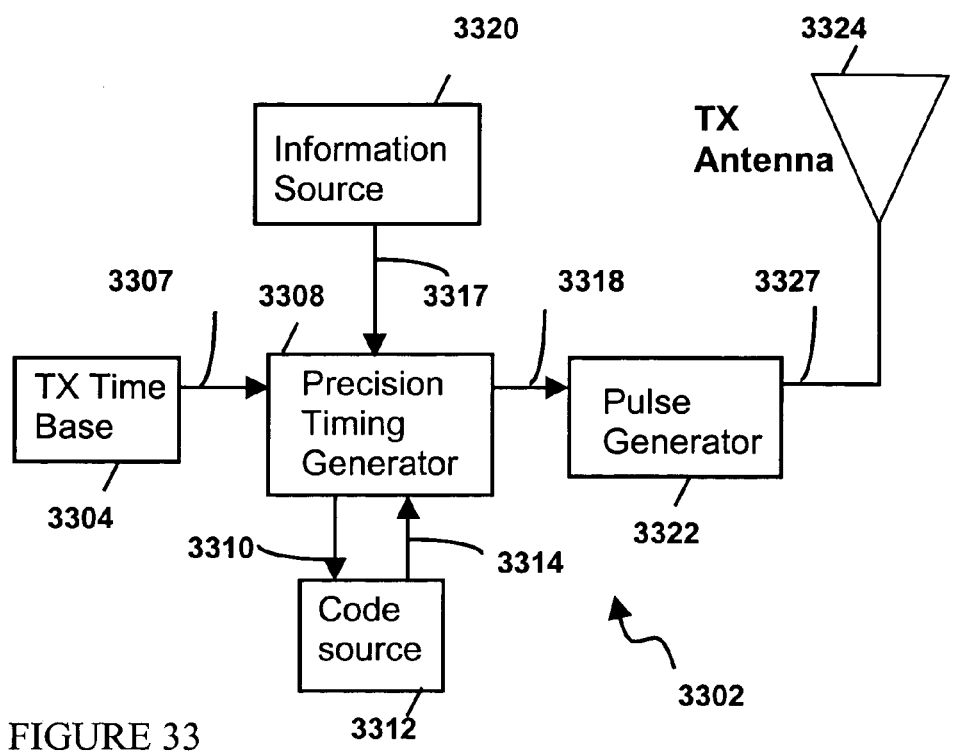
FIG. 33 is a block diagram of an impulse transmitter that advantageously uses the present invention.

An exemplary embodiment of an impulse radio transmitter 3302 of an impulse radio communication system having one subcarrier channel will now be described with reference to FIG. 33.

The transmitter 3302 comprises a time base 3304 that generates a periodic timing signal 3307. The time base 3304 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition frequency. The periodic timing signal 3307 is supplied to a precision timing generator 3308.

The precision timing generator 3308 supplies synchronizing signals 3310 to the code source 3312 and utilizes the code source output 3314 together with an internally generated subcarrier signal (which is optional) and an information signal 3317 to generate a modulated, coded timing signal 3318.

The code source 3312 comprises a storage device such as a random access memory (RAM), read only memory (ROM), or the like, for storing suitable codes and for outputting the codes as a code signal 3314. Alternatively, maximum length shift registers or other computational means can be used to generate the codes.

An information source 3320 supplies the information signal 3317 to the precision timing generator 3308. The information signal 3317 can be any type of intelligence, including digital bits representing voice, data, imagery, or the like, analog signals, or complex signals.

Figure 34:
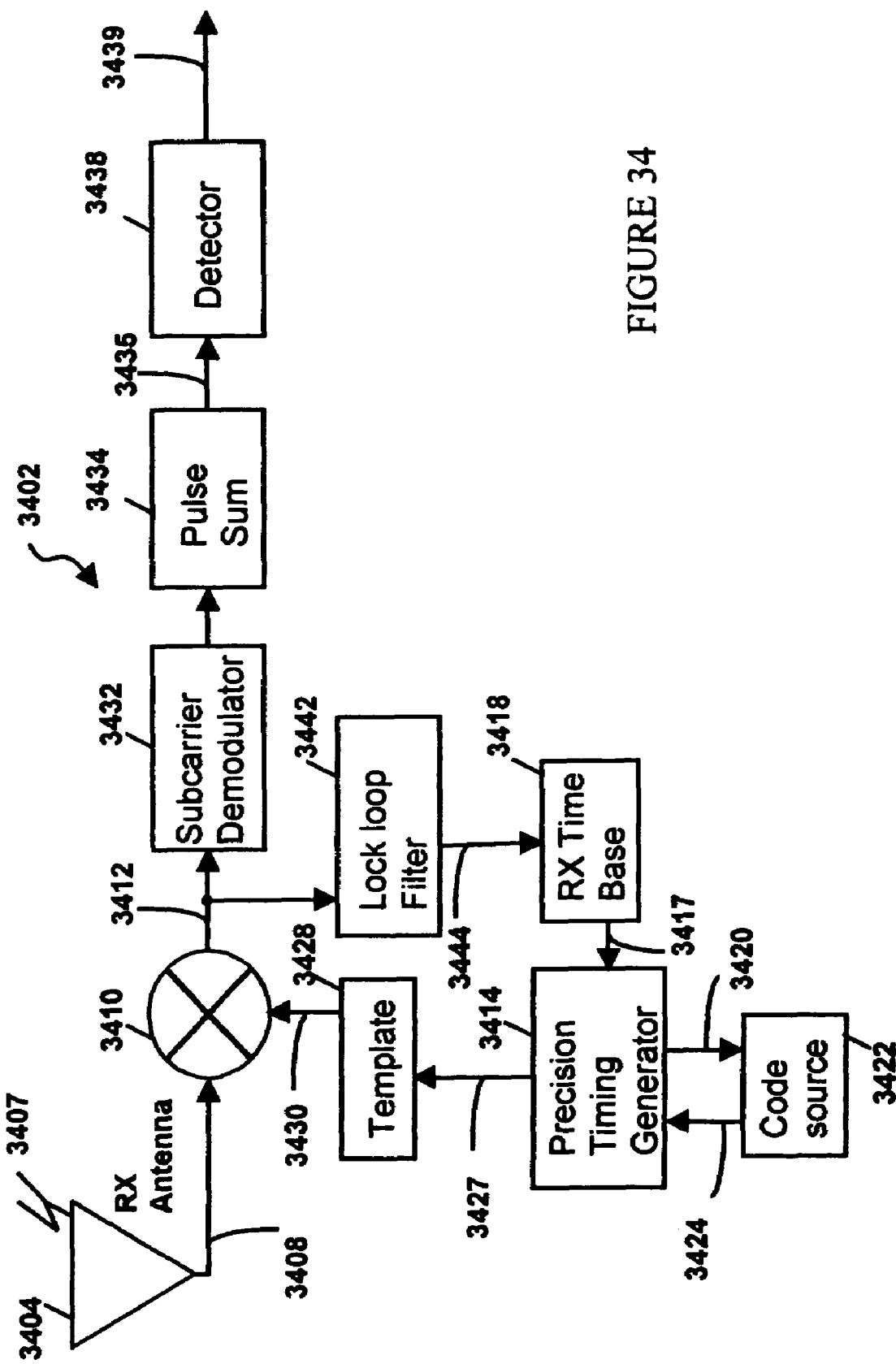
FIG. 34 is a block diagram of an impulse receiver that advantageously uses the present invention.

A pulse generator 3322 uses the modulated, coded timing signal 3318 as a trigger to generate output pulses. The output pulses are sent to a transmit antenna 3324 via a transmission line 3327 coupled thereto. The output pulses are converted into propagating electromagnetic pulses by the transmit antenna 3324. In the present embodiment, the electromagnetic pulses are called the emitted signal, and propagate to an impulse radio receiver 3402, such as shown in FIG. 34, through a propagation medium, such as air, in a radio frequency embodiment. In a preferred embodiment, the emitted signal is wide-band or ultrawide-band, approaching a monocycle pulse 102 as in FIG. 1. However, the emitted signal can be spectrally modified by filtering of the pulses. This filtering will usually cause each monocycle pulse to have more zero crossings (more cycles) in the time domain.

In this case, the impulse radio receiver can use a similar waveform as the template signal in the cross correlator for efficient conversion.

B. Receiver

An exemplary embodiment of an impulse radio receiver 3402 (hereinafter called the receiver) for the impulse radio communication system is now described with reference to FIG. 34. More specifically, the system illustrated in FIG. 34 is for reception of digital data wherein one or more pulses are transmitted for each data bit.

The receiver 3402 comprises a receive antenna 3404 for receiving a propagated impulse radio signal 3407. A received signal 3408 from the receive antenna 3404 is coupled to a cross correlator or sampler 3410 to produce a baseband output 3412. The cross correlator or sampler 3410 includes multiply and integrate functions together with any necessary filters to optimize signal to noise ratio.

The receiver 3402 also includes a precision timing generator 3414, which receives a periodic timing signal 3417 from a receiver time base 3418. This time base 3418 is adjustable and controllable in time, frequency, or phase, as required by the lock loop in order to lock on the received signal 3408. The precision timing generator 3414 provides synchronizing signals 3420 to the code source 3422 and receives a code control signal 3424 from the code source 3422. The precision timing generator 3414 utilizes the periodic timing signal 3417 and code control signal 3424 to produce a coded timing signal 3427. The template generator 3428 is triggered by this coded timing signal 3427 and produces a train of template signal pulses 3430 ideally having waveforms substantially equivalent to each pulse of the received signal 3408. The code for receiving a given signal is the same code utilized by the originating transmitter 3402 to generate the propagated signal 3407. Thus, the timing of the template pulse train 3430 matches the timing of the received signal pulse train 3408, allowing the received signal 3408 to be synchronously sampled in the correlator 3410. The correlator 3410 ideally comprises a multiplier followed by a short term integrator to sum the multiplier product over the pulse interval.

Further examples and details of correlation and sampling processes can be found in commonly owned U.S. Pat. Nos. 4,641,317, 4,743,906, 4,813,057, and 4,979,186, which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference in its entirety.

The output of the correlator 3410, also called a baseband signal 3412, is coupled to a subcarrier demodulator 3432, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 3432 is then filtered or integrated in a pulse summation stage 3434. The pulse summation stage produces an output representative of the sum of a number of pulse signals comprising a single data bit. The output of the pulse summation stage 3434 is then compared with a nominal zero (or reference) signal output in a detector stage 3438 to determine an output signal 3439 representing an estimate of the original information signal 3317.

The baseband signal 3412 is also input to a lowpass filter 3442 (also referred to as lock loop filter 1142). A control loop comprising the lowpass filter 3442, time base 3418, precision timing generator 3414, template generator 3428, and correlator 3410 is used to generate a filtered error signal 3444. The filtered error signal 3444 provides adjustments to the adjustable time base 3418 to time position the periodic timing signal 3427 in relation to the position of the received signal 3408.

In a transceiver embodiment, substantial economy can be achieved by sharing part or all of several of the functions of the transmitter 3302 and receiver 3402. Some of these include the time base 3418, precision timing generator 3414, code source 3422, antenna 3404, and the like.

VII. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for coding at least one characteristic of at least one pulse within a pulse train, comprising the steps of:
    (a) specifying pulse characteristics relative to at least one non-fixed reference in accordance with a delta code of a plurality of delta codes, wherein the pulse characteristics define one of a plurality of communication channels defined by said plurality of delta codes;
    (b) applying said delta code relative to said at least one non-fixed reference;
    (c) allocating allowable and non-allowable characteristic regions relative to said at least one non-fixed reference; and
    (d) applying the delta code relative to said allowable and non-allowable characteristic regions.

2. The method of claim 1, wherein said allowable and non-allowable characteristic regions are relative to at least one definable characteristic value within a layout.

3. The method of claim 2, wherein said at least one definable characteristic value is relative to at least one reference.

4. A method for coding at least one characteristic of at least one pulse within a pulse train, comprising the steps of:
    (a) specifying pulse characteristics relative to at least one non-fixed reference in accordance with a delta code of a plurality of delta codes, wherein the pulse characteristics define one of a plurality of communication channels defined by said plurality of delta codes; and
    (b) applying said delta code relative to said at least one non-fixed reference, wherein the delta code is a deterministic delta code, wherein the deterministic delta code is generated using the sequential delta code generation methodology, wherein the deterministic delta code is generated using the Rational Congruential Sequential Delta Code generation methodology, wherein the rational function employed in the Rational Congruential Sequential Delta Code generation methodology is of the form $f(x;a)=ax^n$ mod M, where $f$ is a function of variable x, M is an integer modulus, a is a parameter, with possible values of 1, 2, ... M−1, and n is a nonzero integer.

5. A method for coding at least one characteristic of at least one pulse within a pulse train, comprising the steps of:
    (a) specifying pulse characteristics relative to at least one non-fixed reference in accordance with a delta code of a plurality of delta codes, wherein the pulse characteristics define one of a plurality of communication channels defined by said plurality of delta codes; and (b) applying said delta code relative to said at least one non-fixed reference, wherein the delta code is a deterministic delta code, wherein the deterministic delta code is generated using the sequential delta code generation methodology, wherein the deterministic delta code is generated using the Rational Congruential Sequential Delta Code generation methodology, wherein the rational function employed in the Rational Congruential Sequential Delta Code generation methodology is of the form $f(x;a)=ax^{-1}$ mod M, where $f$ is a function of variable x, M is an integer modulus, a is a parameter, with possible values of 1, 2, ... M−1.

6. A method for coding at least one characteristic of at least one pulse within a pulse train, comprising the steps of:
(a) specifying pulse characteristics relative to at least one non-fixed reference in accordance with a delta code of a plurality of delta codes, wherein the pulse characteristics define one of a plurality of communication channels defined by said plurality of delta codes; and
(b) applying said delta code relative to said at least one non-fixed reference, wherein the delta code is a deterministic delta code, wherein the deterministic delta code is generated using the sequential delta code generation methodology, wherein the deterministic delta code is generated using the Rational Congruential Sequential Delta Code generation methodology, wherein the rational function employed in the Rational Congruential Sequential Delta Code generation methodology is of the form $f(x;a)=ax$ mod M, where $f$ is a function of variable x, M is an integer modulus, a is a parameter, with possible values of 1, 2, ... M−1.

7. A method for coding at least one characteristic of at least one pulse within a pulse train, comprising the steps of:
(a) specifying pulse characteristics relative to at least one non-fixed reference in accordance with a delta code of a plurality of delta codes, wherein the pulse characteristics define one of a plurality of communication channels defined by said plurality of delta codes; and
(b) applying said delta code relative to said at least one non-fixed reference, wherein the delta code is a deterministic delta code, wherein the deterministic delta code is generated using the sequential delta code generation methodology, wherein the deterministic delta code is generated using the Rational Congruential Sequential Delta Code generation methodology, wherein the rational function employed in the Rational Congruential Sequential Delta Code generation methodology is of the form $f(x;a)=ax^2$ mod M, where $f$ is a function of variable x, M is an integer modulus, a is a parameter, with possible values of 1, 2, ... M−1.

8. A method for coding at least one characteristic of at least one pulse within a pulse train, comprising the steps of:
(a) specifying pulse characteristics relative to at least one non-fixed reference in accordance with a delta code of a plurality of delta codes, wherein the pulse characteristics define one of a plurality of communication channels defined by said plurality of delta codes; and
(b) applying said delta code relative to said at least one non-fixed reference, wherein the delta code is a deterministic delta code, wherein the deterministic delta code is generated using the sequential delta code generation methodology, wherein the deterministic delta code is generated using the Rational Congruential Sequential Delta Code generation methodology, wherein the rational function employed in the Rational Congruential Sequential Delta Code generation methodology is of the form $f(x;a)=ax^3$ mod M, where $f$ is a function of variable x, M is an integer modulus, a is a parameter, with possible values of 1, 2, ... M−1.

9. A method for coding at least one characteristic of at least one pulse within a pulse train, comprising the steps of:
(a) specifying pulse characteristics relative to at least one non-fixed reference in accordance with a delta code of a plurality of delta codes, wherein the pulse characteristics define one of a plurality of communication channels defined by said plurality of delta codes; and
(b) applying said delta code relative to said at least one non-fixed reference, wherein the delta code is a deterministic delta code, wherein the deterministic delta code is generated using the iterative delta code generation methodology, wherein the deterministic delta code is generated using the Rational Congruential Iterative Delta Code generation methodology, wherein the rational function employed in the Rational Congruential Iterative Delta Code generation methodology is of the form $f(x;a)=ax^n$ mod M, where $f$ is a function of variable x, M is an integer modulus, a is a parameter, with possible values of 1, 2, ... M−1, and n is a nonzero integer.

10. A method for coding at least one characteristic of at least one pulse within a pulse train, comprising the steps of:
(a) specifying pulse characteristics relative to at least one non-fixed reference in accordance with a delta code of a plurality of delta codes, wherein the pulse characteristics define one of a plurality of communication channels defined by said plurality of delta codes; and
(b) applying said delta code relative to said at least one non-fixed reference, wherein the delta code is a deterministic delta code, wherein the deterministic delta code is generated using the iterative delta code generation methodology, wherein the deterministic delta code is generated using the Rational Congruential Iterative Delta Code generation methodology, wherein the rational function employed in the Rational Congruential Iterative Delta Code generation methodology is of the form $f(x;a)=ax^{-1}$ mod M, where $f$ is a function of variable x, M is an integer modulus, a is a parameter, with possible values of 1, 2, ... M−1.

11. A method for coding at least one characteristic of at least one pulse within a pulse train, comprising the steps of:
(a) specifying pulse characteristics relative to at least one non-fixed reference in accordance with a delta code of a plurality of delta codes, wherein the pulse characteristics define one of a plurality of communication channels defined by said plurality of delta codes; and
(b) applying said delta code relative to said at least one non-fixed reference, wherein the delta code is a deterministic delta code, wherein the deterministic delta code is generated using the iterative delta code generation methodology, wherein the deterministic delta code is generated using the Rational Congruential Iterative Delta Code generation methodology, wherein the rational function employed in the Rational Congruential Iterative Delta Code generation methodology is of the form $f(x;a)=ax$ mod M, where $f$ is a function of variable x, M is an integer modulus, a is a parameter, with possible values of 1, 2, ... M−1.

12. A method for coding at least one characteristic of at least one pulse within a pulse train, comprising the steps of:
(a) specifying pulse characteristics relative to at least one non-fixed reference in accordance with a delta code of a plurality of delta codes, wherein the pulse characteristics define one of a plurality of communication channels defined by said plurality of delta codes; and (b) applying said delta code relative to said at least one non-fixed reference, wherein the delta code is a deterministic delta code, wherein the deterministic delta code is generated using the iterative delta code generation methodology, wherein the deterministic delta code is generated using the Rational Congruential Iterative Delta Code generation methodology, wherein the rational function employed in the Rational Congruential Iterative Delta Code generation methodology is of the form $f(x;a)=ax^2$ mod M, where $f$ is a function of variable x, M is an integer modulus, a is a parameter, with possible values of 1, 2, ... M−1.

13. A method for coding at least one characteristic of at least one pulse within a pulse train, comprising the steps of:
(a) specifying pulse characteristics relative to at least one non-fixed reference in accordance with a delta code of a plurality of delta codes, wherein the pulse characteristics define one of a plurality of communication channels defined by said plurality of delta codes; and
(b) applying said delta code relative to said at least one non-fixed reference, wherein the delta code is a deterministic delta code, wherein the deterministic delta code is generated using the iterative delta code generation methodology, wherein the deterministic delta code is generated using the Rational Congruential Iterative Delta Code generation methodology, wherein the rational function employed in the Rational Congruential Iterative Delta Code generation methodology is of the form $f(x;a)=ax^3$ mod M, where $f$ is a function of variable x, M is an integer modulus, a is a parameter, with possible values of 1, 2, ... M−1.

14. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein allowable and non-allowable characteristic regions are allocated relative to said at least one non-fixed reference and said delta code is applied relative to said allowable and non-allowable characteristic regions.

15. The impulse transmission system of claim 14, wherein said allowable and non-allowable characteristic regions are relative to at least one definable characteristic value within a layout.

16. The impulse transmission system of claim 15, wherein said at least one definable characteristic value is relative to at least one reference.

17. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein the delta code is a deterministic delta code, wherein the deterministic delta code is generated using the sequential delta code generation methodology, wherein the deterministic delta code is generated using the Rational Congruential Sequential Delta Code generation methodology, wherein the rational function employed in the Rational Congruential Sequential Delta Code generation methodology is of the form $f(x;a)=ax^n$ mod M, where $f$ is a function of variable x, M is an integer modulus, a is a parameter, with possible values of 1, 2, ... M−1, and n is a nonzero integer.

18. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein the delta code is a deterministic delta code, wherein the deterministic delta code is generated using the sequential delta code generation methodology, wherein the deterministic delta code is generated using the Rational Congruential Sequential Delta Code generation methodology, wherein the rational function employed in the Rational Congruential Sequential Delta Code generation methodology is of the form $f(x; a)=ax^{-1}$ mod M, where $f$ is a function of variable x, M is an integer modulus, a is a parameter, with possible values of 1, 2, ... M−1.

19. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein the delta code is a deterministic delta code, wherein the deterministic delta code is generated using the sequential delta code generation methodology, wherein the deterministic delta code is generated using the Rational Congruential Sequential Delta Code generation methodology, wherein the rational function employed in the Rational Congruential Sequential Delta Code generation methodology is of the form $f(x; a)=ax$ mod M, where $f$ is a function of variable x, M is an integer modulus, a is a parameter, with possible values of 1, 2, ... M−1.

20. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein the delta code is a deterministic delta code, wherein the deterministic delta code is generated using the sequential delta code generation methodology, wherein the deterministic delta code is generated using the Rational Congruential Sequential Delta Code generation methodology, wherein the rational function employed in the Rational Congruential Sequential Delta Code generation methodology is of the form $f(x;a)=ax^2$ mod M, where $f$ is a function of variable x, M is an integer modulus, a is a parameter, with possible values of 1, 2, ... M−1.

21. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein the delta code is a deterministic delta code, wherein the deterministic delta code is generated using the sequential delta code generation methodology, wherein the deterministic delta code is generated using the Rational Congruential Sequential Delta Code generation methodology, wherein the rational function employed in the Rational Congruential Sequential Delta Code generation methodology is of the form $f(x;a)=ax^3 \mod M$, where $f$ is a function of variable x, M is an integer modulus, a is a parameter, with possible values of 1, 2, . . . M−1.

22. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein the delta code is a deterministic delta code, wherein the deterministic delta code is generated using the iterative delta code generation methodology, wherein the deterministic delta code is generated using the Rational Congruential Iterative Delta Code generation methodology, wherein the rational function employed in the Rational Congruential Iterative Delta Code generation methodology is of the form $f(x;a)=ax^n \mod M$, where $f$ is a function of variable x, M is an integer modulus, a is a parameter, with possible values of 1, 2, . . . M−1, and n is a nonzero integer.

23. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein the delta code is a deterministic delta code, wherein the deterministic delta code is generated using the iterative delta code generation methodology, wherein the deterministic delta code is generated using the Rational Congruential Iterative Delta Code generation methodology, wherein the rational function employed in the Rational Congruential Iterative Delta Code generation methodology is of the form $f(x;a)=ax^{-1} \mod M$, where $f$ is a function of variable x, M is an integer modulus, a is a parameter, with possible values of 1, 2, . . . M−1.

24. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein the delta code is a deterministic delta code, wherein the deterministic delta code is generated using the iterative delta code generation methodology, wherein the deterministic delta code is generated using the Rational Congruential Iterative Delta Code generation methodology, wherein the rational function employed in the Rational Congruential Iterative Delta Code generation methodology is of the form $f(x;a)=ax \mod M$, where $f$ is a function of variable x, M is an integer modulus, a is a parameter, with possible values of 1, 2, . . . M−1.

25. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein the delta code is a deterministic delta code, wherein the deterministic delta code is generated using the iterative delta code generation methodology, wherein the deterministic delta code is generated using the Rational Congruential Iterative Delta Code generation methodology, wherein the rational function employed in the Rational Congruential Iterative Delta Code generation methodology is of the form $f(x;a)=ax^2 \mod M$, where $f$ is a function of variable x, M is an integer modulus, a is a parameter, with possible values of 1, 2, . . . M−1.

26. An impulse transmission system comprising:
a Ultra Wideband Transmitter;
a Ultra Wideband Receiver; and
said Ultra Wideband Transmitter and said Ultra Wideband Receiver employ a delta code of a plurality of delta codes, wherein said delta code specifies pulse characteristics relative to at least one non-fixed reference, wherein said pulse characteristics define one of a plurality of communication channels defined by said plurality of delta codes, wherein the delta code is a deterministic delta code, wherein the deterministic delta code is generated using the iterative delta code generation methodology, wherein the deterministic delta code is generated using the Rational Congruential Iterative Delta Code generation methodology, wherein the rational function employed in the Rational Congruential Iterative Delta Code generation methodology is of the form $f(x;a)=ax^3 \mod M$, where $f$ is a function of variable x, M is an integer modulus, a is a parameter, with possible values of 1, 2, . . . M−1.

* * * * *